United States Patent [19]

Powers et al.

[11] Patent Number: 5,548,023
[45] Date of Patent: Aug. 20, 1996

[54] GRAFT COPOLYMERS OF PARA-ALKYLSTYRENE/ISOOLEFIN COPOLYMERS AS BLEND COMPATIBILIZERS

[75] Inventors: Kenneth W. Powers, Berkeley Heights; Hsien-Chang Wang, Edison, both of N.J.; T-C. Chung, State College, Pa.; Anthony J. Dias, Linden; Joseph A. Olkusz, Fanwood, both of N.J.

[73] Assignee: Exxon Chemical Patents, Inc., Wilmington, Del.

[21] Appl. No.: 402,792

[22] Filed: Mar. 13, 1995

Related U.S. Application Data

[62] Division of Ser. No. 181,713, Jan. 14, 1994, Pat. No. 5,430,118, which is a continuation of Ser. No. 880,922, May 11, 1992, abandoned, which is a division of Ser. No. 442,028, Nov. 27, 1989, Pat. No. 5,162,445, which is a continuation-in-part of Ser. No. 441,575, Nov. 22, 1989, abandoned, which is a continuation-in-part of Ser. No. 416,713, Oct. 3, 1989, abandoned, and Ser. No. 416,503, Oct. 3, 1989, abandoned, which is a continuation-in-part of Ser. No. 119,665, Nov. 12, 1987, abandoned, said Ser. No. 416,713, is a continuation-in-part of Ser. No. 119,665.

[51] Int. Cl.[6] .................................................... C08L 25/16
[52] U.S. Cl. ............................... 525/69; 525/70; 525/72; 525/73; 525/74; 525/75; 525/77; 525/78; 525/79; 525/80; 525/86; 525/192; 525/194; 525/195; 525/333.4; 525/356; 525/357
[58] Field of Search ................................ 525/69, 70, 72, 525/73, 74, 77, 78, 80, 86, 241, 333.4, 333.3, 75, 79, 192, 194, 195, 356, 357

[56] References Cited

U.S. PATENT DOCUMENTS

| | | | |
|---|---|---|---|
| 3,145,187 | 8/1964 | Hankey et al. | 260/23 |
| 3,445,890 | 7/1969 | Davidson et al. | 526/237 X |
| 3,786,116 | 1/1974 | Milkovich et al. | 260/885 |
| 3,862,265 | 1/1975 | Steinkamp et al. | 260/878 R |
| 3,928,501 | 12/1975 | Vandenburg | 525/359.2 |
| 3,932,371 | 1/1976 | Powers | 260/85.3 R |
| 3,948,868 | 4/1976 | Powers | 260/80.7 |
| 3,998,713 | 12/1976 | Marek et al. | 526/347 X |
| 4,074,035 | 2/1978 | Powers et al. | 526/185 |
| 4,145,190 | 3/1979 | Webb | 44/56 |
| 4,299,931 | 11/1981 | Coran et al. | 525/95 |
| 4,548,995 | 10/1985 | Kowalski et al. | 525/354 |
| 5,013,793 | 5/1991 | Wang et al. | |
| 5,051,477 | 9/1991 | Yu et al. | |
| 5,051,478 | 9/1991 | Puydak et al. | |
| 5,063,268 | 11/1991 | Young | |
| 5,077,345 | 12/1991 | Newman et al. | |
| 5,187,013 | 2/1993 | Sullivan | |
| 5,206,303 | 4/1993 | Tse et al. | |
| 5,210,148 | 5/1993 | Frechet | 526/347.1 X |
| 5,227,426 | 7/1993 | Tse et al. | |
| 5,238,990 | 8/1993 | Yu et al. | |
| 5,244,961 | 9/1993 | Yu et al. | |
| 5,246,778 | 9/1993 | Costemalle et al. | |
| 5,356,950 | 10/1994 | White et al. | |
| 5,403,889 | 4/1995 | Sato | 525/241 X |

OTHER PUBLICATIONS

Jean-Pierre Montheard, et al., "Chemical Transformations of Chloromethylated Polystyrene" in *JMS*, Rev. Macromol. Chem. Phys., C–28 (3&4) 503–592 (1988).

*Macromolecular Reviews*, vol. 2, pp. 74–83, Interscience Publishers, Inc. (1967), "Monomers Polymerized by Anionic Initiators".

Rempp et al. "Synthesis of Model Macromolecules of Various Types via Anionic Polymerization", *ACS Symposium Series 166*, p. 60, American Chemical Society (1981).

*Principles of Polymerization*, Chapter 7, pp. 808–563, 2nd Ed., G. Odian, J. Wiley & Sons, New York (1981), and the 209 references contained therein.

H. L. Finkbeiner et al., "Polymerization by Oxidative Coupling", Chapter 15 in *Polymerization Processes*, C E. Schildknecht, Ed., with I. Skeist, Wiley–Interscience, New York (1977).

J. P. Kennedy et al., *J. Appl. Polym. Sci.; Appl. Polym. Symp.* 30 (1977); *J. Macromol. Sci., Chem.* A3, 861 (1969); *Adv. Polym. Sci.*, 14, 1 (1974).

A. W. Halasaa et al., *J. Poly. Sci.*, Part A1, 9, 139 (1971); and *J. Polym Sci., Chem. Ed.* 14, 497 (1976).

B. W. Brooks, *J. Polym. Sci.*, Part B5, 641 (1967).

Y. Minoura et al., *J. Polym Sci.*, Part A1, 6, 2773 (1968).

Marcel Campus et al., "Chloromethylstyrene: Synthesis, Polymerization, Transformation, Applications" in *Rev. Macromol. Chem. Physics*, C22(3), 343–407 (1982–1983).

J. M. J. Frechet in "Chemical Modification of Polymers via Phase Transfer Catalysts", *Crown Ethers and Phase Transfer Catalysts in Polymer Science*, edited by Matthews and Canecher and Published by Plenum Press, NY, 1984.

Jones et al., "Isobutylene Copolymers of Vinylbenzyl Chloride and Isopropenylbenzyl Chloride", *Journal of Applied Polymer Science*, vol. V, Issue No. 16, pp. 452–459 (1969).

(List continued on next page.)

*Primary Examiner*—Fred Teskin
*Attorney, Agent, or Firm*—Myron B. Kurtzman

[57] ABSTRACT

A method of compatibilizing a blend of at least a hydrocarbon polymer with at least one other polymer which is incompatible with the hydrocarbon polymer, said method comprising adding to the polymer blend a compatibilizer which is an isoolefin/para-alkylstyrene copolymer represented by the formula

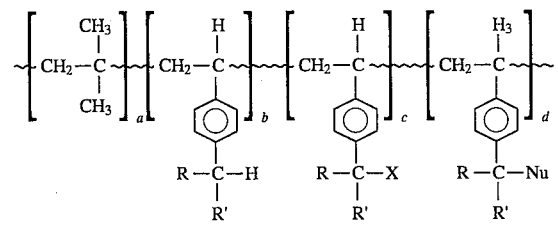

in which R and R' can be hydrogen, alkyl, and the primary and secondary alkyl halides, "a" ranges from about 14 to about 70,000, "b" ranges from 0 to about 70,000, "c" ranges from 0 to about 70,000, "d" ranges from about 1 to about 70,000, X is a halogen, and Nu is a nucleophilic residue provided by a polymeric nucleophile.

16 Claims, 5 Drawing Sheets

OTHER PUBLICATIONS

Sadykhov et al., "Chloromethylation of an Isobutylene-Styrene Copolymer and Some of its Chemical Reactions", *Acerb. Neft. Khoz.*, 1979 (6) 37–39.

Harris et al., "Block and Graft Copolymers of Pivalolactone . . . ", *Macromolecules*, 1986, 19, 2903–2908.

Sadykhov et al., "Studies of Oxidative Thermal Degradation of Copolymers of Isobutylene with m–and p–Methylstyrenes in a Solution of Mineral Oils", *Uch. Zap. Azerb. Un. t. Ser. Khum*, 1975 (304), 87–92.

Toman et al., "Isobutylene Polymers and Copolymers with Controlled Structure", Appl. 78/7, 339, Nov. 10, 1978.

R. Cohen et al., *Macromolecules* 15, 370, 1982; *Macromolecules* 12, 131, 1979; *J. Polym. Sci., Polym. Phys.*, 18, 2145–2148, 1980; *J. Macromol. Sci. Phys.*, B17 (4), 625, 1980.

GRAFT COPOLYMERS OF PARA-ALKYLSTYRENE/ISOOLEFIN COPOLYMERS AS BLEND COMPATIBILIZERS

This is a divisional of application Ser. No. 08/181,713, filed Jan. 14, 1994, now U.S. Pat. No. 5,930,118, which is a continuation of application Ser. No. 07/880,922, filed May 11, 1992, abandoned, which is a divisional of Ser. No. 07/442,028, filed Nov. 27, 1989 (now U.S. Pat. No. 5,162, 445), which was a continuation-in-part of application Ser. No. 441,575, filed Nov. 22, 1989, abandoned, which was a continuation-in-part of application Ser. Nos. 416,713 and 416,503 both filed on Oct. 3, 1989, both abandoned, which were both continuation-in-parts of application Ser. No. 119, 665, filed Nov. 12, 1987, abandoned.

FIELD OF THE INVENTION

The present invention relates to copolymers of isobutylene and para-methylstyrene. More Particularly, the present invention relates to various functionalized copolymers of isobutylene and para-methylstyrene, and in particular such polymers ranging from tough, glassy polystyrene-like polymers to rubbery ozone-resistant polyisobutylene-like polymers. More particularly, the present invention relates to methods for producing copolymers of isobutylene and paramethylstyrene. Still more particularly, the present invention relates to halogenated copolymers of isobutylene and para-methylstyrene and the use thereof.

The present invention relates to graft copolymers. More particularly, the present invention relates to graft copolymers including a substantially saturated elastomeric backbone and a thermoplastic polymer or a relatively unsaturated polymer grafted thereto. Still more particularly, the present invention relates to the use of graft copolymers to compatibilize blends of polymers. Still more particularly, the present invention relates to compatibilizing blends of relatively saturated elastomeric polymers with higher Tg thermoplastic polymers by use of graft copolymer compatibilizers on compatibilizing blends of relatively saturated polymers with relatively more unsaturated polymers by use of graft copolymers.

The present invention relates to functionalized copolymers of an isoolefin and para-alkylstyrene. More particularly, the present invention relates to various functionalized copolymers of isobutylene and para-methylstyrene, and in particular such polymers ranging from tough, glassy polystyrene-like polymers to rubbery ozone-resistant polyisobutylene-like polymers. More particularly, the present invention relates to methods for producing copolymers of isobutylene and para-methylstyrene from halogenated copolymers of isobutylene and paramethylstyrene by a nucleophilic substitution reaction.

BACKGROUND OF THE INVENTION

The preparation and use of copolymers of styrene and isobutylene is known in the art. Thus, such copolymers ranging from tough, glassy high polystyrene content copolymers for use in plastic blends, to rubbery styrene functionalized isobutylene copolymers, these copolymers have become well known in this art. Styrene and isobutylene have been copolymerized rather readily in the past under cationic polymerization conditions to yield these copolymers covering the entire compositional range. It is also known that blocky or random homogeneous copolymers can be produced by altering the copolymerization conditions, such as shown in Powers, U.S. Pat. No. 3,948,868. This patent thus describes the production of random homogeneous polymers comprising at least two cationically polymerizable monomers such as isobutylene and styrene. This disclosure also includes a lengthy list of various olefinic compounds including isobutylene, styrene, alpha-methylstyrene and other such compounds. Furthermore, these compounds have been used in a variety of applications, including use as adhesives in connection with other materials taking advantage of the surface characteristics of the polyisobutylene sequences, as coatings, as asphalt blends, and in various plastic blends. As is discussed in the '868 patent, it is also well known to produce terpolymers including isoprene, but doing so reduces the overall polymer molecular weight rendering the production of high molecular weight polymers therefrom difficult, and complicating the overall production sequence.

There have also been attempts to produce various functionalized polymers. For example, Hankey et al, U.S. Pat. No. 3,145,187, discloses polymer blends which include a vinyl chloride polymer, a surfactant, and a chlorinated olefin polymer, and the latter is said by this patentee to include copolymers of various materials which can include isobutylene and styrene, as well as ring-alkyl styrenes, among a large number of other compounds, which olefin polymers can then be chlorinated by known methods.

The literature has also disclosed other routes for obtaining copolymers of isobutylene and styrene, such as that shown in Powers et al, U.S. Pat. No. 4,074,035, which discloses the copolymerization of isobutylene with halomethylstyrene. This technique requires the use of vinylbenzyl chloride and the like as a starting material, and utilizes a specified continuous solution process with solvent or mixed solvent systems in which the monomers are soluble under specified conditions. Aside from the need to employ the expensive vinylbenzyl chloride starting material, these processes also have limitations in terms of the quantity of aromatic chloromethyl functionality which can be incorporated in this manner without encountering excessive chain branching and gel formation during polymerization and polymer recovery because of the reactivity of the benzylic chlorine under cationic polymerization conditions. Such a procedure is also discussed in Jones et al "Isobutylene copolymers of vinylbenzyl chloride and isopropenylbenzyl chloride," *Journal of Applied Polymer Science*, Volume V, Issue No. 16, pp. 452–459 (1969) in which the aromatic monomer is said to be a mixture of the para and ortho isomers.

There has also been some interest in the halomethylation of isobutylene/styrene copolymers, such as discussed in a paper by Sadykhov et al entitled "Chloromethylation of an isobutylene-styrene copolymer and some of its chemical reactions," *Acerb. Neft. Khoz.* 1979 (6) 37–9.

In an article by Harris et al entitled "Block and Graft Copolymers of Pivalolactone . . . " *Macromolecules,* 1986, 19, 2903–2908, the authors discuss the copolymerization of isobutylene with styrene and preferably a ring-methylated styrene. This article specifically discloses copolymerization with vinyl toluene, comprising a mixture of meta- and para-methylstyrene in approximately equal amounts, and with para-methylstyrene, for the purpose of producing thermoplastic elastomer pivalolactone copolymer systems with no autoxidizable aliphatic unsaturation. The article fails to recognize any difference between the use of vinyl toluene and para-methylstyrene, and in any event, even when it employs the latter, it employs conditions which result in copolymers having the properties, including heterogeneous compositional distribution and very broad molecular weight distribution for the unfractionated copolymer, as set forth in Tables 4 and 5, which include an $\overline{M}_n$ for the unfractionated copolymer of 16,000, an $\overline{M}_w/\overline{M}_n$ of 17.45 therefor, and a 4-methylstyrene content in the polymer which varies considerably from the monomer feed and varies significantly as a function of molecular weight.

Finally, there are also articles which discuss copolymers of isobutylene and para-methylstyrene without discussing any method for preparing them. These articles include Sadykhov et al "Studies of oxidative thermal degradation of copolymers of isobutylene with m- and p-methylstyrenes in a solution of mineral oils," and "p-methylstyrenes in a solution of mineral oils," *Uch. Zap. Azerb. Un. t. Ser. Khum.* 1975 (304), 87–92, and other such articles. Furthermore, in Toman et al "Isobutylene Polymers and Copolymers with Controlled Structure," Appl. 78/7, 339, (Nov. 10, 1978), there is reference to the copolymerization of isobutylene with vinyl aromatic monomers. The search has thus continued for useful molecular weight copolymers of isobutylene and alkyl styrenes, and in particular for functionalized copolymers of this type which can be cross-linked, and otherwise used in a variety of applications.

It is well known to blend low Tg elastomers with more brittle thermoplastic polymers with higher Tg, to yield blends with improved toughness and impact strength, lower brittleness temperatures, and improvements in other properties. The desired improved properties are only obtained by achieving a fine dispersion of the elastomer in the thermoplastic polymers.

Relatively saturated elastomeric polymers, such as butyl rubber, which is a copolymer primarily comprising isobutylene with a small percentage of isoprene, have been found to have a number of highly desirable physical properties in such blends. These include low air permeability, relatively low glass transition temperatures, broad damping peaks, excellent environmental aging resistance, and other such properties which render these polymers of commerical significance in blends with thermoplastic polymers or or in tire production. However, some difficulties have been encountered with the use of these polymers. Most particularly, such low unsaturated rubber compounds as polyisobutylene copolymers are highly incompatible with most other polymers, and most particularly with thermoplastic compounds. Therefore, in the face of this incompatibility it has been quite difficult to apply such low unsaturated elastomeric compounds to other fields, particularly in the area of polymer blends.

The poor compatibility of these elastomers with most other polymers is even evidenced in their use in tire production where weak adhesion between these elastomers and other more unsaturated elastomeric compounds has created problems in the use of these blends for tire production and the like.

Furthermore, similar problems have resulted from attempts to blend these low unsaturated elastomeric compounds with thermoplastic polymers, for much the same reasons, i.e., the relative incompatibility of these two types of polymeric compositions.

It has been known for some time that blends of incompatible polymers of this type can be improved in some cases by adding a suitable compatibilizer so as to alter the morphology of these blends. More particularly, to be successful it is necessary to reduce the domain sizes for both of the polymers in the blend.

It is known in some instances, for example, to use block copolymers as compatibilizers in such situations. For example, several studies have shown attempts to compatibilize rubber-rubber blends of polyisoprene and polybutadiene by using diblock materials composed of these two materials. See R. Cohen et al *Macromolecules* 15, 370, 1982; *Macromolecules* 12, 131, 1979; *J. Polym. Sci., Polym. Phys.*, 18, 2148, 1980; *J. Macromol Sci.-Phys* B17 (4), 625, 1980. Most of these block copolymers have been previously produced by sequential anionic polymerization processes, which are thus limited to a relatively small number of monomers. It is also known to compatibilize other blends, such as rubber-plastic blends of ethylene-propylene rubber with polypropylene, by using graft copolymers of these two materials. See A. Y. Coran et al, U.S. Pat. No. 4,299,931, as well as commonly assigned applications Serial Nos. 07/264,484, now abandoned, and 07/264,485, now abandoned, each filed on Oct. 28, 1988.

In general, a number of the techniques required to produce these graft copolymers are inefficient, many resulting in ill-defined products, due to gel formation, backbone degradation, the formation of homopolymers, etc.

Various techniques have also been taught for producing graft polymers onto polyisobutylene through various routes, including cationic, radical and anionic polymerization techniques. (See J. P. Kennedy et al, *J. Appl. Polym. Sci.; Appl. Polym. Symp.* 30 (1977); *J. Macromol. Sci., Chem.* A3, 861 (1969); *Adv. Polym. Sci.* 14, 1 (1974).) The reference includes articles directed to thermoplastic grafts (at pages 1, 13, 51, 119, 165 and 179) and rubber grafts (at pages 1, 19 and 141). The thermoplastic grafts disclose polyisobutylene grafts from a thermoplastic backbone polymer, primarily PVC. In one article (at page 119) there is disclosed polystyrene grafted from a chlorinated butyl backbone initiator; homopolymer polystyrene is also produced in such a system. The reference grafted products were not thoroughly characterized and included the presence of homopolymer and gel. Furthermore, the copolymer composition of the present invention differs significantly from all of those taught in the reference and also results in uniformly grafted products. Since polyisobutylene chains are essentially inert to vulcanization, they also differ reactively from the copolymer of the present invention. Finally, the products are not taught to be used as compatibilizers.

It has also been known to employ anionic grafting from polydienes by metallating the polymer with an alkyl lithium and tetramethylethylenediamine (TMEDA) or butyllithium/ alkali metal hydroxide. (See A. W. Halasaa et al, *J. Poly. Sci., Part A*1, 9, 139 (1971); and *J. Polym. Sci., Chem. Ed.* 14, 497 (1976).) Anionic *Polym. Sci., Chem. Ed.* 14, 497 (1976).) Anionic grafting-onto reactions which involve coupling an electrophilic functional group onto the backbone polymer chain with a preformed polymer chain containing a nucleophilic end have also been known. For example, the literature discusses the electrophilic polymers including halogenated poly(isobutylene-co-isoprene), polybutadiene and EPDM. (See B. W. Brooks, *J. Polym., Sci. Part B5*, 641 (1967); and Y. Minoura et al, *J. Polym.. Sci. Part A*16, 773 (1968).)

Polymers with a saturated hydrocarbon backbone are well known to possess good environmental and aging resistance which makes them highly desirable in a variety of applications. Furthermore, rubbery copolymers containing major amounts of polyisobutylene are well known to possess low permeability, unique damping properties, and low surface energy which makes them particularly highly desired in many applications. However, the "inertness" of these saturated hydrocarbon polymers, their low reactivity and incompatibility with most other materials, and the difficulties in adhering them to, or using them in conjunction with most other materials has restricted their use in many areas.

We theorized that the introduction of controlled amounts of the desired specific functionality as pendant groups on the saturated hydrocarbon backbone would greatly extend usefulness by permitting these polymers to be adhered to other surfaces and/or be coreacted with or compatibilized with other functional polymers by "grafting" or cross linking reactions. We further theorized that the introduction of pendant functionality of the right type and amounts would permit these saturated hydrocarbon polymers to be "painted" or coated with other materials or to be used as coatings on other materials and/or to be laminated with or dispersed in other materials to yield composite materials with a desired combination of properties.

As has already been pointed out, the fact that benzylic halogen functionality constitutes a very active electrophile that can be converted to many other functionalities via Sn nucleophilic substitution reactions has long been recognized and the chemical literature is replete with examples of these reactions. "Clean" conversions in high yield to many functionalities, including the following have been reported: aldehyde carboxy, amide, ether, ester, thioester, thioether, alkoxy, cyanomethyl, hydroxymethyl, thiomethyl, aminomethyl, cationic ionomers (quaternary ammonium or phosphonium, S-isothiouronium, or sufonium salts), anionic ionomers (sulfonate and carboxylate salts), etc. In addition, the literature describes many examples in which a benzylic halogen is replaced by a cluster of other functionalities by nucleophilic substitution with a multifunctional nucleophile such as: triethanol amine, ethylene polyamines, malonates, etc. Nearly all of this previous work has been with simple, small (i.e. non-polymeric) molecules containing the aromatic halomethyl (or benzylic) functionality. However, a considerable amount of art also exists on nucleophilic substitution reactions involving chloromethyl styrene and polystyrenes containing aromatic chloromethyl groups to introduce other functionalities. Much of this work involves reactions with "styragels" or lightly cross-linked polystyrenes containing various amounts of benzylic chlorine, and while many of the same nucleophilic substitution reaction previously reported for small molecules containing benzylic chlorine have been achieved in "Styragels", it has been necessary to modify reaction conditions and in particular to often employ phase transfer catalysts in order to promote the desired substitution reaction. Reactions involving the benzylic chlorine in polystyrene have been more difficult to achieve than in simple small molecules because of the greater difficulty in achieving the intimate contact required between the reactants when one of the reactants (the aromatic chloromethyl moiety) is in a separate polymeric phase from the other reactant. Yields have also generally been lower and side reactions are more prevalent in the reactions involving the benzylic chlorine in polystyrene. However, since most of the work has been with "styragels", it has generally not been necessary to achieve high conversion in "clean" substitution reactions in order to preserve polymer solubility. Good recent reviews of this work involving chloromethyl styrene and "styragels" containing benzylic chlorines are in the literature (see Marcel Camps et al. in *Chloromethylstyrene: Synthesis, Polymerization, Transformation, Applications* in Rev. Marcromol. Chem. Physics, C22(3), 343–407 (1982-83) and JMJ Frechet in *Chemical Modification of Polymers via Phase Transfer Catalysts in "Crown Ethers and Phase Transfer Catalysts in Polymer Science*, edited by Matthews and Canecher and Published by Plenum Press, NY, 1984, and Jean-Pierre Montheard, et al.

in Chemical Transformations of Chloromethylated Polystyrene in JMS-Rev. Macromol. Chem. Phys., C-28 (3&4) 503–592 (1988).

Previous workers have not applied nucleophilic substitution reactions to isobutylene/para-bromomethylstyrene/para-bromomethylstyrene para-methyl styrene terpolymers as we have done to produce the versatile, substantially saturated, pendant functionalized, soluble copolymers of this invention.

SUMMARY OF THE INVENTION

In accordance with the present invention applicants have discovered copolymers comprising the direct reaction product of isoolefin having from 4 to 7 carbon atoms and para-alkylstyrene in which the copolymer has a substantially homogeneous compositional distribution. Thus, applicants' copolymers can be distinguished from previous copolymers on this basis in that they have essentially the same ratio of the isoolefin to the para-alkylstyrene components at all selected fractions thereof. In a preferred embodiment, the isoolefin comprises isobutylene, and the para-alkylstyrene comprises para-methylstyrene.

In accordance with another embodiment of the present invention, applicants have also discovered the copolymer which consists essentially of the direct reaction product of isoolefin having from 4 to 7 carbon atoms and a para-alkylstyrene, the copolymer having a number average molecular weight ($\overline{M}_n$) of at least about 25,000, and preferably at least about 30,000. The copolymers also preferably have a ratio of weight average molecular weight ($\overline{M}_w$) to number average molecular weight, or $\overline{M}_w/\overline{M}_n$ of less than about 6, more preferably less than about 4, even more preferably less than about 2.5, and most preferably less than about 2.

In accordance with a preferred embodiment of the copolymers of the present invention in which elastomeric copolymers are produced, these copolymers comprise between about 80 and 99.5 wt. % of the isoolefin such as isobutylene and about 0.5 and 20 wt. % of the para-alkylstyrene such as para-methylstyrene. In accordance with another embodiment, however, where glassy or plastic materials are being produced as well, the copolymers comprise between about 10 and 99.5 wt. % of the isoolefin, or isobutylene, and about 0.5 and 90 wt. % of the para-alkylstyrene, or para-methylstyrene.

In a further preferred embodiment the substantially homogeneous copolymers of the present invention have a number average molecular weight of from about 500 to about 25,000.

In accordance with a preferred embodiment of the copolymers of the present invention, these copolymers include the para-alkylstyrene as

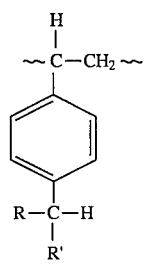

in which R and R' are, independently, either hydrogen, alkyl, or primary or secondary alkyl halides. Preferably, R and R' are hydrogen, $C_1$ to $C_5$ alkyl, or $C_1$ to $C_5$ primary or secondary alkyl, and most preferably R and R' are hydrogen.

In accordance with another embodiment of the present invention, applicants have also discovered halogenated copolymers of isoolefin having from 4 to 7 carbon atoms and para-alkylstyrene, which copolymers have a substantially homogeneous compositional distribution and which include the para-alkylstyrene within the copolymer as

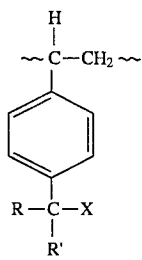

wherein R and R' are independently selected from hydrogen, alkyl, and the primary and secondary alkyl halides, and X comprises a halogen or a mixture of halogen and hydrogen. Preferably these halogenated copolymers are otherwise substantially free of any additional halogen in the form of any ring halogen or any halogen on the polymer backbone chain (i.e., on the isoolefin carbons). In a highly preferred embodiment the halogen employed is bromine.

In another embodiment of this aspect of the present invention, applicants have provided a copolymer of an isoolefin having 4 to 7 carbon atoms and a para-alkylstyrene which includes the para-alkylstyrene in the copolymer as

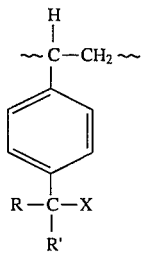

wherein R and R' are independently selected from hydrogen, alkyl, and the primary and secondary alkyl halides, and wherein X comprises bromine or a mixture of bromine and hydrogen, and in which the copolymer is otherwise substantially free of any ring bromine or any bromine on the polymer backbone chain. Preferably when R and/or R' are alkyl, they are $C_1$ to $C_5$ alkyl, and when they are primary or secondary alkyl halide, they are primary or secondary $C_1$ to $C_5$ alkyl halide. In a most preferred embodiment both R and R' are hydrogen, and the copolymer has a substantially homogeneous compositional distribution.

In accordance with another aspect of the present invention, applicants have also discovered a brominated copolymer of isoolefin having from 4 to 7 carbon atoms and para-alkylstyrene, in which the brominated copolymer includes the para-alkylstyrene as

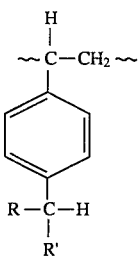

or as

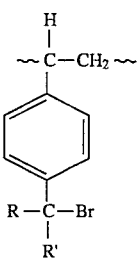

or as a mixture of (1) and (2), wherein R and R' are independently hydrogen, alkyl, and the primary and secondary alkyl halides, and in which the copolymer is otherwise substantially free of any ring bromine or any bromine on the polymer backbone chain.

In a highly preferred embodiment up to about 60% of the para-alkylstyrene present in the copolymer structure is in the form of (2) above.

In accordance with another aspect of the present invention, applicants have also discovered a process for producing a copolymer of isoolefin having between 4 and 7 carbon atoms and para-alkylstyrene which comprises admixing the isoolefin and the para-alkylstyrene in a copolymerization reactor under copolymerization conditions in the presence of a diluent, and a Lewis Acid catalyst, and maintaining the copolymerization reactor substantially free of impurities which can complex with the catalyst or which can copolymerize with the isoolefin or the para-alkylstyrene. In this manner applicants have discovered that they are able to produce the above-described copolymers as direct reaction products, and which, in their as-polymerized form, have a substantially homogeneous compositional distribution, and which can also consist essentially of isoolefin and para-alkylstyrene, and have a number average molecular weight of greater than about 25,000. In accordance with a preferred embodiment, the isobutylene/para-methylstyrene copolymer is insoluble in the diluent, and the process is thus a slurry polymerization process.

In another embodiment, however, in which the isobutylene/para-methylstyrene copolymer is soluble in the diluent, a solution polymerization process is described.

In accordance with a preferred embodiment of the copolymerization process of the present invention, the isobutylene and para-methylstyrene (throughout the remainder of this application the use of applicants' highly preferred embodiment of isobutylene and para-methylstyrene is intended to also include the potential use of various isoolefins and para-alkylstyrenes as set forth above) are present in the copolymer in amounts such that the isobutylene comprises between about 80 and 99.5 wt. % of the mixture and the para-methylstyrene comprises between about 0.5 and 20 wt. % of the mixture. In another embodiment, however, the isobutylene comprises from about 10 to 99.5 wt. % of the mixture and the para-methylstyrene comprises from about 0.5 to about 90 wt. % of the mixture.

In accordance with another embodiment of the present invention, applicants have discovered a process for the selective bromination of a copolymer of an isoolefin having 4 to 7 carbon atoms and a para-alkylstyrene having the formula

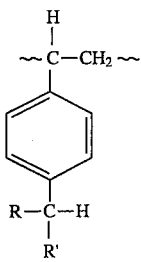

which comprises providing the copolymer and brominating the copolymer in the presence of bromine and a radical initiator so as to provide a brominated copolymer of isoolefin and para-alkylstyrene which copolymer includes the para-alkylstyrene as

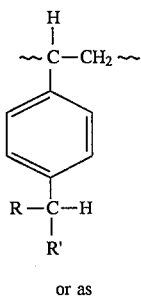 (1)

or as

-continued

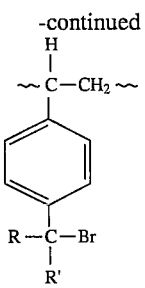 (2)

or as a mixture of (1) and (2), in which R and R' are independently hydrogen, alkyl, and the primary and secondary alkyl halides, and in which the copolymer is otherwise substantially free of ring bromine or any bromine on the polymer backbone chain. In accordance with one embodiment of the selected bromination process of the present invention, the radical initiator is light or heat. In accordance with another embodiment of the present invention, the radical initiator has a half-life of between about five and 2,500 minutes, and preferably comprises a bis azo compound.

The novel copolymers of the present invention have been produced on the basis of several significant discoveries.

In accordance with the present invention, novel graft copolymers have now been discovered which are extremely useful in their own right such as an elastomeric composition, ranging from elastomeric to thermoplastic polymer compositions, and which are also particularly useful in compatibilizing certain rubber-plastic polymer blends, most particularly blends of low unsaturated elastomers, such as butyl rubbers, with thermoplastic compositions having a relatively high glass transition or melting temperature or blends of relatively saturated elastomers such as butylrubbers, with more highly unsaturated elastomeric polymers, such as polyisoprene and natural rubber.

Most particularly in accordance with this invention, it has been found that the preparation of an electrophile which comprises a copolymer of isoolefins having from 4 to 7 carbon atoms with halogenated para-alkylstyrene is extremely important in obtaining the graft copolymers of the present invention which are useful both as polymers themselves and as such compatibilizers. By doing so it is then possible to produce the graft copolymers by a graft-onto reaction. Most particularly, in accordance with the present invention, graft copolymers have been discovered comprising

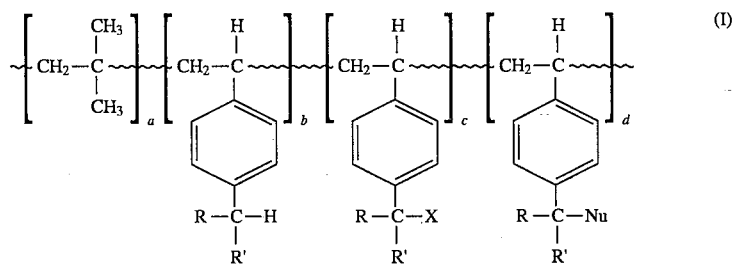 (I)

wherein R are R' are independently selected from the group consisting of hydrogen, alkyl, and the primary and secondary alkyl halides. Furthermore, in this formula, the combination of a+b+c+d represents empirical formula for a substantially random graft copolymer (the wavy lines indicate elements of a random polymer structure based on the indicated moieties), where a ranges from about 14 to 70,000, b ranges from 0 to about 70,000, c ranges from 0 to about 70,000, d ranges from about 1 to 70,000, X comprises a halogen, and Nu comprises a monofunctional polymeric nucleophile having a molecular weight of at least about 1,000 and being sufficiently nucleophilic such that said nucleophile is capable of donating electrons to benzyl halides, thereby displacing the halogen from the benzyl halide.

In accordance with another preferred embodiment of the present invention, Nu comprises

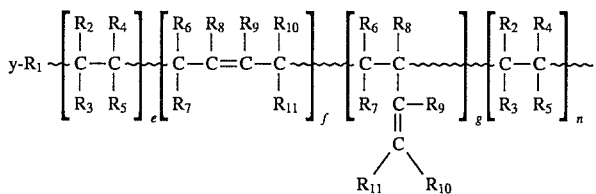

wherein $R_2$ and $R_3$ comprise a component selected from the group consisting of aryl, diaryl, polyaryl, and the alkyl, aryl, alkaryl, alkoxy, cycloalkyl, aryloxy and dialkylamino derivatives of the aryl, diaryl, or polyaryls, wherein $R_4$ through $R_{11}$ are independently selected from the group consisting of hydrogen, alkyl, and substituted alkyl, f ranges from 0 to about 20,000, g ranges from 0 to about 20,000, and h ranges from 0 to about 10,000, with the further proviso that the sum of f+g+h ranges from about 20 to about 20,000, y comprises a linked nucleophilic residue, and furthermore, wherein either (a) $R_1$ is $(CH_2)_m$, wherein m is a positive integer, and e is 0 or 1, or (b) $R_1$ is $(CH_2)_m$, wherein m is 0, and e range from 0 to about 1,000.

In a preferred embodiment the linked nucleophilic residue (y) can be

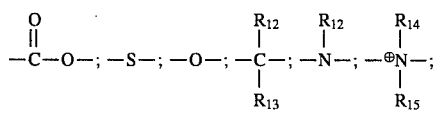

wherein $R_{12}$, $R_{13}$, $R_{14}$, and $R_{15}$ can be hydrogen, alkyl or aryl. The nucleophilic residue can also be derived from yM where M is an alkali or alkaline earth metal such as sodium, potassium, magnesium, or lithium, or an onium ion, such as tetraalkylammonium, preferably tetramethylammonium or tetrabutylammonium.

In accordance with a preferred embodiment of the present invention, Nu comprises $$Nu=y-P \qquad (II)$$

wherein y comprises a linked nucleophilic residue and P comprises a thermoplastic polymer. The nucleophilic residue can also be derived from M(y–P) where M comprises an alkali or alkaline earth metal or onium ion, such as tetraalkylammonium, preferably tetramethylammonium or tetrabutyl ammonium.

In a preferred embodiment the linked nucleophilic residue (y) can be:

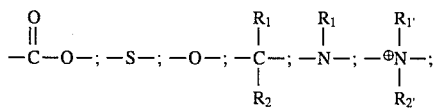

wherein $R_1$, $R_2$, $R_{1'}$, and $R_{2'}$ can be hydrogen, aryl or alkyl.

In this manner, by using a graft-onto reaction scheme the graft copolymers of Formula (I) above can then be produced, and more particularly this can be accomplished in a manner using a monofunctional nucleophile so as to minimize gel formation and other indicia of inefficient grafting which have generally resulted from repeating side reactions taking place therein.

In accordance with another embodiment of the present invention, graft copolymers are provided of (a) an electrophile comprising a copolymer of an isoolefin having from 4 to 7 carbon atoms and a para-alkylstyrene having the formula (II)

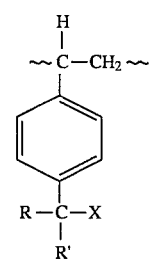

(III)

wherein X is a halogen and R and R' are independently selected from the group consisting of hydrogen, alkyl, and primary and secondary alkyl halides, and (b) a polymeric nucleophile having a molecular weight of at least about 1,000 and being sufficiently nucleophilic such that said nucleophile is capable of donating electrons to benzyl halides, thereby displacing the halogen from the benzyl halide.

In accordance with another embodiment of the present invention, there is provided a method for compatibilizing a polymer blend of (a) a first polymer including repeating units of the formula

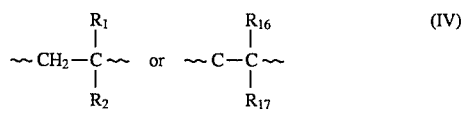

wherein $R_1$ and $R_2$ or $R_{16}$ and $R_{17}$ are each hydrogen, alkyl, or aryl, and (b) a second polymer which is incompatible with the first polymer, which includes adding to said polymer blend a compatibilizer comprising a graft copolymer comprising

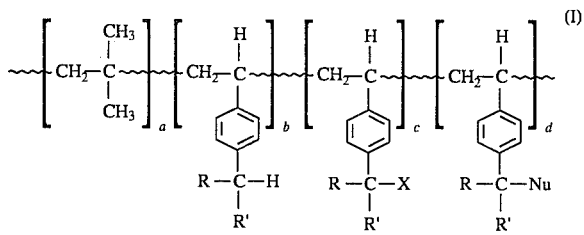

wherein R and R' are independently selected from the group consisting of hydrogen, alkyl, and the primary and secondary alkyl halides, and in which the combination of a+b+c+d represents the empirical formula of a substantially random graft copolymer, where a ranges from about 14 to 70,000, b ranges from 0 to about 70,000, c ranges from 0 to about 70,000, d ranges from about 1 to 70,000, X comprises a halogen, and Nu comprises a nucleophilic residue provided by a polymeric nucleophile having a molecular weight of at least about 1,000 and being sufficiently nucleophilic such that said nucleophile is capable of donating electrons to benzyl halides, thereby displacing the halogen from the benzyl halide, again such as these in Formula 11 above β.

In accordance with another embodiment of the present invention methods for preparing graft copolymers are set forth including providing an electrophile comprising a copolymer of an isoolefin having from 4 to 7 carbon atoms and a para-alkylstyrene having the formula

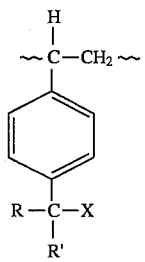

IV wherein X is a halogen and R and R' are independently selected from the group consisting of hydrogen, alkyl, and primary and secondary alkyl halides, and (b) a polymeric nucleophile having a molecular weight of at least about 1,000 and being sufficiently nucleophilic such that said nucleophile is capable of donating electrons to benzyl halides.

In accordance with the present invention applicants have discovered functionalized copolymers of an isoolefin having from 4 to 7 carbon atoms and a Para-alkylstyrene wherein the functional groups of the copolymer are affixed to the paraalkyl group. In a preferred embodiment, the isoolefin comprises isobutylene, and the paraalkylstyrene comprises para-methylstyrene.

In accordance with another embodiment of the present invention, the functionalized copolymer consists essentially of a functionalized copolymer of an isoolefin having from 4 to 7 carbon atoms and a para-alkylstyrene; wherein the copolymer has a number average molecular weight ($\overline{M}_n$) of at least about 25,000, and preferably at least about 30,000. The functionalized copolymers also preferably have a ratio of weight average molecular weight ($\overline{M}_w$) to number average molecular weight, or $\overline{M}_w/\overline{M}_n$ of less than about 6, more preferably less than about 4, even more preferably less than about 2.5, and most preferably less than about 2.

In accordance with a preferred embodiment the preferred functionalized copolymers of the present invention are elastomeric functionalized copolymers, wherein these copolymers comprise between about 80 and 99.5 wt. % of the isoolefin such as isobutylene and between about 0.5 and 20 wt. % of the para-alkylstyrene such as para-methylstyrene. In accordance with another embodiment, however, where glassy or plastic materials are being produced as well, the functionalized copolymers comprise between about 10 and 99.5 wt. % of the isoolefin, or isobutylene, and between about 0.5 and 90 wt. % of the para-alkylstyrene, or para-methylstyrene.

In a further preferred embodiment the substantially homogeneous functionalized copolymers of the present invention have a number average molecular weight of from about 500 to about 25,000.

In accordance with a preferred embodiment of the copolymers of the present invention, these functionalized copolymers include the para-alkylstyrene having a functionalized group affixed to the alkyl group as

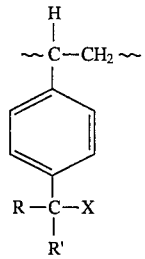

wherein R and R' are independently selected from hydrogen, alkyl, and the primary and secondary alkyl halides, and X is a functional group or functional groups selected from the group consisting of alkoxide, phenoxide, carboxylate, thiolates, thioethers, thiocarboxylates, dilhiocarboxylates, thioureas, dithiocarbamates, xanthates, thiocyanates, silanes, halosilanes, cyanides, organo lithium compounds, malonates, amides, amines, carbozoles, phthalemide, pyridine, malemide, phosphines, and cyanate and mixtures thereof. Preferably these functionalized copolymers are otherwise substantially free of any additional functional groups in the form of any ring functional groups or any functional groups on the polymer backbone chain (i.e., on the isoolefin carbons).

Substitution of other functional groups for the benzylic bromine which is a very active and versatile electrophile can be accomplished by nucleophilic substitution reactions to introduce the desired functionality.

The pendant functionalized copolymers of the instant invention can be characterized by the formula:

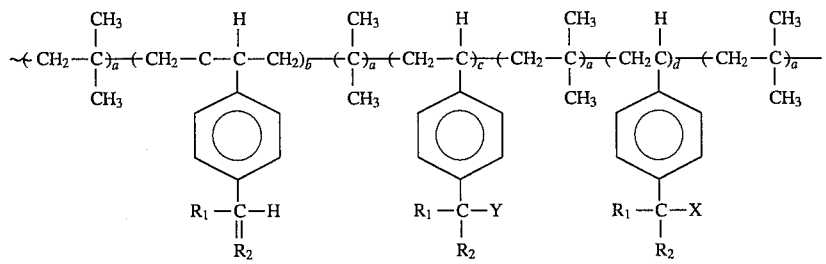

wherein $R_1$ and $R_2$ are independently selected from the group consisting of hydrogen, alkyl, preferably $C_1$ to $C_5$ alkyl, and primary or secondary alkyl halides, preferably primary or secondary $C_1$ to $C_5$ alkyl halides, X is selected from the group consisting of chlorine and bromine, preferably bromine and Y represents a new functional group attached to the polymer via nucleophilic substitution of one of the benzylic halogens.

DETAILED DESCRIPTION

Figure 1:
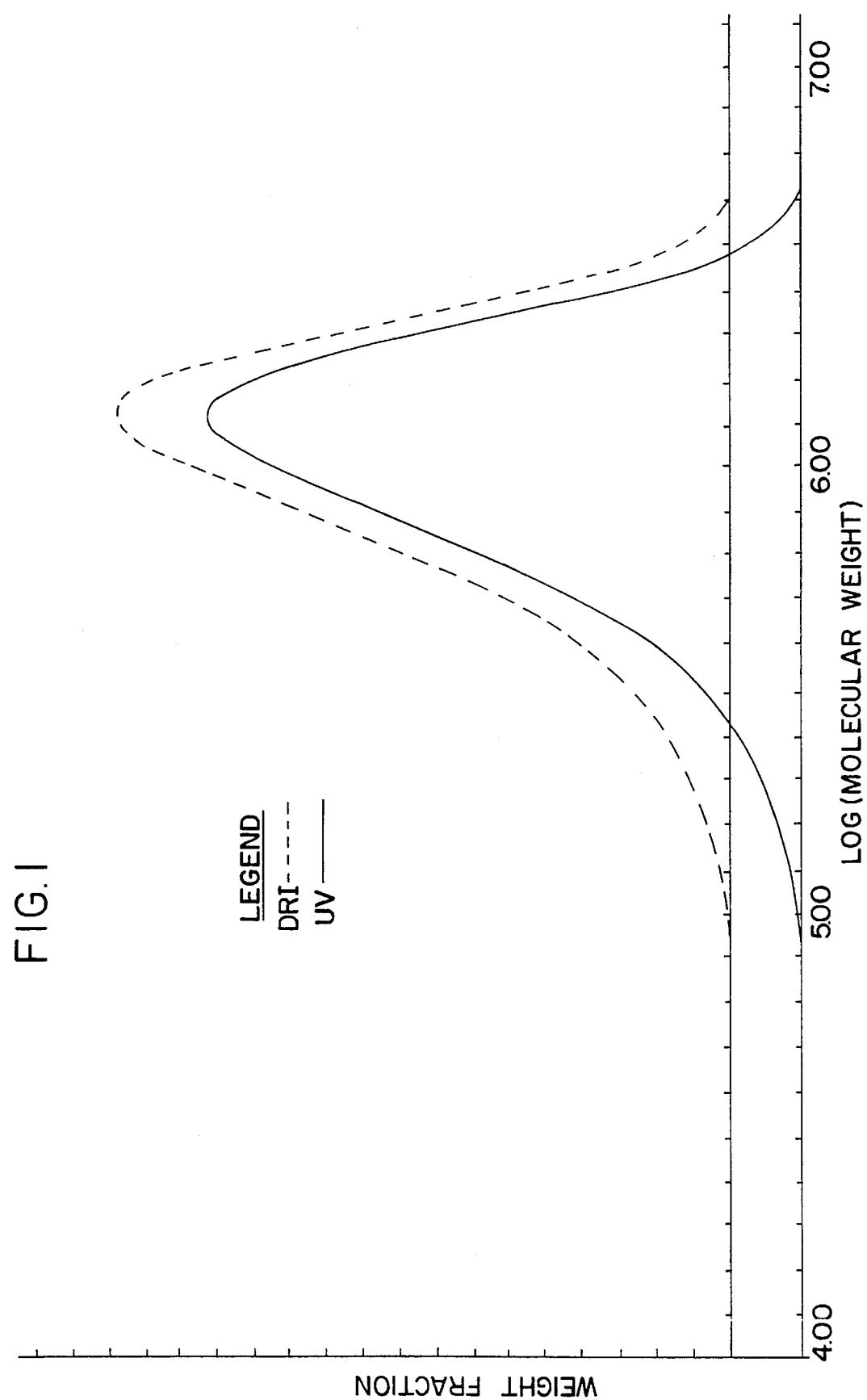
FIG. 1 is a typical gel permeation chromatograph for a copolymer produced in accordance with the present invention.

This invention is initially based upon the discovery that the polymerization of these particular monomers under certain specific polymerization conditions now permits one to produce copolymers which comprise the direct reaction product (that is, in their as-polymerized form), and which have unexpectedly homogeneous uniform compositional distributions. Thus, by utilizing the polymerization procedures set forth herein, the novel copolymers of the present invention can be produced. These copolymers, as determined by gel permeation chromatography (GPC) demonstrate narrow molecular weight distributions and substantially homogeneous compositional distributions, or compositional uniformity over the entire range of compositions thereof. Put another way, at least about 95 wt. % of the copolymer product has a para-alkylstyrene content within about 10 wt. %, and preferably within about 7 wt. %, of the average para-alkylstyrene content for the overall composition, and preferably at least about 97 wt. % of the copolymer product has a para-alkylstyrene content within about 10 wt. %, and preferably within about 7 wt. %, of the average para-alkylstyrene content for the overall composition. In a most preferred embodiment hereof, this is demonstrated by the fact that the normalized differential refractive index (DRI) and ultraviolet (UV) curves obtained by GPC for these copolymers are essentially superimposeable on each other and substantially merge into a single curve in most instances. This substantially homogeneous compositional uniformity thus particularly relates to the intercompositional distribution. That is, with the novel copolymers of this invention, as between any selected molecular weight fraction the percentage of para-alkylstyrene therein, or the ratio of para-alkylstyrene to isoolefin, will be substantially the same, in the manner set forth above.

In addition, applicants have also found, however, that since the relative reactivity of para-alkylstyrene with isoolefin such as isobutylene is close to one, the intracompositional distribution of these copolymers will also be substantially homogeneous. That is, these copolymers are essentially random copolymers, and in any particular polymer chain the para-alkylstyrene and isoolefin units will be essentially randomly distributed throughout that chain.

These properties of these copolymers leads to a number of distinct advantages over the prior art, including the ability to produce copolymers having high molecular weights, and in particular having number average molecular weights generally greater than about 25,000, preferably greater than about 50,000, and more preferably greater than about 100,000. These compositions also generally have viscosity average molecular weights greater than about 300,000, preferably greater than about 500,000, such as up to about 1,000,000 or more, or even up to about 2,000,000 or more.

In addition to these high molecular weight products, however, the copolymers of the present invention also include compositionally homogeneous copolymers having a relatively low number average molecular weight. These products also exhibit a relatively narrow molecular weight distribution, i.e., in both their high and low molecular weight forms. In particular, these copolymers thus exhibit $\overline{M}_w/\overline{M}_n$ values of less than about 6, preferably less than about 4, more preferably less than about 2.5, and most preferably less than about 2, and at the same time, depending upon the ultimate intended use thereof, can have low number average molecular weight ($\overline{M}_n$) from about 500 to about 5,000, preferably from about 750 to about 20,000, more preferably from about 1,000 to about 15,000, and preferably from about 1,200 to about 10,000.

The copolymers of the present invention can be compared, for example, to the materials disclosed in the article by Harris et al referred to on page 3 of the specification, as well as the Harris et al U.S. Pat. No. 4,145,190 cited therein. The Harris et al article is like much of the prior art in that it fails to recognize any distinction between the use of para-methylstyrene and the use of vinyl toluene (generally comprising about 60% meta-methylstyrene and about 40% para-methylstyrene). With respect to the compositional uniformity of the product of polymerization thereof, reference can be made to Table V in Harris et al in which the fractionated product is set forth, as well as the further data set forth in the Supplementary Materials mentioned on page 2908 of the Harris et al article. Thus the ratio of isobutylene to para-methylstyrene varies considerably from fraction to fraction, and it is quite clear that the unfractionated material has a highly heterogeneous compositional distribution, as indeed appears to be the case even with the various fractions thereof. This can be contrasted to the highly uniform compositional distribution of the copolymers produced in accordance with the present invention, i.e., even without fractionation. Furthermore, it has also been found that by using the para-methylstyrene of the present invention, polymer termination and/or chain transfer does not occur as rapidly as is the case, for example, using vinyl toluene, thus permitting production of these rather high molecular weight compositions, preferably having molecular weights of commercially significant value. Again in contrast, the unfractionated material produced by Harris et al in Table V thereof has a number average molecular weight of 16,000, and a ratio of $\overline{M}_w/\overline{M}_n$ of 17.45, and furthermore the Supplementary Materials of Harris et al, although referring to $\overline{M}_n$ values far greater than this figure, include ratios of $\overline{M}_w/\overline{M}_n$ greater than those of the present copolymers, and furthermore these figures are in connection with copolymers with para-methylstyrene contents of less than about 1%.

The failure of others to produce the copolymers of the present invention having the homogeneous compositional distributions and molecular weights which applicants have now obtained can be attributed to a variety of factors. These include the failure to recognize the significance of certain aspects of the methods of producing these copolymers which have now been found to be crucial in effecting the realization of these products. Most significant in this regard is the importance of maintaining the copolymerization reactor substantially free of impurities which can complex with the catalyst being used or which can copolymerize with the monomers themselves. There are thus a great number of species which, if present in even trace amounts, will adversely affect cationic polymerization by reducing the polymer molecular weight thereof, broadening the molecular weight distribution, or in extreme cases even preventing polymerization entirely. These species are well known to those skilled in this art, and they function by reacting or complexing with the Lewis Acid polymerization catalyst or the propagating carbenium ion chain carriers. They are thus loosely referred to as "poisons," and they include a large number of Lewis bases such as water, alcohols, ethers, compounds containing carbonyl groups, nitrogen-containing compounds, such as amines, amides, nitriles, etc., and sulfur-containing compounds, such as mercaptans, thioethers, etc. These impurities or poisons also include many olefinic compounds which act as terminators or transfer agents in cationic polymerizations, such as butenes, cyclopentadiene, alpha-diisobutylene, etc., as well as species containing cationically active halogens, such as allylic, tertiary, or benzylic halogens, and basic oxides.

Since this list of impurities or "poisons" is rather extensive, it is generally necessary to carry out careful and elaborate purification processes in order to achieve pure enough materials so as to enable production of high molecular weight polymers by cationic polymerization processes. Therefore, in producing the uniform, narrow molecular weight distribution copolymers and high molecular weight copolymers of the present invention, it is preferred that the para-alkylstyrene be at least 95.0 wt. % pure, and preferably 97.5 wt. % pure, most preferably 99.5 wt. % pure, that the isoolefin be at least 99.5 wt. % pure, and preferably at least 99.8 wt. % pure, and that the diluents employed be at least 99 wt. % pure, and preferably at least 99.8 wt. % pure. Again, however, the "purity" referred to in these preferred figures is understood to be the absence of the impurities or poisons discussed above, and therefore far larger quantities of inert materials are permissible therein. Thus, the isobutylene must not contain more than about 0.5% of such impurities or poisons, but may contain larger quantities of an inert material like butane, or methyl chloride. Again, comparing these important elements of applicants' process for producing these novel copolymers to the Harris et al article, in that case the authors employed impure isobutylene which had merely been prepared by passing it through KOH pellets, which can thus result in variable purity from batch to batch, and in other olefinic materials being present therein, and other such impurities which reduced the overall molecular weight and broadened molecular weight distribution of the product produced by Harris et al by copolymerizing with the monomers therein.

Yet another reason for the failure to previously recognize the process for selective bromination of these copolymers in accordance with the present invention is the failure to appreciate the fact that the specified bromination reaction hereof is highly selective, and can be used to almost exclusively produce benzylic bromine functionality, as compared, for example, to the substitution of the tertiary benzylic hydrogen on each of the enchained para-methyl/styryl moiety, or any of the other replaceable hydrogens thereof. Applicants, on the other hand, have not only recognized this fact, but have produced brominated copolymers of this invention which are almost exclusively mono-substituted on the para-benzylic hydrogen. This, in turn, permits applicants to provide brominated copolymers which are extremely useful in various cross-linking reactions to provide useful products.

The present invention is specifically directed to copolymers of isoolefin having from 4 to 7 carbon atoms, such as isobutylene, and para-alkylstyrene, such as para-methylstyrene. Most particularly, the applicants have discovered such copolymers which have unexpectedly narrow molecular weight distributions and which demonstrate, in the as-polymerized form, substantially homogeneous compositional distributions. Referring specifically to the Figure, a typical GPC chromatograph of a copolymer produced in accordance with this invention is shown therein and illustrates the narrow molecular weight distribution and unexpected compositional uniformity of the para-methylstyrene/isobutylene copolymers hereof. In the Figure the normalized differential refractive index (DRI) and ultraviolet (UV) curves are actually offset from each other so that they can both be seen in the same Figure. However, in actuality the copolymers produced in accordance with this invention are generally so compositionally uniform that without this offset both the DRI and UV curves would be essentially superimposed, and would merge into a single curve. The copolymer which was actually used to generate the Figure was analyzed by gel permeation chromatography (GPC) and is based upon such a copolymer having an $\overline{M}_w$ of 1,160,000 and a very narrow molecular weight distribution of $\overline{M}_w/\overline{M}_n$ of 1.4. However, this Figure is submitted as being typical of such results produced in connection with various such copolymers even having slightly broader molecular weight distributions, as well as for copolymers produced continuously in 1800-gallon reactors, and even in connection with copolymers having para-methylstyrene levels which were increased above the 5 wt. % para-methylstyrene content of the typical copolymer exemplified by the Figure, although at higher para-methylstyrene contents there was a slight broadening of the molecular weight distribution, such as $\overline{M}_w/\overline{M}_n$ of about 2 or more.

The copolymers produced in accordance with the present invention are random and uniform and have narrow molecular weight distributions. Copolymers have also been produced at high molecular weights and can be made at low molecular weights as well. These random copolymers thus have uniformly distributed para-methylstyrene units distributed in all fractions of the copolymer, so that at least about 95 wt. % of the product has a para-methylstyrene content within about 10 wt. % of the overall average para-methylstyrene content. Thus, distributed throughout the copolymer are the para-methylstyrene units:

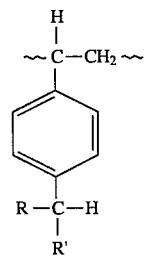

in which R and R' are, independently selected from the group consisting of hydrogen, alkyl, preferably $C_1$ to $C_5$ alkyl, and primary or secondary alkyl halides, preferably primary or secondary $C_1$ to $C_5$ alkyl halides. These copolymers, as discussed above, have molecular weight distributions or $\overline{M}_w/\overline{M}_n$ of less than about 6, preferably less than about 4, more preferably less than about 2.5, and most preferably less than about 2. By having these properties these copolymers thus demonstrate superior properties in terms of better curing, improved shear stability, lower extrusion swell ratios, etc.

With respect to the ratio of the monomers employed to produce these copolymers it is a distinct advantage of the present invention that a very wide range of the ratio of the monomers in the copolymer product can be achieved in accordance with this invention. It is therefore possible for example to produce elastomeric copolymer products which include between about 80 and 99.5 wt. %, preferably between about 80 and 99 wt. %, more preferably between about 80 and 98.5 wt. %, and most preferably between about 80 and 98 wt. % of the isoolefin or isobutylene and between about 0.5 and 20 wt. %, preferably between about 1 and 20 wt. %, more preferably between about 1.5 and 20 wt. %, and most preferably between about 2 and 20 wt. % of the para-alkylstyrene, or preferably para-methylstyrene. On the other hand, it is also possible to produce thermoplastic materials comprising higher concentrations of para-alkylstyrene, and therefore the copolymers include between about 10 and 99.5 wt. %, preferably between about 10 and 99 wt. %, more preferably between about 10 and 98.5 wt. %, and most preferably between about 10 and 98 wt. % of the isoolefin or isobutylene, and between about 0.5 and 90 wt. %, preferably between about 1 and 90 wt. %, more preferably between about 1.5 and 90 wt. %, and most preferably between about 2 and 90 wt. % of the para-alkylstyrene, or preferably para-methylstyrene. This broad potential range of monomer ratios in the copolymer product is another distinct advantage of the present invention.

Isobutylene and para-methylstyrene are readily copolymerized under cationic conditions. The polymerization of the para-methylstyrene and isobutylene can be carried out by means of a Lewis Acid catalyst. Suitable Lewis Acid catalysts (including Friedel-Crafts catalysts) for the process according to the present invention thus include those which show good polymerization activity with a minimum tendency to promote alkylation transfer and side reactions which can lead to branching and the production of crosslinks resulting in gel-containing polymers with inferior properties. The preferred catalysts are Lewis Acids based on metals from Group IIIa, IV and V of the Periodic Table of the Elements, including boron, aluminum, gallium, indium, titanium, zirconium, tin, vanadium, arsenic, antimony, and bismuth. The Group IIIa Lewis Acids have the general formula $R_mMX_n$, wherein M is a Group IIIa metal, R is a monovalent hydrocarbon radical selected from the group consisting of $C_1$ to $C_{12}$ alkyl, aryl, alkylaryl, arylalkyl and cycloalkyl radicals; m is a number from 0 to 3; X is a halogen independently selected from the group consisting of fluorine, chlorine, bromine, and iodine; and the sum of m and n is equal to 3. Nonlimiting examples include aluminum chloride, aluminum bromide, boron trifluoride, boron trichloride, ethyl aluminum dichloride ($EtAlCl_2$), diethyl aluminum chloride ($Et_2AlCl$), ethyl aluminum sesquichloride ($Et_{1.5}AlCl_{1.5}$), trimethyl aluminum, and triethyl aluminum. The Group IV Lewis Acids have the general formula $MX_4$, wherein M is a Group IV metal and X is a ligand, preferably a halogen. Nonlimiting examples include titanium tetrachloride, zirconium tetrachloride, or tin tetrachloride. The Group V Lewis Acids have the general formula $MX_y$, wherein M is a Group V metal, X is a ligand, preferably a halogen, and y is an integer from 3 to 5. Nonlimiting examples include vanadium tetrachloride and antimony pentafluoride.

The preferred Lewis Acid catalysts may be used singly or in combination with co-catalysts such as Bronsted Acids, such as anhydrous HF or HCl, or alkyl halides, such as benzyl chloride or tertiary butyl chloride. In particular, the most preferred catalysts are those which can be classified as the weaker alkylation catalysts, and these are thus the weaker Lewis Acids from among the catalysts set forth above. These most preferred catalysts, such as ethyl aluminum dichloride and preferably mixtures of ethyl aluminum dichloride with diethyl aluminum chloride, are not the catalysts that are normally preferred for use in conventional alkylation reactions, since again in the present case there is a strong desire to minimize side reactions, such as the indanyl ring formation which would be more likely to occur with those catalysts normally used to promote conventional alkylation reactions. The amount of such catalysts employed will depend on the desired molecular weight and the desired molecular weight distribution of the copolymer being produced, but will generally range from about 20 ppm to 1 wt. %, and preferably from about 0.001 to 0.2 wt. %, based upon the total amount of monomer to be polymerized therein.

Suitable diluents for the monomers, catalyst components and polymeric reaction products include the general group of aliphatic and aromatic hydrocarbons, used singly or in admixture, and $C_1$ to $C_6$ halogenated hydrocarbons used in admixture with hydrocarbon diluents in an amount up to about 100% by volume of the total diluent fed to the reaction zone. Typically, when the monomers are soluble in the selected diluent the catalyst may not necessarily also be soluble therein.

The processes of the present invention can be carried out in the form of a slurry of polymer formed in the diluents employed, or as a homogeneous solution process. The use of a slurry process is, however, preferred, since in that case lower viscosity mixtures are produced in the reactor, and slurry concentrations of up to 40 wt. % of polymer are possible. At higher slurry concentrations it is possible to operate a more efficient process in which it is necessary to recycle less of the reactants and diluent for each unit of polymer produced. For instance, at 33% slurry concentration it is only necessary to recycle two units of unreacted reactants and diluent for each unit of polymer. In any event, the amount of diluent fed to the reaction zone should be sufficient to maintain the concentration of polymer in the effluent leaving the reaction zone below about 60 wt. %, and preferably between the range of about 5 and 35 wt. %, depending upon the process being used and the molecular weight of polymer being produced. Too high a concentration of polymer is generally undesirable for several reasons, including poor temperature control, rapid reactor fouling, and the production of gel. Polymer concentrations which are too high will raise the viscosity in the reactor and require excessive power input to insure adequate mixing and the maintenance of effective heat transfer. Such inadequate mixing and loss of heat transfer efficiency can thus result in localized high monomer concentrations and hot spots in the reactor which can in turn cause fouling of reactor surfaces. However, the prior art tendency for gel production at higher polymer concentrations when producing diene-functional butyl rubbers (e.g., isobutylene-isoprene copolymer) is substantially eliminated in accordance with the present process with para-methylstyrene as the functional monomer. In any event, typical examples of the diluents which may be used alone or in admixture include propane, butane, pentane, cyclopentane, hexane, toluene, heptane, isooctane, etc., and various halohydrocarbon solvents which are particularly advantageous herein, including methylene chloride, chloroform, carbon tetrachloride, methyl chloride, with methyl chloride being particularly preferred.

It should also be noted that with any particular monomers (for example, isobutylene and para-methylstyrene), as the compositional distribution of the feed is altered therebetween, in order to maintain either a slurry or solution polymerization it can be necessary to change the diluents employed, depending upon the effect on the solubility of the copolymer in the diluent as the ratio of the monomers utilized therein is altered. In any event, as noted above an important element in the present invention is the exclusion of impurities from the polymerization reactor, namely impurities which, if present, will result in complexing with the catalyst or copolymerization with the isoolefins or the para-alkylstyrenes, which, in turn, will prevent one from producing the improved copolymer products of the present invention. Instead, products which do not have the substantially homogeneous compositional distributions and/or narrow molecular weight distributions of the present invention, will be produced. Most particularly, these impurities include the catalyst poisoning materials, moisture, and other copolymerizable monomers, such as, for example, meta-alkylstyrenes and the like. These impurities should be kept out of the system so that, in turn, the para-alkylstyrene is at least about 95.0 wt. % pure, preferably at least about 97.5 wt. % pure, most preferably at least about 99.5 wt. %, the isoolefin is at least about 99.5 wt. % pure, and preferably at least about 99.8 wt. % pure, and the diluents employed therein are at least about 99.0 wt. % pure, and preferably at least about 99.8 wt. % pure.

In general, the polymerization reactions of the present invention are carried out by admixing the para-methylstyrene and isobutylene in the presence of the catalyst (such as a Lewis Acid catalyst) and diluent in a copolymerization reactor, with thorough mixing, and under copolymerization conditions, including temperatures of at least less than about 0° C., in the case of lower molecular weight polymers, and providing a means of removing the heat of polymerization in order to maintain a desired reactor temperature. In particular, the polymerization may be carried out under batch conditions of cationic polymerization, such as in an inert gas atmosphere and the substantial absence of moisture. Preferably the polymerization is carried out continuously in a typical continuous polymerization process using a baffled tank-type reactor fitted with an efficient agitation means, such as a turbo-mixer or propeller, and draft-tube, external cooling jacket and internal cooling coils or other means of removing the heat of polymerization, inlet pipes for monomers, catalysts and diluents, temperature sensing means and an effluent overflow to a holding drum or quench tank. The reactor must be purged of air and moisture and charged with dry, purified solvent or a mixture of solvents prior to introducing monomers and catalyst.

Reactors which are typically used in butyl rubber polymerizations are generally suitable for use in the polymerization reactions of the present invention, These reactors are basically large heat exchangers in which the reactor contents are rapidly circulated through rows of heat exchange tubes which are surrounded by boiling ethylene so as to remove the heat of polymerization, and then through a central draft tube by means of an efficient marine-type impellor. Catalyst and monomers are introduced continuously into the reactor and mixed by the pump, and reactor effluent then overflows into a steam-heated flash tank. Heat of polymerization can also be removed by a pump-around loop in which the reactor contents are continuously circulated through an external heat exchanger in such a pump-around loop.

When conducting a slurry polymerization process the reactor is generally maintained at temperatures of between about −85° and −115° C., and preferably between about −89° and −96° C. Solution polymerizations and cement suspension polymerizations can be run at much warmer temperatures, such as about −40° C., depending on the copolymer molecular weight desired and the particular catalyst system used. Therefore, an acceptable solution polymerization temperature range is about −35° C. to about −100° C., and preferably about −40° C. to about −80° C.

The overall residence time can vary, depending upon, e.g., catalyst activity and concentration, monomer concentration, reaction temperature, and desired molecular weight, and generally will be between about one minute and five hours, and preferably between about 10 and 60 minutes.

Since the reactor does gradually foul with polymer in the slurry polymerization process, however, it does generally become necessary to periodically remove the reactor from production for cleaning. It is thus most important that the fouling polymer be soluble, so that the reactor can be cleaned by solvent washing and then returned to service. Any deposition of insoluble "gel" polymer in the reactor would be unacceptable, since it would render solvent washing ineffective, and necessitate the use of elaborate and expensive reactor cleaning procedures. This necessity to avoid the deposition of a polymer "gel" in the reactor is one of the limitations on the amount of diene which can be used in making butyl rubbers, (e.g., isobutylene-isoprene copolymer).

Use of too much diene produces such a "gel," which renders reactor cleaning difficult, as well as degrading product quality. Crosslinking to produce such a gel occurs more readily in the precipitated polymer phase, where the chains are in far more intimate contact than in the diluent phase, where the chains are separated by diluent molecules. Such crosslinking occurs most readily in polymer film precipitated on the reactor surfaces, since these films remain in contact with the active catalyst during the entire polymerization run. This tendency to form "gel" is a consequence of the reactivity, under polymerization conditions (in the presence of active catalyst) of the olefinic double bond produced in the butyl polymer backbone by incorporation of the diene. It is also this very same double bond which provides the functionality necessary for vulcanization of the product butyl rubbers. One of the major advantages of copolymerizing para-methylstyrene instead of a diene with isobutylene is that no olefinic unsaturation is introduced into the polymer backbone during such polymerization. Therefore, no such gel is produced, even at very high para-methylstyrene incorporation levels. It is thus possible to produce isobutylene/para-methylstyrene copolymers over the entire composition range without "gel" production and without depositing "gel" in the reactor to a degree which renders cleaning difficult. In the case of para-methylstyrene as the comonomer the crosslinkable active functionality is not introduced thereinto until the copolymer is functionalized, e.g., halogenated, in a subsequent post-polymerization step. Therefore, this active functionality is not present during polymerization, and cross-linking and gel formation are not encountered at any para-methylstyrene level.

Another advantage of the use of para-methylstyrene as a comonomer with isobutylene, again as compared to dienes typically used in butyl rubber, is that its reactivity is very similar to that of isobutylene over a broad range of polymerization conditions. Therefore, substantially truly random copolymers are produced with the polymer composition being essentially the same as feed composition, independent of conversion. (Throughout the specification the polymers of this invention will be referred to as random.) The commonly used dienes, on the other hand, are much less reactive than isobutylene (i.e., $r_1$, ~2.5±0.5 for isobutylene/isoprene copolymers and $r_1$, ~115±15 for isobutylenes/butadiene copolymers, where $r_1$ is the reactivity of the isobutylene with itself as compared to isobutylene with the comonomer) so that the copolymer is much leaner in the diene than in the feed, and the polymer composition therefore changes with conversion. Furthermore, copolymer molecular weight is depressed far more in the case of the dienes than with para-methylstyrene, so that it is therefore necessary to operate at higher steady-state monomer levels (i.e., lower conversions) in order to achieve high molecular weight copolymers, and this, coupled with the low reactivity of the diene, means even lower conversion of the diene, hence necessitating the far more costly and difficult recovery and recycle discussed above. As discussed above, the diene level must also be limited to avoid the formation of "gel." The use of para-methylstyrene as a comonomer with isobutylene thus permits high molecular weight copolymers to be produced, at high conversion of both monomers, over the entire composition range, with polymer composition directly determined by feed composition, rather than also being a function of conversion and other variables, as is the case when dienes are used as the comonomers.

While the above-described advantage of slurry polymerization in enabling high polymer concentration to be handled at low viscosity, and hence with good heat transfer, has already been cited, and is the reason a slurry process is usually preferred, the copolymers of the present invention can be produced utilizing solution polymerization. Solution polymerization provides the opportunity for reduced reactor fouling, homogeneous polymerization and/or the convenience of subsequent reactions to be run directly on the resulting polymer solution. The copolymers of the present invention can also be prepared using a cement suspension polymerization process.

The new para-methylstyrene/isobutylene copolymers of this invention also afford significant advantages when produced using a solution polymerization process. Since para-methylstyrene does not cause the severe molecular weight depression characteristic of dienes, and since the molecular weight vs. polymerization temperature response of these new copolymers is much flatter than with diene functional butyl copolymers, high molecular weight copolymers can be made at much warmer temperatures (i.e., about −40° C. vs. less than about −90° C. with the diene functional butyl copolymers). These warmer polymerization temperatures translate into a much lower viscosity at any given polymer concentration and molecular weight. In particular, it is now possible to conduct these solution polymerizations at temperatures of from about −35° C. to about −100° C., and preferably from about −40° C. to about −80° C. When producing the low molecular weight polymers of this invention, for example, $\overline{M}_n$ of less than 25,000, temperatures as warm as 0° C. can be used, or even up to about +10° C. for very low molecular weight polymers with $\overline{M}_n$ in the range of about 500 to 1,000 $\overline{M}_n$. Furthermore, the para-methylstyrene/isobutylene copolymers have a much narrower molecular weight distribution than do the diene functional butyl rubbers, and this also results in a much lower solution viscosity at a given number average molecular weight.

Solution polymerization has the further advantage, particularly with the para-methylstyrene/isobutylene copolymers of this invention, in that the copolymers are produced in a desirable solution state to permit post polymerization chemical modification, and as pointed out above, it is the post-polymerization modified (e.g., halogenated) copolymers which are of most interest in many end uses. It is also possible to perform these post-polymerization reactions on polymer in the bulk state (i.e., using an internal mixer, extruder, etc.), but many reactions can be more easily performed in a more controlled manner on polymer solutions, which afford better mixing, heat transfer, removal of unwanted by-products, etc. In addition, certain reactions which utilize the "live" polymer chains produced during polymerization cannot be run on bulk polymer recovered from the reactor, and are best run in conjunction with solution polymerization.

The polymerization processes of the present invention can also be carried out in the form of a so-called "cement suspension" polymerization process. In particular, these are polymerization reactions carried out in a selected diluent such that the polymer is only slightly soluble in the diluent, and the diluent is sufficiently soluble in the polymer so that a second phase is formed which contains substantially all of the polymer, but wherein the continuous phase or diluent phase has a sufficiently low viscosity so that the second or polymer-rich phase can be dispersed therein. In one form of these cement suspension polymerizations they are carried out in such a diluent whose lower critical solution temperature for the polymer to be prepared is below the temperature at which the reaction is to be carried out. The lower critical solution temperature, in turn, is defined as the temperature above which the polymer is no longer soluble in a solvent. In addition, in accordance with these processes, it would be appreciated that as the temperature of a solution of polymer and diluent is increased, a temperature will be reached above which the polymer is no longer soluble. If maintained at this temperature, separation of two phases will occur with generally the lower portion being a heavier polymer-rich phase and the upper portion being a lighter solvent-rich phase. This phenomenon can thus be utilized to separate polymers from solution in conventional solution polymerization processes as discussed above. In any event, to achieve the desirable two-phase "cement suspension" it is necessary that the light phase be a very poor solvent for the polymer to maintain low viscosity, and that the polymer-rich heavy phase separate out and contain enough solvent so it behaves as a liquid and can be dispersed in the light phase. The particular details of such cement suspension processes are set forth in U.S. Pat. No. 3,932,371, and the description of same is incorporated herein by reference thereto.

An example of a post-polymerization chemical modification reaction that can be run on bulk recovered polymer, and can also be run on polymer solution produced in a solution polymerization process (after suitable quenching and removal of residual monomers) is halogenation (e.g., radical bromination) to produce the very versatile benzylic halogen-functional copolymers described herein. The surprising ease and highly selective nature of radical halogenation to introduce a benzylic halogen, and the great versatility of the benzylic halogen, makes this a most preferred modification reaction.

Functionality introducing reactions such as halogenation are carried out on the para-methylstyrene/isobutylene copolymers produced by any of the above polymerization methods in a separate post-polymerization step, with direct halogenation, and most preferably radical halogenation, being the preferred reaction. It is generally desirable to treat the polymerization copolymer product in an appropriate manner, prior to such halogenation, in order to quench the catalyst and/or remove catalyst residues, remove residual unconverted monomers, and put it into a convenient form for the halogenation reaction.

It is nearly always desirable to quench the catalyst in the reactor effluent in order to prevent continued polymerization, with the concomitant production of low molecular weight ends and/or to prevent degradation and cross-linking reactions from occurring as the effluent is warmed. This quenching can be accomplished in a conventional manner. Generally speaking, with the aluminum-based catalysts usually employed in making the copolymers of this invention and with the high catalyst efficiencies achieved, a separate catalyst residue removal step is not required, but much of this residue is extracted into the water phase in conjunction with conventional water-based finishing processes anyway.

Residual unconverted monomers left in the copolymer will react during halogenation to both consume halogen and produce generally undesirable by-products, and their presence thus renders it difficult to control and measure the amount of desired functionality introduced into the copolymer. Hence, except in cases where the copolymer has been polymerized at very high conversion, it is usually necessary to remove these residual monomers. Unreacted isobutylene is volatile enough to be easily removed in any of a variety of stripping operations, but para-methylstyrene, with its high boiling point of 170° C., is much more difficult to remove. It is therefore advantageous to polymerize at very high para-methylstyrene conversion levels so that its removal and/or recycle becomes unnecessary or, at least involves smaller amounts of material.

The halogenation reaction itself can be carried out in the bulk phase or on copolymer either in solution or in a finely dispersed slurry. Bulk halogenation can be effected in an extruder, or other internal mixer, suitably modified to provide adequate mixing and for handling the halogen and corrosive by-products of the reaction. It has the advantages of permitting complete removal of residual unreacted para-methylstyrene by conventional finishing operations prior to halogenation, and of avoiding possible diluent halogenation as an undesired side reaction. It has the disadvantages of requiring a much more expensive and high powered reactor (i.e., extruder) than is required for solution halogenation, and of providing poorer mixing, thermal control, etc., than can be achieved in solution, so that the halogenation reaction is conducted under less homogeneous, more difficult to control conditions. The details of such bulk halogenation processes are set forth in U.S. Pat. No. 4,548,995, which is incorporated herein by reference thereto.

Solution halogenation is advantageous in that it permits good mixing and control of halogenation conditions to be achieved, easier removal of undesired halogenation by-products, and a wider range of initiators of halogenation to be employed. Its disadvantages include the need for removal of residual unreacted para-methylstyrene prior to halogenation, the presence of complicating side reactions involving solvent halogenation, and a solution step if a non-solution polymerization process is used to prepare the copolymer, as well as removal, clean-up and recycle of the solvent. Suitable solvents for such halogenation include the low boiling hydrocarbons ($C_4$ to $C_7$) and halogenated hydrocarbons. The halogenation can also be conducted with the copolymer as a fine slurry or cement suspension in a suitable diluent which is a poor solvent for the copolymer. This is advantageous from a viscosity viewpoint and allows high solids content during halogenation, but it does require that the slurry or suspension be stable with little tendency to agglomerate or plate out on reactor surfaces. Since the high boiling point para-methylstyrene makes its removal by conventional distillation impractical, and since it is difficult to completely avoid solvent halogenation, it is very important where solution or slurry halogenation is to be used that the diluent and halogenation conditions be chosen to avoid diluent halogenation, and that residual para-methylstyrene has been reduced to an acceptable level.

Halogenation of the para-methylstyrene isobutylene copolymers of this invention is significantly different from halogenation of isobutylene-isoprene (butyl) rubbers because the primary reactive site for halogenation is entirely different. The para-methylstyrene/isobutylene copolymers contain no in-chain (backbone) olefinic unsaturation contribution from the para-methylstyrene, and the primary reactive halogenation site is thus the enchained para-methylstyrene moiety, which is far less reactive than the olefinic site in butyl rubber. Furthermore, since the broad range of copolymer compositions of the present invention can include para-methylstyrene contents of greater than 20%, and up to about 90%, the potential for such reactive sites is clearly increased. Under typical butyl rubber halogenation conditions, however (e.g., dark, non-catalyzed reactions, in a hydrocarbon solvent, at low temperature (such as less than about −80° C.) and for short contact times (such as less than about 10 minutes)) no detectable halogenation of the para-methylstyrene copolymer even occurs. Furthermore, while it is possible to chlorinate para-methylstyrene copolymers in a polar diluent, the chlorinated species produced are entirely different than in the case of isobutylene-isoprene (butyl) rubber. Such chlorinated species of the present invention include chlorine on the aromatic ring, and on the polymer backbone, as well as the preferred primary benzylic chlorination, in contrast to the chlorination of the olefinic sites in the prior art copolymers.

With halogenation of para-methylstyrene/isobutylene copolymers, it is possible to halogenate the ring carbons, but the products are rather inert and of little interest. It has surprisingly been found, however, that it is possible to introduce this desired functionality into the para-methylstyrene/isobutylene copolymers hereof in high yields and under practical conditions without obtaining excessive polymer breakdown, cross-linking or other undesirable side reactions.

When halogenation of the para-methylstyrene/isobutylene copolymers hereof is carried out without using the specified selected reaction conditions, catalysts, reagents and initiators hereof, it tends to either not occur at all, or to proceed by various routes, so as to produce a variety of halogenated products. Thus, if chlorine or bromine is added to a solution of para-methylstyrene/isobutylene copolymer in a low dielectric constant hydrocarbon solvent, such as hexane or cyclohexane, in the dark at 30°–60° C. for about five minutes, essentially no reaction occurs. On the other hand, if the chlorination reaction is run in a more polar (higher dielectric constant) diluent, such as methylene chloride, then chlorination does occur, but apparently by many different routes, so that a variety of different chlorinated products are produced thereby. These include some of the highly desirable primary benzylic chlorine resulting from substitution on the ring methyl group, but a major amount of less desirable chlorinated products.

It is known in connection with the halogenation of small molecules that the side chain halogenation of alkyl-substituted benzenes, as opposed to nuclear substitution, is favored by radical instead of ionic conditions. This might therefore be said to suggest that such radical conditions, including the avoidance of Friedel-Crafts catalysts (or metallic halogenation catalysts in general), the avoidance of polar diluents, and the use of photochemical, thermal, or other radical initiators, would be preferred for the selective halogenation of the copolymers hereof. However, it is also known that the halogenation of polymers does not necessarily follow the same routes as that of these small molecules, particularly since even minor side reactions can be extremely significant. Furthermore, it is known that, in radical halogenation, with concurrent hydrogen replacement, tertiary hydrogens are more easily replaced than are secondary hydrogens, which are more easily replaced than are primary hydrogens. Therefore, it might be expected that the tertiary benzylic hydrogens would be more easily replaced than the primary benzylic hydrogens on the enchained para-methyl/styryl moiety in the copolymers hereof.

It has rather surprisingly been found, however, that radical bromination of the enchained para-methyl styryl moiety in the copolymers of this invention can be made highly specific with almost exclusive substitution occurring on the para-methyl group, to yield the desired benzylic bromine functionality. The high specificity of the bromination reaction can thus be maintained over a broad range of reaction conditions, provided, however, that factors which would promote the ionic reaction route are avoided (i.e., polar diluents, Friedel-Crafts catalysts, etc.).

Thus, solutions of the para-methylstyrene/isobutylene copolymers of this invention in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer hydrogenation temperatures) as promoters of radical halogenation, to yield almost exclusively the desired benzylic bromine functionality, via substitution on the para-methyl group, and without appreciable chain scisson and/or cross-linking. Without wishing to be bound by any theory, it is believed that the bromination reaction proceeds by means of a rapid radical chain reaction with the chain carrier being, alternatively, a bromine atom and a benzylic radical resulting from hydrogen atom abstraction from a para-methyl group on the enchained para-methylstyryl moiety. The proposed mechanism thus involves the following steps:

1. Initiation

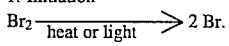

or

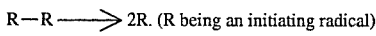 (R being an initiating radical)

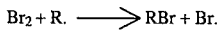

2. Chain Reaction

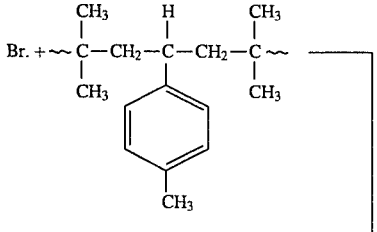

3. Chain Reaction

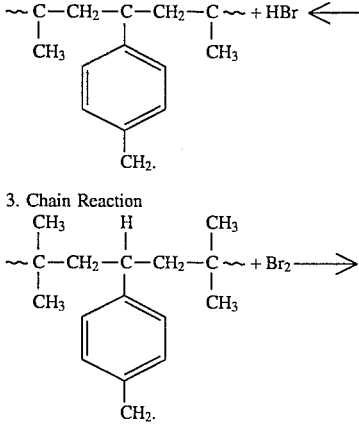

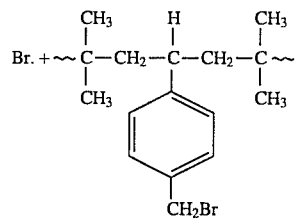

The reaction terminates when one of the radicals reacts with some radical trap in the system, or the radicals destroy themselves by recombination or disproportionation.

This reaction can be initiated as shown in step (1) above by formation of a bromine atom, either photochemically or thermally (with or without the use of sensitizers), or the radical initiator used can be one which preferentially reacts with a bromine molecule rather than one which reacts indiscriminately with bromine atoms, or with the solvent or polymer (i.e., via hydrogen abstraction). The sensitizers referred to are those photochemical sensitizers which will themselves absorb lower energy photons and disassociate, thus causing, in turn, disassociation of the bromine, including materials such as iodine. It is thus preferred to utilize an initiator which has a half life of between about 0.5 and 2500 minutes under the desired reaction conditions, more preferably about 10 to 300 minutes. The amount of initiator employed will usually vary between 0.02 and 1% by weight on the copolymer, preferably between about 0.02 and 0.3%. The preferred initiators are bis azo compounds, such as azo bis isobutyronitrile, azo bis (2,4 dimethyl valero) nitrile, azo bis (2 methyl butyro) nitrile, and the like. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. In those cases, there would then tend to be resultant copolymer molecular weight loss, and promotion of undesirable side reactions, such as cross-linking. The radical bromination reaction of this invention is highly selective, and almost exclusively produces the desired benzylic bromine functionality. Indeed, the only major side reaction which appears to occur is disubstitution at the para-methyl group, to yield the dibromo derivative, but even this does not occur until more than about 60% of the enchained para-methylstyryl moieties have been monosubstituted. Hence, any desired amount of benzylic bromine functionality in the monobromo form can be introduced into the copolymers of this invention, up to about 60 mole % of the para-methylstyrene content. Furthermore, since the para-methylstyrene content can be varied over a wide range as described herein, it is possible to therefore introduce a significant functionality range. The halogenated copolymers of this invention are thus highly useful in subsequent reactions, for example cross-linking reactions.

It is desirable that the termination reactions discussed above be minimized during bromination, so that long, rapid radical chain reactions occur, and so that many benzylic bromines are introduced for each initiation, with a minimum of the side reactions resulting from termination. Hence, system purity is important, and steady-state radical concentrations must be kept low enough to avoid extensive recombination and possible cross-linking. The reaction must also be quenched once the bromine is consumed, so that continued radical production with resultant secondary reactions (in the absence of bromine) do not then occur. Quenching may be accomplished by cooling, turning off the light source, adding dilute caustic, the addition of a radical trap, or combinations thereof.

Since one mole of HBr is produced for each mole of bromine reacted with or substituted on the enchained para-methylstyryl moiety, it is also desirable to neutralize or otherwise remove this HBr during the reaction, or at least during polymer recovery in order to prevent it from becoming involved in or catalyzing undesirable side reactions. Such neutralization and removal can be accomplished with a post-reaction caustic wash, generally using a molar excess of caustic on the HBr. Alternatively, neutralization can be accomplished by having a particulate base (which is relatively non-reactive with bromine) such as calcium carbonate powder present in dispersed form during the bromination reaction to absorb the HBr as it is produced. Removal of the HBr can also be accomplished by stripping with an inert gas (e.g., $N_2$) preferably at elevated temperatures.

The brominated, quenched, and neutralized para-methylstyrene/isobutylene copolymers of this invention can be recovered and finished using conventional means with appropriate stabilizers being added to yield highly desirable and versatile functional saturated copolymers which are useful in many reactions and applications.

In particular, since little if any tertiary benzylic bromine is produced in the copolymer molecule, the potential dehydrohalogenation reaction will be almost entirely eliminated therein. This results in a halogenated polymer of improved stability. In addition, presence of the bromine on the ring-methyl group leads to several additional significant advantages with respect to this product. Firstly, it permits functionalization by substitution of other functional groups at that site. More particularly, the highly reactive nature of the halogen in the halomethyl group attached to an aromatic ring makes it a particularly desirable functionality to enhance and extend the usefulness of these copolymers in a range of applications. The presence of aromatic halomethyl groups in the copolymer permits cross-linking in a variety of ways under mild conditions.

The aromatic halomethyl groups permit facile cross-linking to be accomplished in a variety of ways, for example, either directly through the halomethyl group or by conversion to other functional groups, as indicated above, to permit the desired cross-linking reactions to be employed. Direct cross-linking can be effected with a variety of polyfunctional nucleophilic reagents such as ammonia, amines, or polyamines; metal dicarboxylates; metal dithiolates; promoted metal oxides (i.e., ZnO+dithiocarbamates), etc. Cross-linking can also be effected via polyalkylation reactions. The aromatic halomethyl groups thus provide a wide choice of cross-linking reactions to be used.

One of the advantages of a polyisobutylene polymer incorporating phenyl rings (and no backbone unsaturation) is that greatly enhanced ozone resistance can be achieved to enable a polyisobutylene-based rubber to compete more effectively with ethylene-propylene diene monomer (EPDM) rubbers in those uses requiring complete ozone resistance. The backbone unsaturation introduced into the current polyisobutylene-based elastomers (i.e., butyl rubbers) by the copolymerized isoprene moiety is the site for ozone attack, and ozone resistance of butyl rubbers deteriorates rapidly as more and more isoprene is incorporated. Even at the lowest isoprene levels required to permit vulcanization, ozone resistance is still inferior to that afforded by the fully saturated backbone of EPDM rubbers. Elimination of the isoprene with the cross-linking sites being provided by functionalized phenyl rings provide a saturated isobutylene-based rubber with ozone resistance comparable to EPDM as well as with improved oxidative resistance. In addition, the presence of the phenyl rings enhances the UV resistance of polyisobutylene to reduce surface degradation and tack development during outdoor exposure to sunlight. Furthermore, functionalization via the phenyl rings permits more thermally stable cross-links to be produced than the sulfur linkages formed with typical accelerated sulfur vulcanization of commercial isoprene unsaturated butyl rubbers, so that more thermally stable vulcanizates (limited only by chain backbone stability) can be produced. General overall aging and weathering resistance is superior to the isoprene unsaturated butyl rubbers.

Still another disadvantage of diene functional polyisobutylene (typical butyl rubbers) is their limited ability to covulcanize with general purpose rubbers (GPR) (e.g., highly unsaturated rubber, such as natural rubber, styrene-butadiene rubber, etc.), or even to vulcanize at all in contact with, or in blends with highly unsaturated rubbers. The limited diene functionality in typical butyl rubbers cannot compete effectively in vulcanization reactions with the general purpose rubbers, and these rubbers act as a sink for the curatives which migrate out of the butyl phase and into the unsaturated rubber to leave curative starved, virtually unvulcanized butyl in areas where it is in contact with the unsaturated rubber. This problem is overcome to some extent by halobutyl of the prior art (e.g., brominated and chlorinated butyl) which are capable of vulcanization by independent mechanisms. Even so, only limited covulcanization with GPR is achieved with halogenated butyl and their halogen functionality is limited because of the problems already discussed related to incorporating more than 3–4 mole diene (the site for halogenation) into butyl rubbers. Polyisobutylene-based elastomers functionalized through phenyl groups can have a much higher concentration of functionality and functionality more amenable to true covulcanization with GPR (i.e., thiol groups capable of reacting with the double bonds of the GPR can be attached to the aromatic rings to permit true covulcanization rather than simply simultaneous vulcanization of two dissimilar rubbers).

The present invention is most particularly based upon a specific class of graft copolymers which have a wide range of properties, and which are also extremely useful in the compatibilization of certain polymer blends. Most particularly, these graft copolymers can be formed with high graft-on efficiency, and for this reason the resulting copolymers are completely soluble in common organic solvents. Thus, it has been found possible to prepare these relatively well-defined graft copolymers, which include covalent bonds between the two homopolymers with no detectable homopolymers and gel particles. Thus, when using these graft copolymers as compatibilizers, it has been found that they can serve as emulsifiers at the interface between the two polymer domains, thus greatly changing the morphology of these blends. Thus, the macro phase separation between the two incompatible copolymers is altered and the phase size can be dramatically reduced. For example, thermoplastic domain sizes as small as about 5 nm are possible.

The specific graft copolymers which have been produced in accordance with this invention are most particularly graft copolymers of polyisobutylene. However, the specific type of electrophile which forms a basis for these graft copolymers is a copolymer of an isoolefin having from 4 to 7 carbon atoms and a para-alkylstyrene having the formula

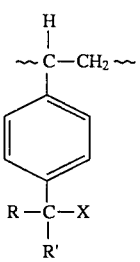
(III)

wherein X is a halogen and R and R' are independently selected from the group consisting of hydrogen, alkyl, and primary and secondary alkylhalides. It has thus been discovered that these electrophiles can now be readily used in a nucleophilic substitution reaction having the form

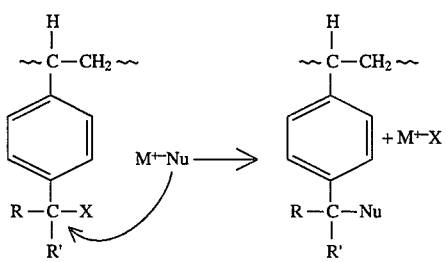

with an appropriate nucleophile to produce the graft copolymers hereof. These nucleophiles (Nu) have the form Nu=y–P and can also be derived from M(y–P) wherein M is a metal ion, such as an alkali or alkaline earth metal (e.g., sodium, potassium, lithium or magnesium) or an onium ion, such as tetramethylammonium, and P is a thermoplastic polymer which is available as:

(a) The family of anionically polymerizable monomers which include, but are not limited to, vinyl aromatic compounds such as styrene, alpha-methylstyrene, para-methylstyrene, vinyl toluene and its isomers; vinyl unsaturated amides, such as acrylamide, methacrylamide, N,Ndialkylacrylamides; acenaphthylene; 9-acrylcarbazole; acrylonitrile and methacrylonitrile; organic isocyanates; alkyl acrylates and methacrylates, including methyl and tert-butyl acrylates and methacrylates; vinyl pyridines; copolymers with monomers which do not homopolymerize, such as 1,1-diphenylethylene; and random and block copolymers of the above thermoplastic forming monomers and low levels of conjugated diene monomers including isoprene and butadiene.

(b) the family of monomers which undergo anionic or cationic ring-opening polymerizations, which includes cyclic ethers, cyclic sulfides, lactones, lactans, N-carboxyanhydrides, and ring-opening copolymerizations, such as the copolymerization of ethylene oxide with succinic and hydride;

(c) the family of monomers which undergo oxidative coupling, which is substantially composed of alkyl-substituted phenols; and (d) the polyolefin family, primarily polypropylene and high polypropylene content copolymers, which are reacted with maleic or himicin hydride, a N-hydride, and a radical generator.

It has thus been discovered that these electrophiles can now be readily used in a nucleophilic substitution reaction with an appropriate nucleophile to produce the graft copolymers hereof. These nucleophiles (Nu) are thus produced by anionic polymerization of the olefinic polymers hereof, namely those having the formula (II)

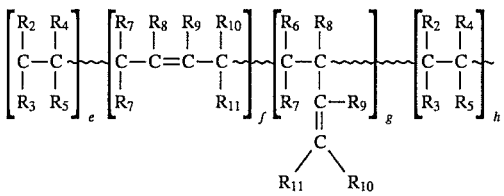

wherein $R_2$ and $R_3$ comprise a component selected from the group consisting of aryl, diaryl, polyaryl, and the alkyl, aryl, alkaryl, alkoxy, cycloalkyl, aryloxy and dialkylamino derivatives of the aryl, diaryl, or polyaryls, wherein $R_4$ through $R_{11}$ are independently selected from the group consisting of hydrogen, alkyl, and substituted alkyl, f ranges from 0 to about 20,000, g ranges from 0 to about 20,000, and h ranges from 0 to about 10,000, with the further proviso that the sum of f+g+h ranges from about 20 to about 20,000, y comprises a linked nucleophilic residue, and furthermore, wherein either (a) $R_1$ is $(CH_2)_m$, wherein m is a positive integer, and e is 0 or 1, or (b) $R_1$ is $(CH_2)_m$, wherein m is 0, and e ranges from 0 to about 1,000, and grafting said nucleophile onto said electrophile. Thus, useful nucleophiles are based on, for example, polyisoprene, polybutadiene, polydimethylbutadiene and styrene-butadiene copolymer rubbers, including block and random (SBR) copolymer rubbers.

In addition, y is the linked nucleophilic residue, in which the nucleophilic functionality has the form

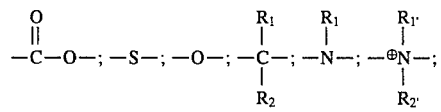

wherein $R_1$, $R_2$, $R_{1'}$, and $R_{2'}$ are independently selected from the group consisting of hydrogen, aryl and alkyl. The nucleophilic residue can also be derived from M(y–P) where M comprises a metal ion or onium ion, such as tetraalkylammonium, preferably tetramethylammonium or tetrabutylammonium, and grafting said nucleophile onto said electrophile.

The polymeric electrophile used for producing the graft copolymers of this invention are, as stated above, copolymers of isoolefins having from 4 to 7 carbon atoms and para-alkylstyrene compounds of Formula (III) above. These copolymers can be produced in a manner such as previously defined herein.

The nucleophilic substituents of the present invention are prepared using anionic polymerization techniques. The specific types of monomers which can be used to produce these nucleophiles generally yield attached polymeric nucleophiles having the following formula:

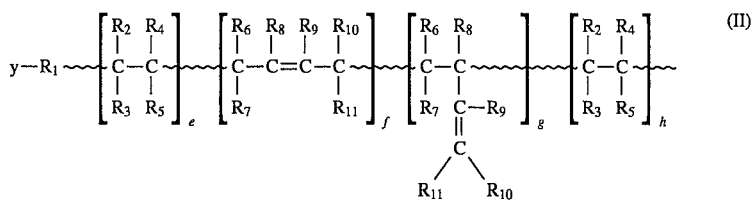

wherein $R_2$ and $R_3$ comprise a component selected from the group consisting of aryl, diaryl, polyaryl, and the alkyl, aryl, alkaryl, alkoxy, cycloalkyl, aryloxy and dialkylamino derivatives of the aryl, diaryl, or polyaryls, wherein $R_4$ through $R_{11}$ are independently selected from the group consisting of hydrogen, alkyl, and substituted alkyl, f ranges from 0 to about 20,000, g ranges from 0 to about 20,000, and h ranges from 0 to about 10,000, with the further proviso that the sum of f+g+h ranges from about 20 to about 20,000, y comprises a linked nucleophilic residue, and furthermore, wherein either (a) $R_1$ is $(CH_2)_m$, wherein m is a positive integer, and e is 0 or 1, or (b) $R_1$ is $(CH_2)_m$, wherein m is 0, and e ranges from 0 to about 1,000.

Thus, in the case (a) where e is 0, the nucleophilic substituent will preferably have the formula

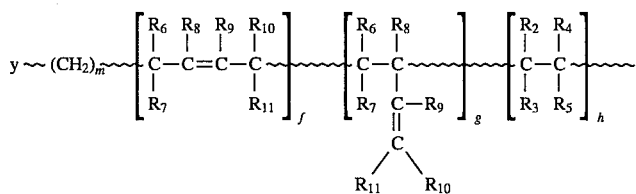

and a highly preferred embodiment of this nucleophilic substituent is where $R_4$ through $R_{11}$ are hydrogen.

In the case (b) where m is 0, the nucleophilic substituent will preferably have the formula

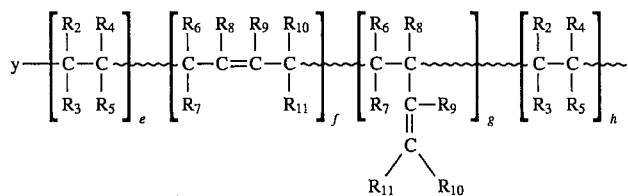

and a highly preferred embodiment of this nucleophilic substituent is where $R_4$ through $R_{11}$ are hydrogen; or where one of $R_6$ through $R_{11}$ is aryl, such as $R_8$, and this substituent is thus prepared from phenyl, -1,3-butadiene; or where $R_8$ is alkyl, such as methyl, while $R_6$, $R_7$ and $R_9$ through $R_{11}$ are hydrogen, and this substituent is thus prepared from isoprene monomer (natural rubber). These materials are prepared to have nucleophilic monofunctionality through the anionic polymerization process and termination with a suitable termination agent.

The nucleophilic substituents (Nu) of the present invention have the form Nu=y–P and can also be derived from M(y–P) wherein y is the linked residue of the nucleophilic functionality, M is a metal ion, such as an alkali or alkaline earth metal ion, or an onium ion, such as tetrabutylammonium, and P is a thermoplastic polymer which is available via a number of synthetic routes, and which contains y either by the nature of its chemical structure, or through simple well-known functionalization chemistry.

The nucleophilic substituents of the present invention may be prepared using anionic polymerization techniques utilizing a polymerizable monomer or combination of monomers to thereby form "living polymers." These "living polymers" are conveniently prepared by contacting the monomers or combination of monomers with an anionic polymerization initiator in the presence of an inert organic diluent which does not participate in or interfere with the polymerization reaction.

Monomers which are susceptible to anionic polymerization are well-known, and the present invention contemplates the use of all such anionically polymerizable monomers. Preferred such anionically polymerizable monomers include vinyl aromatic compounds such as styrene, alpha-methylstyrene, para-methylstyrene, vinyl toluene and its isomers; vinyl unsaturated amides such as acrylamide, methacrylamide, N,N-dialkylacrylamides; acenaphthylene; 9-acrylcarbazole; acrylonitrile and methacrylonitrile; organic isocyanates; alkyl acrylates and methacrylates, including methyl and tert-butyl acrylates and methacrylates; vinyl pyridines; copolymers with monomers which do not homopolymerize, such as 1,1-diphenylethylene; random and block copolymers of the above thermoplastic forming monomers and low levels of conjugated diene monomers including isoprene and butadiene,; and other such anionically polymerizable monomers such as those disclosed in *Macromolecular Reviews*, Volume 2, pages 74–83, Interscience Publishers, Inc. (1967), entitled "Monomers Polymerized by Anionic Initiators," and in *Anionic Polymerization*, ACS Symposium Series 166, page 60, American Chemical Society (1981), all of which are incorporated herein by reference thereto.

The initiators for these anionic polymerizations are the alkali metal hydrocarbons which produce a mono-functional "living polymer," i.e., in which only one end of the polymer contains a reactive anion. Many suitable anionic initiators are described by R. Milkovich et al in U.S. Pat. No. 3,786,116, and these initiators are also incorporated herein by reference thereto.

The amount of initiator, the solvent, and the temperature conditions for preparing living polymers, are widely found in the art. Typical examples are also given by R. Milkovich et al in U.S. Pat. No. 3,786,116, at columns 8 and 9, which is also incorporated herein by reference thereto.

The above-described "living polymers" are susceptible to further reactions, including further polymerization. Thus, if additional monomer is added to the living polymer, the polymerization is renewed and the chain grows until no more monomer remains. Alternatively, a second, different such anionically polymerizable monomer may be introduced, and the chain can then grow and incorporate this monomer. In this manner, a wide range of block copolymer structures may be prepared. In each case the resulting copolymer remains "living," and may itself be used as a very active organolithium nucleophile, or it may be converted through well-known functionalization chemistry to a number of other less reactive but no less desirable nucleophiles.

These "living polymers" can then be converted into a variety of nucleophiles by controlled termination reactions with a number of electrophiles, including epoxides, including both ethylene oxide and propylene oxide; episulfides, including both ethylene sulfide and propylene sulfide; and carbon dioxide. Termination of these living polymers by any of the above types of terminating agents is accomplished by simply adding the terminating agent to the solution of living polymer at the temperature at which the living polymer is prepared. Reaction is immediate, and the yield is high. A slight molar excess of the terminating agent, with respect to the amount of catalyst, may be used, although the reaction proceeds on a stoichiometric basis.

Termination may be conducted in any suitable inert solvent. It is generally advisable to utilize the same solvent system which was employed in the preparation of the living polymer. In a preferred embodiment of this invention, the termination reaction is conducted in a hydrocarbon solvent or mixtures containing limited quantities of polar solvents, such as tetrahydrofuran.

The family of monomers which undergo anionic or cationic ring opening polymerizations includes cyclic ethers, cyclic sulfides, lactones, lactams, N-carboxyanhydrides, and those which undergo anionic or cationic ring opening copolymerizations, including the copolymerization of ethylene oxide with succinic anhydride. Ring opening polymerization is well-known in the literature, see for example Chapter 7, pages 508–563 in *Principles of Polymerization*, 2nd. Ed., G. Odian, J. Wiley & Sons, New York (1981), and the 209 references contained therein.

In a preferred embodiment of this invention, the ring-opening polymerizations are initiated by ionic initiators to form an initiator species that is ionic. This can be generalized as

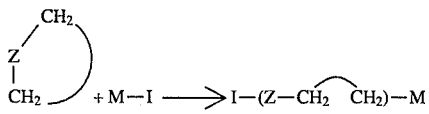

where Z is the functional group in the monomer, and I is the ionic initiator. Ionic ring-opening polymerizations include those initiated by species such as Na, RO⁻, H⁺ and $BF_3$. Ionic ring-opening polymerizations show most of the general characteristics (e.g., effects of solvent and counterion, propagation by ion pairs and free ions, association phenomena) common to ionic chain polymerizations, like the anionic polymerization of polystyrene.

It is the nature of the chemical structure of the ring-opened polymers that ensures that the resulting polymer is substantially a monofunctional nucleophile. For example, treating a tetrahydrofuran solution of ethylene oxide with sodium ethoxide yields a high molecular weight poly(ethylene oxide) with an active sodium alkoxide chain end.

The family of monomers which undergoes oxidative coupling is substantially composed of alkyl substituted phenols. The oxidative coupling polymerization of many 2,6-disubstituted phenols to form aromatic polyethers is accomplished by bubbling oxygen through a solution of the substituted phenol in an organic solvent containing a catalytic complex of a cuprous salt and an amine, see for example H. L. Finkbeiner et al, "Polymerization by Oxidative Coupling," Chapter 15 in Polymerization Precesses, C. E. Schildknecht, Ed., with I. Skeist, Wiley-Interscience, New York (1977), which disclosure is incorporated herein by reference thereto.

For these phenols which contain small substituents, polymerization proceeds rapidly under mild conditions. Thus, 2,6-dimethylphenol polymerizes at room temperature to produce a high polymer yielding a substantially monofunctional phenoxide nucleophile.

The polyolefin family, preferably polypropylene and high propylene copolymers (but also including other crystalline polyolefins such as those based on butene-1, 3-methyl, pentene-1 and 4-methyl, pentene-1) are reacted with maleic or himic anhydride and a radical generator. The process for this modification is set forth in R. A. Steinkamp et al, U.S. Pat. No. 3,862,265, the disclosure of which is incorporated herein by reference thereto. In a preferred embodiment, polypropylene or copolymers thereof in which polypropylene is the major component are employed. The resulting modified polypropylene is substantially monofunctional, with most chains containing one anhydride at or near their end. This anhydride terminus is then converted into a mixed ester-acid salt by reaction of the polymer with a combination of alcohol and base. This is then used as the polymeric nucleophile for reaction with the desired electrophile hereof.

The graft copolymers themselves can thus then be prepared by combining these electrophiles and nucleophiles in an appropriate procedure (including solution reaction and bulk reaction using, e.g., a Banbury™ internal mixer, extruder, etc.). In particular, the graft-onto reaction involves the polymeric nucleophilic substitution generally set forth as follows

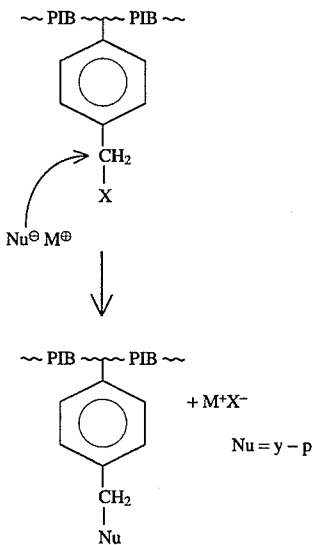

Most nucleophilic substitution of this type involves some degree of side reactions, such as metal-halide exchange, protonation, elimination, dimeric termination, elimination, etc. In the polymer cases these side reactions can seriously affect the final properties of these polymers. A small amount of these side reactions in graft-onto reactions will result in crosslinking which will dramatically decrease the processibility of the copolymer in the polymer blends. In such cases where elimination is a competitive reaction with grafting, the resulting copolymer may contain significant levels of homopolymers which will severely restrict their utility. By using the benzyl halide components of the present invention, however, these side reactions are minimized. The benzyl halide compounds are thus not only excellent electrophiles, but they also eliminate the possibility of the elimination occurring. Thus, while for organolithium nucleophiles metal-halide exchange, proton extraction, and dimeric termination are still problems to some extent in this reaction, the results obtained are excellent in this regard. In order to further decrease the degree of metal-halide exchange, however, a polar solvent such as tetrahydrofuran is employed whenever organolithium nucleophiles are utilized. This decreases the activation energy, promoting the nucleophilic substitution reaction, and suppressing the metal-halide exchange.

The brominated, quenched, and neutralized para-methylstyrene/isobutylene copolymers can be recovered and finished using conventional means with appropriate stabilizers being added to yield highly desirable and versatile functional saturated copolymers which are useful in many reactions and applications.

In particular, since little if any tertiary benzylic bromine is produced in the copolymer molecule, the potential dehydrohalogenation reaction will be almost entirely eliminated therein. This results in a halogenated polymer of improved stability. In addition, presence of the bromine on the ringmethyl group leads to several additional significant advantages with respect to this product. It permits functionalization by substitution of other functional groups at that site.

The benzylic bromine (halogen) functionality is uniquely suited as the base from which the versatile functionalized saturated copolymers of this invention can be made because it can be made to undergo "clean" nucleophilic substitution reactions with a great range of nucleophiles, so that almost any desired type and amount of functionality can be introduced without undesirable side reactions and under conditions which are mild enough to avoid degradation and/or cross linking of the saturated copolymer backbone containing the pendant benzylic halogen functionality. Furthermore, in many instances, it is possible to only partially convert the pendant benzylic halogen to another desired functionality while retaining some, or to later convert another portion of the remaining benzylic halogen functionality to yet another new functionality, so that copolymers containing mixed functionalities can be made. The mixed functionality can advantageously provide unique combinations of properties, such as grafting with another functional polymer via one of the functionalities and then cross-linking or adhering to some surface via another of the functionalities.

One of the attributes of the benzylic halogen functionality of the radically halogenated isobutylene/paramethylstyrene copolymers which makes them an "ideal" base copolymer from which to prepare the various functionalized saturated copolymers of this invention is the wide range of nucleophilic substitution reactions this benzylic halogen functionality will undergo and the relatively mild conditions under which these nucleophilic substitution reactions will proceed. A benzylic halogen functionality constitutes a very active electrophile which will react under suitable conditions with any nucleophile capable of donating electrons to it. Suitable nucleophiles include those containing oxygen, sulfur, nitrogen, phosphorus, carbon, silicon, and various metals including especially magnesium, lithium, sodium, and potassium. Equally important to this versatility in types of nucleophiles which will react with the benzylic halogen functionality is the relatively mild conditions under which these nucleophilic substitution reactions proceed so that substitution reactions can be completed to introduce the desired new functionality without cleavage or cross-linking reactions involving the saturated hydrocarbon backbone of the isobutylene/paramethylstyrene copolymer.

Another of the attributes of the benzylic halogen functionality is the "cleanness" with which the desired substitution reactions can be made to proceed without undesirable side reactions. The benzylic halogen functionality will undergo clean substitution reactions without complicating elimination reactions. This attribute is extremely important in reactions involving soluble high polymers, since even a tiny amount of a side reaction which can lead to coupling may lead to gelation. In reactions involving simple molecules (which are usually mono-functional) yields of only 70% of the desired product may be acceptable, since purification and separation of the undesired products is relatively simple. In reactions involving already cross-linked polymers (i.e. "styragels") lower yields to the desired product may also be acceptable, since the starting polymer is already insoluble. However, in reactions with the soluble high polymers of this invention which contain many functional groups per molecule, it is necessary to achieve >99% of the desired substitution reaction in order to maintain solubility during reaction and recovery. Tiny, almost insignificant (in other reactions) amounts of side reactions which yield coupling which produces "gel" and may interfere with usefulness. Furthermore, purification of the substituted polymer to remove unwanted side products is usually very difficult or impossible. Hence, the importance of the "clean" single route to high yield nucleophilic substitution reactions which is achievable with benzylic halogen functionality under controlled conditions. By using isobutylene/paramethylstyrene/para-bromomethylstyrene terpolymers as a "base" polymer for modification, and by conducting nucleophilic substitution reactions under appropriate and controlled conditions, soluble backbone saturated, copolymers containing useful pendant functionality have been prepared: Examples include:

1. Esters (many containing other functional groups such as acetate, stearate, linoleate, eleostearate, acrylate, cinnamate, etc.
2. Hydroxyl (attached directly in place of the benzylic bromine or attached via another linkage.
3. Carboxy
4. Nitrile
5. Quaternary Ammonium salts
6. Quanternary Phosphonium salts
7. S-isothiuronium salts
8. Dithiocarbamate esters
9. Mercaptans While every possible derivative that could be prepared by nucleophilic substitution reactions on the isobutylene/paramethylstyrene/para-bromomethylstyrene terpolymers has not been prepared, it is obvious that one skilled in the art could attach almost any desired pendant functionality and many mixtures of functionalites as desired for various applications by applying the principles disclosed in this invention.

The "key" requirements for producing the versatile, pendant functionalized, backbone saturated, soluble copolymers of this invention via "clean" nucleophilic substitution reactions are:

1. Use of the isobutylene/para-halomethylstyrene/paramethylhalogenated paramethyl styrene "base" terpolymers for nucleophilic substitutions under appropriate, controlled conditions. The composition of the terpolymer can be varied as desired to yield the desired combination of properties (i.e. Tg, hardness, flexibility, impact strength, functionality level, etc.).
2. Choosing the nucleophile and reaction medium so as to achieve the required intimate contact between the benzylic halogen attached to the base terpolymer and the nucleophile. It should be recognized that in some instances this can be accomplished by using a different solvent or reaction medium for the polymer and for the nucleophile and then employing an appropriate phase transfer catalyst to promote the reaction.
3. Achieving specific solvation at the reaction site so that the desired nucleophilic substitution reaction is facilitated at mild conditions.
4. Avoiding "vigorous" or "harsh" reactants or reaction conditions such as strong "hard" bases or high temperatures that would cause a loss in reaction specificity and allow side reactions to become important and/or cause cross-linking or degradation reactions to occur.
5. Choosing the nucleophilic reagent and promoters appropriately so that the desired substitution reaction occurs quickly under mild conditions and potential undesired side reactions are avoided. For example: In using an

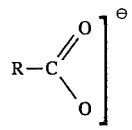

nucleophile in an esterification reaction to replace the benzylic bromines on an isobutylene/para-bromomethylstyrene "base" terpolymer, one could chose the potassium salt of the acid as the nucleophilic reagent, along with 18 Crown-6 to solvate the potassium ion and promote the desired esterification substitution reaction, or one could choose the tetrabutyl ammonium counter ion in an appropriate solvent as a nice "soft" acid to promote the reaction rather than trying to use a "hard" ionic salt of the carboxylic acid as the nucleophilic reagent.
6. Choosing reaction conditions to minimize sequential reactions by recognizing that the nucleophilic substitution reaction being conducted can itself form attached pendant nucleophilic reagents on the base copolymer backbone and that these already attached nucleophilic reagents can nucleophilically "attack" other unreacted benzylic bromines on the base terpolymer in a sequential manner to consume the already attached new functionality and at the same time produce undesirable cross-linking of gelation.

Thus reaction conditions must be chosen such that the unreacted nucleophilic reagent being used in the nucleophilic substitution reaction being conducted is either a much stronger more reactive nucleophile or is present in great excess over any attached nucleophilic reagent being formed in the substitution reaction. Thus, in attempting to replace the benzylic bromines of the base terpolymer of this invention with mercaptan groups, it must be recognized that the attached SH groups will form attached mercaptide nucleophilic reagents under basic conditions and these attached mercaptide groups will react with other benzylic bromines to consume the already attached pendant mercaptan functionality and produce undesired thioether cross-links resulting in "gelled" polymer instead of the desired pendant functionalized polymer of the invention.

Likewise, in producing a pendant hydroxy functionalized polymer of this invention, it must be recognized that the attached-OH groups will form alkoxide nucleophilic reagents under strongly basic conditions and these attached alkoxide groups can react in a sequential manner with other unreacted benzylic bromines of the base terpolymer to consume the already attached pendant hydroxy functionality to produce ether cross links resulting in "gelled" polymer rather than the desired pendant functionalized polymer of this invention.

This "key" requirement of recognizing the potential for sequential reactions and choosing conditions to minimize them is especially important in cases where it is desired to produce the pendant functionalized saturated polymers of this invention with mixed pendant functionality. In these mixed functionality polymers, it is extremely important to choose functionalities and conditions such that the desired pendant functionalities are preserved and sequential reactions are avoided.

The polymers of isoolefin and paraalkylstyrene—silane derivatized polymers represent another broadly useful family of materials which can be easily prepared by nucleophilic displacement through the use of suitable nucleophilic silane reagents like (N,N-Dimethyl-3-aminopropyl) silanes, as depicted below.

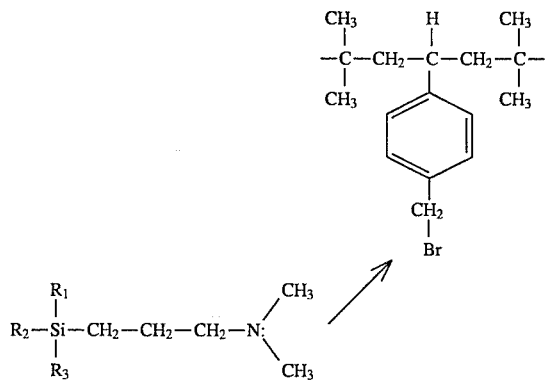

Wherein $R_1$, $R_2$ and $R_3$ are each independently selected from the group consisting of: H, Cl, and O-(alkyl) wherein the alkyl group has about 1 to about 5 carbon atoms such as methyl, ethyl, etc.

The reactivity of these derivatives can be varied based upon the number and type of silane species present.

The polymers of isoolefin and paraalkylstyrene containing Si—Cl bonds are the most reactive toward a variety of nucleophiles, including as weak a nucleophile as water. Thus these materials are vulcanizable by exposure to the atmosphere and are therefore very useful as room temperature vulcanizable compositions (RTVs).

Likewise these polymers containing Si—O(alkyl) bonds are also reactive with a variety of nucleophiles (though not as reactive as Si—Cl) which also include water. Again this reactivity can be exploited in RTV applications, especially where the emission of neutral species during curing is preferred.

Uniquely reactive are the polymers of isoolefin and paraalkylstyrene—silane derivatives which contain Si—H bonds. They undergo three fundamental types of reactions. They can react with hydroxyl or silanol functionalized materials in the presence of tin octoate, zinc octoate and other metal salts to form bonds with the evolution of hydrogen. This reaction can be used to impart hydrophobicity to glass, leather, paper or fabric surfaces.

The Si—H functionality will react with olefins in the presence of certain free radical or precious metal catalysts. This reaction opens the opportunity for addition cure (RTV) or low temperature vulcanization. Mixtures of these polymers with another olefin containing polymer like polybutadiene or vinyl functional silicones will rapidly yield a intermolecular crosslinked system of the polymers of isoolefin and paraalkylstyrene and the other polymer. The polymers of isoolefin and paraalkylstyrene—vinyl silicone system will provide a useful thermally stable crosslink system which exhibits improved permeability properties over existing silicone systems.

The third useful reaction for these Si—H polymers of isoolefin and paraalkylstyrene derivatives is as polymeric reducing agents. SiH compounds are known to be active mild selective reducing agents for nitroaromatics, acid chlorides, aldehydes and ketones. Binding these reagents to polymers offers the advantage of ease of separation; the polymer is easy to remove from the low molecular weight reduced species and no hydrolysis of the remaining reagent is necessary prior to isolation. Another advantage is that these reductions can be run in the presence of air and moisture in a wide range of solvent systems including hexane, methylene chloride and dioxane.

The novel versatile, pendant functionalized, backbone saturated, soluble copolymers of this invention which are derived via "clean" nucleophilic substitution reactions on a "base" terpolymer comprising isobutylene/paramethyl styrene/ and para-bromomethylstyrene are widely useful as will be further discussed in the examples dealing with specific pendant functionalities. They encompass a broad range in properties ranging from low Tg elastomers high in isobutylene to high Tg plastics high in paramethyl styrene with tough high impact compositions at intermediate isobutylene contents. The presence of appropriate pendant functionality renders this entire range of products "paintable" for use in external automotive or appliance applications, etc. and enables them to be adhered to and used as coatings on other substrates especially in exterior applications where the excellent environmental resistance of the backbone saturated copolymers is advantageous. The presence of appropriate pendant functionality also enables these compositions to react with or be coreacted with other functional polymers, or fillers, or fibers to form composite structures (i.e. laminates, dispersions, etc.) with desirable combinations of properties.

In accordance with this invention it has been found that the novel pendant functionalized saturated copolymers described and exemplified herein can be conveniently and practically produced by first preparing a base terpolymer comprising a saturated hydrocarbon backbone with one or more pendant attached electrophilic moieties, and then attaching the desired new functionality via a "clean" nucleophilic substitution reaction with the pendant attached electrophilic moieties. It has been found to be desirable and is important in obtaining the pendant functionalized copolymer of this invention that the pendant attached electrophilic moieties which are replaced by other functionalities via "clean" nucleophilic substitution reactions be benzylic halogen moieties. These pendant attached electrophilic benzylic halogen moieties can be readily inserted into random isobutylene/para-methylstyrene copolymers by radical halogenation as taught in U.S. Ser. No. 199,665, to yield the base terpolymer containing isobutylene/para-methylstyrene/and para-methyl brominated para-methylstyrene securing random units. This base terpolymer containing electrophilic benzylic halogen moieties is the "parent" polymer from which the novel, pendant functionalized, saturated copolymers of this invention are prepared via "clean" nucleophilic substitution reactions.

These novel pendant functionalized polymers of this invention are comprised of the following "mer" units:

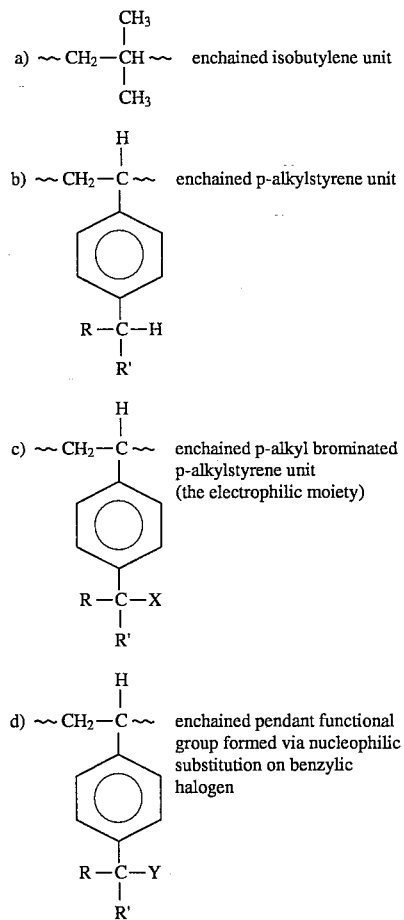

wherein: R and R' are independently selected from the group consisting of hydrogen, alkyl, and 1° or 2° alkyl halide. X is a halogen atom (preferably bromine or chlorine, and most preferably bromine) and Y represents a new functional group attached to the polymer via nucleophilic substitution of one of the benzylic halogens so that an enchained c) "mer" unit has become a d) "mer" unit. Actually there can be several different Y species in the same polymer in cases where mixed functionalities are being introduced. Y is the residue which becomes attached to the polymer enchained c) "mer" unit in place of halogen when a nucleophilic reagent capable of donating electrons to benzyl halides is reacted with the base terpolymer in accordance with this invention.

The four (or more if several different Y functionalities are present) "mer" units are attached to one another in random fashion to form the novel, pendant functionalized, backbone saturated polymers of this invention. Total polymer number average molecular weight can range from <500 to >100,000. The amounts of the various "mer" can range as follows:

a) (isobutylene) "mer" units from 10→99.5 wt. %
b) (p-alkylstyrene) "mer" units from 0.23→ 90 wt. %
c) (radically brominated p-alkylstyrene) "mer" units from 0→55 wt. %
d) (pendant functional) "mer" units from 0.1→55 wt. %.

Actually, there can be several different Y species in the same polymer in cases where mixed functionalities are being introduced. Y is the residue which becomes attached to the polymer unit in place of halogen when a nucleophilic reagent capable of donating electrons to benzyl halides is reacted with the base terpolymer in accordance with this invention, wherein a is about 10 to about 99.5 wt. %, more preferably about 80 to about 99, and most preferably about 90 to about 98, b is about 0.2 to about 90.0 wt. %, more preferably about 1 to about 20, and most preferably about 2 to about 15, d is about 0.1 to about 55.0 wt. %, more preferably about 0.2 to about 20 and most preferably about 0.5 to about 15, and c is about 0 to about 55.0 wt. %, more preferably about 0.2 to about 20, and most preferably about 0.5 to about 15. The number average molecular weight of the functionalized polymers is from about 500 to about 1,000,000, more preferably about 30,000 to about 800,000 and most preferably about 100,000 to about 600,000.

In accordance with a preferred embodiment of the present invention, the nucleophilic reagents which are capable of donating electrons to benzyl halides and to displace a halide ion via a substitution nucleophilic displacement reaction and attach the new functional group Y in the benzylic position from which the halogen was displaced may be Y or YM wherein: M is hydrogen, a metal ion, or an onium ion and Y is either a simple nucleophile containing oxygen, sulfur, silicon, carbon, nitrogen, phosphorus, or various metals; or Y is a small molecule of <1000 molecular weight which may contain other functionality in addition to the simple nucleophile which becomes attached at the benzylic position in the nucleophilic displacement reaction.

Examples of simple nucleophiles containing oxygen which results in the attached of —O— to the benzylic position from which the halide ion was displaced included but are not limited to:

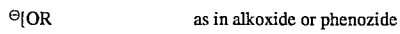  as in alkoxide or phenozide

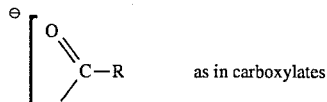  as in carboxylates

  as in sodium salts

Examples of simple nucleophiles containing sulfur which result in attachment of —S— to the benzylic position from which the halide ion was displaced include (but are not limited to):

⊖S—R  as in thiolates and thiophenolates

⊖SR₂  as in thioethers

  as in thiocarboxylates

  as in dithiocarboxylates

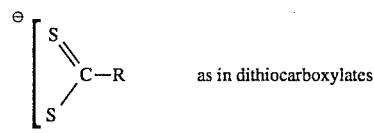  as in thioureas

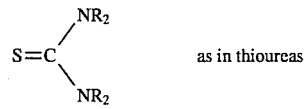  as in dithiocarbamates

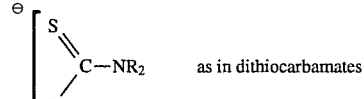  as in xanthates

⊖SCN  as in thiocyanates

Examples of simple nucleophiles containing silicon which result in the attachment of —Si— to the benzylic position from which the halide ion was displaced include (but are not limited to):

H—SiR₃  as in silanes

H—SiX$_n$R$_{3-n}$  as in halosilanes

Examples of simple nucleophiles containing carbon which result in the attachment of —C— to the benzylic position from which the halide ion was displaced included (but are not limited to):

⊖CN  as in cyanides

⊖CR₃  as in organo lithium (or other alkali or alkaline earth materials) compounds HC—(R)—(CO₂R)₂  as in malonates and di or trisubstituted methane derivatives in general in which the substituents activate the substituents methane carbon for carbon-alkylation reactions under basic conditions Examples of simple nucleophiles containing nitrogen which result in the attachment of —N— to the benzylic position from which the halide ion was displaced include (but are not limited to):

  as in amides

NH$_n$R$_{3-n}$  as in various amines

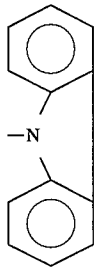 as in carbozoles

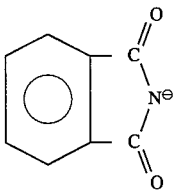 as in phthalimides

 as in pyridine

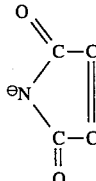 as in maleimide

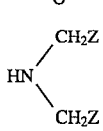 where Z is some functional group as in iminodiethanol, iminodiacetonitile, diacetonitrile iminodiacetic-acid, etc.

 as in cyanates

Examples of simple nucleophiles containing phosphorus which result in attachment of —P— to the benzylic position from which the halide ion was displaced (include but are not limited to):

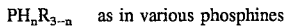
$PH_nR_{3-n}$    as in various phosphines

Examples of simple nucleophiles containing a metal which results in the attachment of —M— to the benzylic position from which the halide ion was displaced include (but are not limited to):

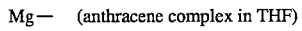
Mg—    (anthracene complex in THF)

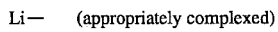
Li—    (appropriately complexed)

Examples in which Y is a small molecule of <1000 molecular weight containing other functionality in addition to the simple nucleophile which becomes attached at the benzylic position from which the halide ion was displaced in the nucleophilic displaced reaction include (but are not limited to): triethanol amine, iminodiacetic acid, iminodiacetonitrile, iminodiethanol, vinyl pyridines, cinnamate, eleostearate, linoleate, acrylate, benzoyl benzoate, benzyol phenolate, dihydroxybenzophenone, crown ethers derivatives, cryptand derivatives, cellulose derivatives, sugar derivatives, low molecular weight polyethylene oxide or polypropylene oxide chains with terminal nucleophilic groups, etc. It should be noted that these reactions in which Y contains other functionalities in addition to the simple nucleophile which becomes attached at the benzylic position from which the halide ion was displaced greatly extend the type and range of functionalities which can be incorporated into the novel pendant functionalized, saturated copolymers of this invention, as prepared by "clean" nucleophilic substitution reactions. This ability to attach multifunctional Y groups enables clusters of polar groups to be attached as is desirable in dispersants of various type (i.e. lube oil dispersants); enables functionalities that are not readily achieved by the nucleophilic displacement reaction (such as olefins or conjugated unsaturation) to be attached; and enables very complex and special functionalities such as chiral compounds or crown compounds of cryptands to be attached to produce novel pendant functionalized copolymers of this invention with unique properties for highly specialized applications such as catalysts and so forth. It should also be noted that attachment of Y groups containing other functionalities requires even greater care during the nucleophilic displacement reaction by means of which the Y group are attached to insure that the new functionalities are preserved and are not consumed by sequential reactions to produce crosslinking or gelation. In some instances, it is even desirable to "block" the functionalities that need to be preserved until the nucleophilic substitution reaction is completed.

The novel and versatile, pendant functionalized, backbone saturated, soluble copolymers of this invention are prepared via "clean" nucleophilic substitution reactions on a base terpolymer comprising isobutylene/paramethyl styrene/ and para-bromomethylstyrene "mer" units enchained in random fashion. The enchained para-bromomethystyrene "mer" units are the electrophiles which are the "sites" at which the "clean" nucleophilic substitution reactions are performed to attach the desired Y groups and introduce the new pendant functionality.

The enchained electrophile, which is the site for the nucleophilic substitution reaction, has the formula:

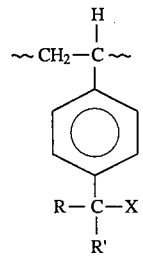

Wherein: X is a halogen (preferably bromine or chlorine) and R and R' are independently selected from the group consisting of hydrogen, alkyl preferably $C_1$ to $C_5$ alkyl, and primary and secondary alkyl halides preferably $C_1$ to $C_5$ alkyl halides.

The nucleophilic reagents which are capable of donating electrons to benzyl halides and to participate in the "clean" nucleophilic substitution displacement reaction by means of which the halide ion is displaced and replaced by the new functional group Y may be either Y or YM. Wherein: M is hydrogen, a metal ion or an onium ion and Y is either a simple nucleophile containing oxygen, sulfur, nitrogen, phosphorus, carbon, silicon, or various metals; or Y is a small molecule of <1000 molecular weight which may contain other functionality (which is unreactive or blocked under the conditions of the nucleophilic displacement reaction) in addition to the simple nucleophile which becomes attached at the benzylic position vacated by halogen in the nucleophilic displacement reaction.

The nucleophilic substitution reactions may be set forth as follows:

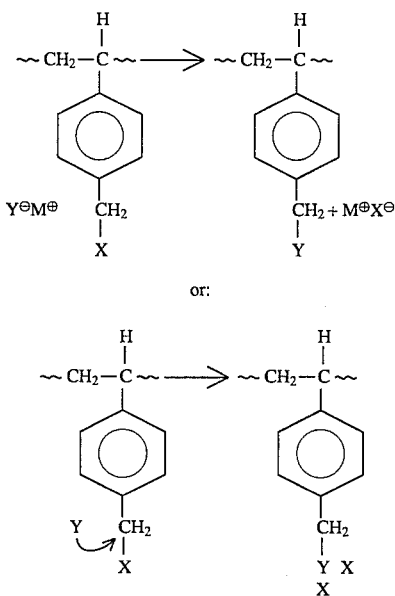

Nucleophilic substitution reactions of this type require the achieving and intimate contact between the reactants under the proper reaction conditions which, as already discussed, presents some problems when one of the reactants, the electrophile, is "enchained" in a high polymer chain thus making contacting more difficult and imposing restrictions on the reaction medium and conditions which may be utilized.

Most nucleophilic substitution reactions of this type also involve some degree of side reactions which can be extremely detrimental in making the pendant functionalized soluble copolymers of this invention, since even minor amounts of side reactions in high polymers can lead to gelation which can greatly diminish utility. One advantage of using the unique base polymers of this invention for the nucleophilic substitutions reactions is that the undesired side reactions can be largely eliminated. It is known that nucleophilic substitution reactions can proceed by several different mechanisms and with most electrophiles these different mechanisms can lead to different products or to different amounts of side reactions. Those reactions, which proceed by a concerted Sn2 mechanism usually yield more of the desired substitution product than those proceeding by an Sn1 mechanism. An advantage of using the enchained benzylic halogen of this invention as the electrophile site for nucleophilic substitution is that elimination reactions are entirely prevented so that even nucleophilic substitution reactions proceeding by an Sn1 mechanism still lead cleanly to the desired substitution product without undesired side reactions. A further advantage of using the preferred benzylic bromine of this invention as the site for nucleophilic substitution is that the substitution reactions proceed under mild conditions (since the benzylic bromine is so liable) so that degradation of the polymer backbone or thermal rearrangement or decomposition of the reactants or products can be avoided. Utilization of benzylic halogen, especially benzylic bromine, as the enchained electrophile site for nucleophilic substitution as in this invention also makes it possible to select reagents and conditions so that other side reactions, such as those proceeding by another mechanism or the sequential reactions can be largely eliminated so that the soluble pendant functionalized copolymers of this invention can be prepared by "clean" Sn nucleophilic substitution reactions. Careful observance of the six "key" requirements already outlined is necessary in order to prepare the useful, novel, and versatile, pendant functionalized backbone saturated, soluble polymers of this invention.

The exact and specific conditions suitable for preparing the various pendant functionalized, soluble, saturated copolymers of this invention will vary depending upon the new functionality being introduced as well as the base polymer composition and other factors and some experimentation may be necessary to define practical conditions in each case but the same "key" factors as outlined herein must always be considered and observed. This will become clearer in the specific examples to follow, but some general reaction conditions can first be defined. The nucleophilic substitution reactions can be run in solution using a solvent system in which both the base polymer and nucleophilic reagent are soluble; can be run in a two phase liquid run system with the base polymer dissolved in one phase and the nucleophilic reagent in the other; can be run in a two phase solid/liquid system (i.e. with the base polymer dispersed in a liquid phase containing the nucleophilic reagent) or can be run in the bulk with reactants dissolved or dispersed in the base polymer. The common solution situation is most controllable and generally the preferred case, but the bulk reaction may be economically advantageous in some cases where suitable reagents and reaction conditions can be found. The intermediate two phase systems may be advantageous under some circumstances and may be necessary in instances where the solubility parameters of the base polymer (containing the electrophile) and the nucleophilic reagent are so different that no common solvents exist. In these two phase cases, it is often or usually desirable to use phase transfer catalysts to promote the nucleophilic substitution reaction at the interface between the phases or to transport the nucleophilic reagent to the electrophile site in the base polymer. A most preferred way of preparing the pendant functionalized polymers of this invention is to radically halogenate a random isobutylene/paramethylstyrene copolymer as taught in U.S. Ser. No. 199,665 filed May 27, 1988, herein incorporated by reference to introduce the benzylic halogen electrophile and then conduct the nucleophilic substitution reaction to introduce the desired new functionality in the same medium in a sequential reaction (halogenate and then nucleophically displace the halogen) without ever recovering the base halogenated polymer separately.

Depending upon the reactivity of the nucleophilic reagent used and the reaction conditions, the nucleophilic substitution reactions can be run at temperatures varying from about 0° C. to about 200° C. as limited by thermal stability of the nucleophilic reagent, the base polymer and the functionalized product polymer. Normally, temperatures between about 0° and about 150° C. are preferred. Reaction times are normally (but not necessarily) chosen to allow the nucleophilic displacement reaction to go to completion (i.e. exhaustion of either the electrophile or the nucleophilic reagent) and may range between several seconds and a few days. Normally, reaction times between a few minutes and several hours are preferred and reaction temperature and other conditions are set to make a convenient reaction time possible.

A wide range of solvents and/or solvent blends may be used as the medium in which the nucleophilic displacement reaction is run and it is this factor which determines whether a solution, dispersion, or bulk reaction is conducted. A number of factors are important in selection of the solvents. They need to be inert under the reaction conditions, easily removed from the product, easily recycled for reuse in the process, of low toxicity under use conditions with minimum environmental health concerns, and economical to use. In addition, the solvents need to provide a reaction environment which is favorable for the reaction being run that is, they must bring the reactants into the required intimate solution contact and should provide solvation stabilization for intermediate states along the desired reaction route. It is frequently necessary or desirable to use a blend of solvents to best achieve the various compromises required, with one solvent being an easily handled "good" solvent for the base polymer and the other being a "good" solvent for the nucleophilic reagent and/or providing solvation stabilization for the reaction intermediates. It is most preferred that the chosen solvent system be one that is suitable for both the radical halogenation reaction to introduce the benzylic halogen electrophile into the random isobutylene/paramethylstyrene copolymer, as well as for the nucleophilic substitution reaction to introduce the new pendant functionally, so that a sequential reaction route is feasible without having to recover the halogenated "base" polymer separately.

Solvents which are particularly suited for this sequential reaction route vary somewhat depending upon composition of the "base" polymer, but with the elastomeric "base" polymers high in isobutylene are the low boiling saturated hydrocarbons ($C_4 \rightarrow C_7$) or halogenated hydrocarbons ($C_1 \rightarrow C_7$). Often it is desirable to add a more polar cosolvent, such as a low boiling alcohol ($C_1 \rightarrow C_4$) during the (second) nucleophilic displacement reaction in order to dissolve and "carry-in" the nucleophilic reagent as well as provide solvation stabilization for the nucleophilic displacement reaction. Aromatic solvents such as benzene, toluene, and chlorobenzene are generally good solvents for the base polymer over the entire composition range and provide a reaction medium favorable for many nucleophilic displacement reactions but often present other problems (i.e. the toxicity of benzene or the high reactivity of toluene during radical halogenation which makes it unsuitable as the reaction medium during this first stage of the sequential reaction route). Preferred solvent composition changes as composition of the base polymer is changed and depends upon whether it is desired to run the reactions in solution or dispersion. In general solvents of higher solubility parameter containing some aromatieity or halogen are required for solution reactions with the tougher, higher Tg base polymers of this invention which contain higher paramethylstyrene contents.

Similar considerations apply when considering the nucleophilic displacement reaction separately. In order to run this reaction in solution, a good solvent for the base polymer (depending upon its composition) is required and a cosolvent for the nucleophilic reagent may also be desirable or required. Good solvents for the base polymer are similar to those cited above as being suitable for the sequential reaction route, but a broader range of solvents can be considered since inertness during radical halogenation is not required. The low boiling saturated hydrocarbons ($C_4 \rightarrow C_7$) or halogenated hydrocarbons ($C_1 \rightarrow C_7$) and aromatic hydrocarbons or naphthenes are preferred. Where greater solvent polarity is desired tetrahydrofuron can be employed or good solvating agents such as dimethyl foramide or dimethyl sulfide can be added. The latter solvents are also good solvents for many of the nucleophilic reagents and may be employed along with alcohols or ketones to dissolve the nucleophilic reagent for addition to the base polymer solution. This technique of adding a solution of the nucleophilic reagent (in a solvent miseible with that used for the base polymer) with rapid stirring to the base polymer solution often results in a fine dispersion of the nucleophilic reagent so that even in cases where the nucleophilic reagent is not completely soluble in the mixed solvent resulting after the addition, an essential solution nucleophilic displacement reaction can still be run because the nucleophilic reagent dissolves during reaction to replenish the solution concentration as the reaction progresses.

In more extreme cases, where the nucleophilic reagent isn't soluble in co-solvents miscible with the base polymer solvent or where the solubility of the nucleophilic reagent in mixed solicity which will retain the base polymer in solution is too low, then a two phase reaction may be run with the base polymer dissolved in one phase and the nucleophilic reagent in the other. In such cases, good mixing is essential to provide lots of interfacial contact between the reactants and a phase transfer catalyst is generally desirable to aid in transporting the nucleophilic reagnet to the benzylic halogen electrophile site on the base polymer. An example might be highly polar water soluble nucleophilic reagents such as potassium cyamide, sodium sulfite, or nitrilotriacetic acid. Examples of phase transfer catalysts useful in these two phase reactors include (but are not limited to): tetrabutyl ammonium bromide, tetrabutyl ammonium bisulfate, tetrabutyl ammonium hydroxide, benzyl triethyl ominonium chloride, tetrabutyl phosphonium bromide, crown ethers, cyptonds, Adogen 464, etc. These same types of materials are sometimes beneficial in speeding up the one-phase solution reaction by providing specific solvation at the reaction site.

The ultimate in working with high solids and eliminating the costs of solvent handling and recycle is, of course, to run a "bulk" reaction with the nucleophilic reagent dissolved or dispersed in undesired reactions can be prevented by blocking, etc.

This invention can be more fully understood with reference to the following specific examples providing details on the introduction of various pendant functionalities by nucleophilic substitution reactions on the "base" isobutylene/paramethyl styrene/paramethyl brominated paramethyl styrene "base" terpolymer; wherein, unless indicated otherwise, all percentages indicated are weight percentages.

The present invention can be more fully understood with reference to the following specific examples thereof in which, unless indicated otherwise, all percentages indicated are weight percentages:

EXAMPLE 1

An isobutylene/para-methylstyrene random copolymer was prepared by batch polymerization in a dry box, as follows:

A 500 ml. reaction flask fitted with a thermometer, stirrer, and dropping funnel was set up in a glove box having an oxygen- and moisture-free nitrogen atmosphere and the flask was cooled to −98° C. by immersion in a controlled temperature liquid-nitrogen-cooled heat transfer bath. The reactor was charged with 386.6 g. purified dry methyl chloride (having a purity of 99.8%), 47.4 g. purified, dried and distilled polymerization grade isobutylene (having a purity of 99.9%), and 2.6 g. purified, dried and vacuum-distilled para-methylstyrene (having a purity of 99.7%) to yield a feed blend containing 10.8% monomers with 5.2 wt. % para-methylstyrene (~2.5 mole %) on total monomers. Seventeen ml. of a catalyst solution consisting of 0.19 wt. % ethyl aluminum dichloride (EADC) in methyl chloride was allowed to drip slowly into the feed blend from the dropping funnel over the course of 12 minutes while stirring and attempting to maintain temperature by immersion of the reactor in the heat transfer bath. Despite the efforts at cooling, reactor temperature rose from −98° C. to −80° C. due to the exothermic polymerization reaction, and a slurry of polymer in a slightly tannish-colored liquid was formed. Some of the polymer agglomerated on the stirrer and reactor walls. The reactor was quenched by adding 25 ml. of cold methanol to yield an agglomerated mass of white polymer in a clear colorless liquid. The polymer was recovered by allowing the methyl chloride to flash off and kneading and washing the polymer in methanol; 0.2 wt. % butylated hydroxytoluene (BHT) was added as an antioxidant and the polymer dried in a vacuum oven at 80° C. Fifty grams of dried white, opaque, tough, rubbery polymer were covered. Conversion was 100% with a quantitative recovery of the polymer. Catalyst efficiency was about 1550 grams of polymer/grams of EADC. The recovered polymer had a viscosity average molecular weight ($M_v$) of 458,000, and contained 5.2 wt. % (~2.5 mole %) para-methylstyrene. Gel permeation chromatography (GPC) analysis using ultraviolet (UV) and refractive index (RI) detectors showed the paramethylstyrene to be uniformly distributed over the entire molecular weight range indicating that a compositionally homogeneous copolymer had been formed.

The gel permeation chromatography was performed using a Waters 150-C ALC/GPC (Millipore Corporation) with a Waters Lambda-Max Model 481 LC UV Spectrophotometer on line. Data were collected and analyzed using customized software developed with Computer Inquiry Systems, a division of Beckman Inc. Tetrahydrofuran was used as the mobile phase at various flow rates, but generally 1.0 ml/min. The instruments operated at 30° C. at a wavelength of about 254 nm for the UV. The polyisobutylene backbone has negligible absorbance compared to the aromatic ring at this wavelength. Styragel (Waters) or Shodex (Showa Denko) columns were used. Sets of columns of wide porosity range were calibrated with narrow molecular weight distribution polystyrene standards with molecular weights from $10^3$ to $4 \times 10^6$. Molecular weights are reported in terms of the polyisobutylene backbone using a universal calibration. The output from the UV and differential refractometer detectors can be compared quantitatively to calculate deviations in composition from the mean. Generally, viscosity average molecular weights are based on separate measurements in diisobutylene at 20° C.

EXAMPLE 2

The para-methylstyrene/isobutylene copolymer prepared in Example 1 was chlorinated under radical conditions to yield a functional isobutylene/paramethylstyrene copolymer containing the desired active aromatic chloromethyl groups, as follows. Chlorine was bubbled in for 2 minutes and the solvent used was an 80/20 methylene chloride/chloroform blend instead of pure methylene chloride in order to better dissolve the high isobutylene content, high molecular weight isobutylene/para-methylstyrene copolymer. The chlorinated copolymer was recovered and dried as in Example 1. The recovered polymer contained ~5 wt. % chlorine with an $\overline{M}v$ of ~300,000. Nuclear magnetic resonance (NMR) analysis indicated about 0.5 mole % of the preferred aromatic chloromethyl group was present with the balance of the chlorine being in-chain substitution of carbons attached or adjacent to the aromatic moiety. Copolymerization of isobutylene with para-methylstyrene followed by radical chlorination thus provides aromatic chloromethyl functional polyisobutylene copolymers.

EXAMPLES 3–20

In a series of Examples, high molecular weight paramethylstyrene/isobutylene copolymers were prepared by both batch slurry and solution polymerizations in a dry box, in each case utilizing a methyl chloride diluent, and using similar apparatus and procedures to those in Example 1. These polymerizations were run in a 500 ml. reaction flask fitted with a thermometer, stirrer, and dropping funnel. The reactor was thus similarly set up in a glove box having an oxygen- and moisture-free nitrogen atmosphere and the flask was cooled to temperatures as low as −100° C. by immersion in a controlled temperature liquid nitrogen-cooled heat transfer bath filled with 2-methyl pentane as the heat transfer medium. Polymerizations were run by charging the reactor with a feed blend consisting of purified dry methyl chloride; purified, dried and distilled polymerization grade isobutylene; and purified, dried, and vacuum-distilled polymerization grade paramethylstyrene, with total monomer concentrations ranging between 4 and 80%; and para-methylstyrene on isobutylene ranging between 0.5 and 400% by weight. The feed charge was cooled with stirring by immersion in the controlled temperature heat transfer bath, and polymerization was initiated by slowly dripping catalyst solution into the cooled stirring feed blend from a Jacketed and cooled dropping funnel. The catalyst solution consisted of a Lewis Acid (ethyl aluminum dichloride or aluminum chloride, as indicated in Table I) dissolved in purified, dry, methyl chloride at a concentration of from 0.1 to 0.3 wt. %, based on the monomers. The catalyst drip rate was adjusted to control polymerization rate as judged by the rate of heat evolution, and terminated when sufficient polymer had been produced. The reaction was then quenched by the addition of 25 ml. of cold methanol, and the polymer was recovered for analyses and evaluation by warming to flash off the methyl chloride and unreacted isobutylene, and by then kneading and washing in alcohol to remove unreacted para-methylstyrene and catalyst residues. An anti-oxidant (0.2% BHT) was then mixed in, and the polymer was vacuum oven dried at 80° C. for 72 hours.

Rigorous attention was given to insuring the purity and dryness of all materials used, since it was desired to produce copolymers with narrow molecular weight distribution, homogeneous compositional distribution, as well as, in this Example, high molecular weight. The isobutylene used was thus greater than 99.9% pure, with traces of butenes and isobutane as the major impurities, and with a moisture content of less than 5 ppm by weight.

The methyl chloride was greater than 99.8% pure, with traces of ethyl chloride, vinyl chloride, methane, ethane, and dimethyl ether as the major impurities, and with a moisture content of less than 10 ppm by weight. The para-methyl styrene was greater than 99.7% methyl styrene (more than 97% para-methylstyrene) with traces of methyl ethyl benzenes constituting the major impurity, with less than 10 ppm of water and less than 10 ppm of carbonyls present.

The results obtained are set forth in Table I.

TABLE I

BATCH SLURRY OR SOLUTION POLYMERIZATION OF PARA-METHYLSTYRENE/ISOBUTYLENE COPOLYMERS IN METHYL CHLORIDE[1]

| Example No. | Feed % PMS/ Monomer | Catalyst Conc. | Polymerization Temp. °C. | Percent Conversion | Copolymer Product | | | | | Type of Polymerization |
|---|---|---|---|---|---|---|---|---|---|---|
| | | | | | Mv | Mn | Mw/Mn | % PMS | Nature | |
| 3 | 5.2 | 0.3 | −98 → −80 | ~100 | 458,000 | 170,000 | ~2.5 | 5.2 | elastomer | slurry |
| 4 | 10.4 | 0.1 | −98 → −96 | 41 | 361,000 | 164,000 | ~2 | 10.4 | elastomer | slurry |
| 5 | 80 | 0.1 | −96 → −84 | 71 | 390,000 | 163,000 | ~2.2 | 80 | hard plastic | solution |
| 6 | 80 | 0.1 | −62 → −56 | 56 | 163,000 | 74,000 | ~2 | 80 | hard plastic | solution |
| 7 | 5.2 | 0.1 | −64 → −58 | 66 | 255,000 | 116,000 | ~2 | 5.2 | elastomer | slurry |
| 8 | 5.2 | 0.1 | −94 → −93 | 30 | 660,000 | 300,000 | ~2 | 5.2 | elastomer | slurry |
| 9 | 10.4 | 0.1 | −99 → −98 | 7.4 | 742,000 | 337,000 | ~2 | 10.4 | elastomer | slurry |
| 10 | 15.6 | 0.1 | −95 → −92 | 35 | 241,000 | 110,000 | ~2 | 15.6 | elastomer | slurry |
| 11 | 15.6 | 0.1 | −92 → −87 | 97 | 357,000 | 149,000 | ~2.2 | 15.6 | elastomer | slurry |
| 12 | 15.6 | 0.1 | −96 | 14 | 235,000 | 107,000 | ~2 | 15.6 | elastomer | slurry |
| 13 | 20.0 | 0.3 | −95 → −92 | 59 | 256,000 | 116,000 | ~2 | 20 | sl. resinous elastomer | sl. swollen slurry |
| 14 | 20.0 | 0.3 | −99 → −96 | 27 | 253,000 | 115,000 | ~2 | 20 | sl. resinous elastomer | sl. swollen slurry |
| 15 | 1.5 | 0.1 | −97 → −93 | 28 | 2,906,000 | 1,321,000 | ~2 | 1.5 | elastomer | slurry |
| 16 | 3.0 | 0.1 | −98 → −94 | 29 | 1,168,000 | 531,000 | ~2 | 3.0 | elastomer | slurry |
| 17 | 5.2 | 0.1 | −95 → −91 | 35 | 594,000 | 270,000 | ~2 | 5.2 | elastomer | slurry |
| 18 | 5.2 | 0.1 | −95 → −92 | 25 | 602,000 | 274,000 | ~2 | 5.2 | elastomer | slurry |
| 19 | 5.2 | 0.1 | −96 → −92 | 57 | 566,000 | 257,000 | ~2 | 5.2 | elastomer | slurry |
| 20 | 5.2 | 0.15 | −95 → −91 | 24 | 1,535,000 | 698,000 | ~2 | 5.2 | elastomer | slurry |

[1]In each of these Examples, the monomer concentration in the feed was 10.8%, except for Example 20, which was 28%. Also, in each Example the catalyst employed was ethyl aluminum dichloride, except that in Examples 18 and 19 the catalyst was $AlCl_3$. The copolymers produced in each case had a substantially homogeneous compositional distribution.

These experiments demonstrate that under polymerization conditions as set forth in accordance with this invention, and using high purity and dry materials, high molecular weight uniform copolymers can be produced over a broad composition range. Reactivity ratios are such that feed and copolymer composition are essentially identical, regardless of conversion, which is a highly desirable and unexpected result. The copolymers are of uniform composition distribution, as was shown by the superimposeability of RI and UV GPC traces, and of narrow molecular weight distribution, with $\overline{M}_w/\overline{M}_n$ ratios of approximately 2. Although the molecular weight did tend to generally decline as the percent of para-methylstyrene in the copolymer increased, the polymerization conditions can be adjusted to produce high molecular weight copolymers at very high para-methyl styrene content (e.g., 80% para-methyl styrene—see Example 5).

It was also surprisingly noted that high molecular weight copolymers were produced at warmer polymerization temperatures, such as −65° C. (see Example 7), which can be economically advantageous in commercial processes.

High molecular weights were also achieved at very high conversions (see Examples 3 and 11), and in fact molecular weight did not fall as conversion was increased, as in the prior art polymerization of diene functional butyl rubbers. A comparison of Examples 11 and 12, and 13 and 14 shows that the molecular weight of the para-methylstyrene/isobutylene copolymers actually tends to rise as conversion is increased.

The data in Table I also demonstrate that, in a methyl chloride diluent, the polymerization changes from a slurry polymerization to a solution polymerization as the percentage of para-methylstyrene is increased. Solution polymerization is thus realized at above about 50 wt. % para-methylstyrene, with typical slurry polymerization below 20 wt. % para-methylstyrene. Within the intermediate range, the copolymer precipitates as a swollen slurry, and the reactor contents take on the appearance of a cement suspension (tapioca-like consistency) depending upon conditions. Thus, suitable changes in the diluent can be utilized in order to achieve the desired type of polymerization at any desired para-methylstyrene content.

EXAMPLES 21–39

Another series of high molecular weight paramethylstyrene/isobutylene copolymers were prepared by solution polymerization in a dry box in hexane or a mixed hexane/methyl chloride diluent containing enough hexane to keep the copolymer formed in solution. These polymerizations were run, and the copolymers recovered and dried for analyses and evaluations, in the same manner described in Examples 1 and 3–20. All materials were rigorously purified and dried as described above. The hexane was greater than 97 mole % normal hexane, with the only impurities being other $C_6$ saturates (primarily methyl pentanes) and it contained less than 5 ppm water by weight.

The results obtained are set forth in Table II.

TABLE II

BATCH SOLUTION POLYMERIZATION OF PARA-METHYLSTYRENE/ISOBUTYLENE COPOLYMERS IN MIXED HEXANE/METHYL CHLORIDE DILUENTS[1]

| Example No. | Feed Monomer Conc. | % PMS/Monomer | Catalyst Conc. | Polymerization Temp. °C. | Percent Conversion | Copolymer Product Mv | Mn | Mw/Mn | % PMS |
|---|---|---|---|---|---|---|---|---|---|
| 21 | 12.5 | 11.6 | 0.1 | −97 → −95 | 28 | 494,000 | 225,000 | ~2 | 11.6 |
| 22 | 82 | 5.2 | 0.12 | −66 → −62 | 6.5 | 742,000 | 337,000 | ~2 | 5.2 |
| 23 | 28 | 5.2 | 0.3 | −92 → −76 | 61 | 1,275,000 | 472,000 | ~2.5 | 5.2 |
| 24 | 28 | 5.2 | 0.3 | −94 → −90 | 36 | 1,218,000 | 554,000 | ~2 | 5.2 |
| 25 | 42.5 | 5.2 | 0.3 | −94 → −84 | 23 | 1,781,000 | 742,000 | ~2.2 | 5.2 |
| 26 | 28 | 5.2 | 0.3 | −95 → −88 | 61 | 1,219,000 | 530,000 | ~2.1 | 5.2 |
| 27 | 28 | 5.2 | 0.1 | −90 → −80 | 97 | 659,000 | 244,000 | ~2.5 | 5.2 |
| 28 | 28 | 5.2 | 0.2 | −63 → −60 | 16.4 | 396,000 | 180,000 | ~2 | 5.2 |
| 29 | 28 | 5.2 | 0.2 | −73 → −69 | 15.1 | 742,000 | 337,000 | ~2 | 5.2 |
| 30 | 28 | 5.2 | 0.2 | −78 → −75 | 19.3 | 948,000 | 431,000 | ~2 | 5.2 |
| 31 | 28 | 5.2 | 0.2 | −83 → −73 | 56 | 1,166,000 | 507,000 | ~2.1 | 5.2 |
| 32 | 28 | 5.2 | 0.2 | −90 → −86 | 12.9 | 1,252,000 | 569,000 | ~2 | 5.2 |
| 33 | 28 | 5.2 | 0.2 | −94 → −85 | 36 | 1,682,000 | 781,000 | ~2.1 | 5.2 |
| 34 | 20 | 5.2 | 0.2 | −98 → −90 | 26 | 1,323,000 | 575,000 | ~2.1 | 5.2 |
| 35 | 12 | 5.2 | 0.2 | −96 → −82 | 51 | 1,205,000 | 502,000 | ~2.2 | 5.2 |
| 36 | 28 | 10.4 | 0.2 | −94 → −86 | 26 | 910,000 | 396,000 | ~2.1 | 10.4 |
| 37 | 32 | 5.2 | 0.2 | −96 → −79 | 59 | 1,036,000 | 398,000 | ~2.4 | 5.2 |
| 38 | 32 | 5.2 | 0.2 | −66 → −55 | 30 | 362,000 | 151,000 | ~2.2 | 5.2 |
| 39 | 28 | 5.2 | 0.3 | −96 → −88 | 17 | 1,110,000 | 505,000 | ~2 | 5.2 |

[1]In each of these Examples, the diluent in the feed was a 60/40 mixture of methyl chloride and hexane, except that in Examples 22, 37 and 38 pure hexane was utilized. In each of these Examples, the catalyst employed was ethyl aluminum dichloride, except that in Example 37 AlCl$_3$ was used. The copolymer produced in each case was elastomeric, and had a substantially homogeneous compositional distribution.

These results show that by following the teachings of this invention high molecular weight uniform copolymers can also be made by solution polymerization. Thus, the change in the diluent composition did not substantially affect the relative reactivity of the monomers, and the feed and copolymer compositions remained essentially identical, regardless of conversion. Furthermore, the copolymers were of a uniform composition (superimposeable UV and RI GPC traces) and narrow molecular weight distributions. As was the case with the slurry polymerizations carried out in methyl chloride, high molecular weight copolymers ($M_n$ greater than about 100,000) can be made at much warmer temperatures (i.e., −60° C.) than is possible in the polymerization of diene-containing butyl rubber copolymers utilizing similar catalyst systems.

The 60/40 methyl chloride/hexane blend used as the diluent in most of Examples 21–39 is about the minimum hexane level required to keep the 5.2 wt. % para-methylstyrene copolymers in solution (lower hexane levels can be used with higher para-methylstyrene contents).

In addition, the same trends evident in the slurry polymerization runs of Examples 3–20 are also evident in these solution polymerizations. Molecular weight rises with feed monomer concentration, declines with increased para-methylstyrene percentage on monomers, and is relatively insensitive to conversion in a batch polymerization.

COMPARATIVE EXAMPLES 1–7

A series of examples were carried out using vinyl toluene instead of para-methylstyrene. The vinyl toluene used was the material commercially available from Dow Chemical Company as an approximately 65/35 mixture of meta- and para-methylstyrenes, and was purified by drying and vacuum distillation. The apparatus, procedures, and raw materials used were identical to those used in Examples 3–20, except that vinyl toluene was used in place of the paramethylstyrene. The data obtained is set forth in Table III.

TABLE III

BATCH SLURRY POLYMERIZATION OF VINYL TOLUENE/ISOBUTYLENE COPOLYMERS IN METHYL CHLORIDE[1]

| Compar. Example No. | Feed - % VT on Mon. | Catalyst Conc. | Polymerization Temp. °C. | % Conc. | Copolymer Mv | Mn | Mw/Mn | % VT | Comp. Dist. | Nature |
|---|---|---|---|---|---|---|---|---|---|---|
| 1 | 10.4 | 0.1 | −97 → −96 | 24 | 123,000 | ~22,000 | broad | 5.1 | more VT in low ends | soft elastomer |
| 2 | 10.4 | 0.1 | −94 → −89 | 93 | 130,000 | ~18,000 | broad | 9.0 | more VT in low ends | soft elastomer |
| 3 | 15.6 | 0.1 | −95 → −90 | 27 | 63,000 | <10,000 | broad | 7.5 | more VT in low ends | gummy |

TABLE III-continued

BATCH SLURRY POLYMERIZATION OF VINYL TOLUENE/ISOBUTYLENE COPOLYMERS IN METHYL CHLORIDE[1]

| Compar. Example No. | Feed - % VT on Mon. | Catalyst Conc. | Polymerization Temp. °C. | % Conc. | Copolymer | | | | | |
|---|---|---|---|---|---|---|---|---|---|---|
| | | | | | Mv | Mn | Mw/Mn | % VT | Comp. Dist. | Nature |
| 4 | 15.6 | 0.1 | −91 → −88 | 80 | 56,000 | <10,000 | broad | 10.0 | more VT in low ends | gummy |
| 5 | 10.4 | 0.2 | −96 → −84 | 64 | 55,000 | <10,000 | broad | 7.0 | more VT in low ends | gummy |
| 6 | 5.2 | 0.1 | −98 → −97 | 17 | 205,000 | ~25,000 | broad | 2.1 | more VT in low ends | elastomer |
| 7 | 20 | 0.3 | −96 → −86 | 92 | 50,000 | <10,000 | broad | 15.3 | more VT in low ends | soft leathery |

[1]In each of these Examples, the feed monomer concentration was 10.8%, and the catalyst employed was ethyl aluminum dichloride. VT represents Vinyl Tonuene herein.

These results demonstrate that, while vinyl toluene copolymerizes with isobutylene to form copolymers, the copolymers are of low molecular weight, broad molecular weight distribution, and are not uniform. The vinyl toluene copolymers were lower in vinyl toluene content than the feed utilized therein, and composition varied with conversion. Furthermore, they were not uniform, and the vinyl toluene tended to be concentrated in the lower molecular weight species of the molecular weight distribution. Furthermore, the viscosity average molecular weight of the vinyl toluene copolymers was less than about one-third that of the comparable para-methylstyrene copolymers. The molecular weight distributions of the copolymers were very broad, so that $\overline{M}_n$ was more than an order of magnitude lower than those of corresponding para-methylstyrene copolymers. In fact, $\overline{M}_n$ was so low that they could not be accurately measured with the high molecular weight GPC column set used, nor could the $\overline{M}_w/\overline{M}_n$ ratio be accurately measured.

EXAMPLE 40

This experiment was conducted in order demonstrate operability in a large scale, continuous process, and to produce larger quantities of the paramethylstyrene/isobutylene copolymers of the present invention. Polymerization was carried out in a blocked fashion using an 1800-gallon continuous polymerization reactor. This experiment was conducted by preparing an isobutylene/methyl chloride blend in a blend drum and then injecting the desired quantity of paramethylstyrene into this blend to form the paramethylstyrene/isobutylene/methyl chloride feed, which was then fed to the reactor. The reactor feed blend was chilled and fed into the reactor at a rate of about 26,000 pounds per hour. A catalyst solution consisting of 0.05% activated aluminum chloride in methyl chloride, or 0.1 to 0.5% ethylaluminum dichloride in methyl chloride was also chilled and fed into the reactor at rates of between 300 and 3500 pounds per hour, which were adjusted to vary the conversion and to thus produce para-methylstyrene/isobutylene copolymers of varying molecular weights. Reactor temperature was controlled by boiling ethylene in the reactor jackets, and varied between −98° C. and −87° C. during various portions of the run. The production rate of the copolymer varied between about 4500 and 6500 pounds per hour, at conversions of between 70% and nearly 100%.

The copolymers were then recovered and finished, with 0.2% BHT and 0.5% calcium stearate added as stabilizers. A range of paramethylstyrene/isobutylene copolymers was thus produced. The copolymers had para-methylstyrene contents of between about 2.5 and 16 wt. %, and molecular weight corresponding to about 23 Mooney viscosity at 125° C., up to about 1,400,000 $M_v$ (well beyond the measurable Mooney range), and $\overline{M}_w/\overline{M}_n$ of about 2–2.5.

EXAMPLE 41

A high molecular weight random uniform copolymer of para-methylstyrene and isobutylene prepared in the manner set forth in Examples 3–20 was dissolved in hexane to provide a 12 wt. % solution. Uncatalyzed bromination reactions in the absence of light were then attempted, using procedures similar to those normally employed in the laboratory for ionic isoprene butyl brominations. These experiments, however, were unsuccessful.

The copolymer utilized in this Example had an $\overline{M}_v$ of 396,000 and contained 5.2 wt. % paramethylstyrene. The copolymer was dissolved in dried normal hexane in a two-liter baffled and jacketed resin flask set up for bromination with a four-neck resin flask top. An air-driven turbine mixer was used to provide efficient mixing, and a thermometer and thermocouple were used to measure and control the temperature, which was adjusted as noted hereinbelow by circulating a controlled temperature heat transfer fluid through the jacket. One of the necks was used for mounting a dropping funnel containing the bromine solution, which was dipped into the reactor. The funnel and reactor were foil wrapped to exclude light. A nitrogen bubbler tube with a sintered glass frit at the end was mounted in one of the necks, with the frit immersed in the reactor solution to provide nitrogen sparging at a rate which was set and controlled by a rotometer. The fourth neck was connected by plastic tubing to a knock-out trap and caustic scrubber in order to maintain several inches of water positive pressure during reaction, and to absorb and neutralize any HBr and bromine vapors given off during the reaction.

The bromine solution was prepared by adding a weighed amount of bromine to pure mole-sieve dried n-hexane (essentially olefin-free) in the dropping funnel, and mixing to form less than a 30% solution. The bromine dropping funnel was then mounted on the stirred, temperature-controlled, nitrogen-purged, foil-wrapped reactor, and the bromine solution was allowed to drip in to brominate the copolymer. After the desired reaction time (noted hereinbelow) had elapsed, excess dilute caustic solution was fed into the reactor from a second dropping funnel in order to quench the reaction by reacting with any remaining bromine, and the unstripped portion of the hydrogen bromide produced therein. The quenched reactor contents were then transferred to a washing/deashing reactor, where the copolymer solution was given from six to eight water washes by alternatively mixing in about an equal volume of distilled water and then allowing it to settle and draining off the wash water. Dilute caustic was added to the first wash water when it was necessary to carry out a basic wash, and 10% isopropanol was added to the wash water to achieve better contacting and faster separation. The washed copolymer solution was then either steam-stripped to flash off the hexane or precipitated and kneaded in isopropanol to extract the hexane and recover the wet polymer. After suitable stabilizers were mixed into the wet recovered copolymer, it was vacuum-oven dried at ~70° C. to recover any dried brominated copolymer for analyses and evaluation.

Although any dark bromination reaction would not be observable in the foil-wrapped reactor, the bubbling rate in the final caustic scrubber through which the vented off-gasses were passed provided a good indication of the rate at which the bromination reaction was occurring. The reaction was started with a very low nitrogen bubble rate, which was maintained and held constant (rotometer setting) throughout. As the bromination reaction progresses in an isoprene butyl bromination, hydrogen bromide produced therein is sparged out of the solution, causing the bubble rate to increase, and once the bromine is consumed and by-product HBr production ceases, the bubble rate slows again to the initial rate. In the present Example, however, it was observed that there was no noticeable increase in bubble rate, and the recovered copolymer contained only traces of bromine, which indicated that bromination of the para-methylstyrene/isobutylene copolymer did not take place. This result was observed in a series of runs, in which the bromination temperature was varied between $-10°$ and $60°$ C., the reaction time was extended to greater than 60 minutes, and the bromine charge was varied between 1 and 20 wt. % on copolymer. Even when the diluent was switched to dry heptane, and the reaction temperature was increased to 90° C., no appreciable bromination occurred. Similar results were observed when the solvent was cyclohexane, and when polarity was increased by using a methylene chloride/hexane blend with just enough hexane to dissolve the copolymer. This Example clearly shows that para-methylstyrene/isobutylene copolymers are far less reactive with bromine under typical butyl bromination conditions (ionic reaction in the absence of light) than are the olefin-containing butyl rubber copolymers, and that uncatalyzed brominations of paramethylstyrene/isobutylene copolymers do not occur to any appreciable extent under bromination conditions known to brominate isoprene-containing butyl rubber.

EXAMPLE 42

A high molecular weight random, uniform copolymer of para-methylstyrene and isobutylene prepared in the manner set forth in Examples 3–20 was dissolved in dried normal hexane under nitrogen purge to form a 3.5% solution. The copolymer contained 15.6 wt. % paramethylstyrene, and had an $\overline{M}_v$ of 241,000. Bromination of this copolymer was then carried out using the apparatus and procedures set forth in Example 41, except that in this case the reactor was not foil wrapped, and a lighted 500 watt tungsten light bulb was mounted immediately next to the reactor (the bromine dropping funnel was foil wrapped to protect it from the light). The reactor was heated to 40° C. and with stirring, slow nitrogen purging, and illumination, the bromine solution was dripped in. The bromine charge was 5% on the copolymer, and the reaction occurred rapidly as the bromine was added, as evidenced by rapid HBr evolution and rapid fading of the color of the solution. Bromine was added over the course of two minutes, and the reaction was quenched with excess caustic ten minutes after bromine addition had been initiated. The quenched solution then was washed with water, and the brominated copolymer was recovered by alcohol precipitation and vacuum oven drying as previously described. BHT and tetramethylthiuram disulfide were mixed into the copolymer at 0.1% by weight as stabilizers prior to drying. The recovered brominated copolymer was soluble in diisobutylene, had an $\overline{M}_v$ of 254,000, and included 1.26 wt. % bromine as measured by Dietert analysis. Analysis using 400 MHz NMR showed the presence of 0.9 mole % benzylic bromide group, with no other brominated structures detectable. GPC analysis using UV and RI detectors showed the brominated copolymer to be a uniform, homogeneous compositional distribution, narrow molecular weight distribution ($\overline{M}_w/\overline{M}_n \sim 2$) functional copolymer.

The brominated copolymer gave a good vulcanizate with a zinc oxide cure.

As opposed to the results of Example 41, this shows that radical bromination of paramethylstyrene/isobutylene copolymers proceeds readily with actinic white light as the initiator, and that substitution occurs specifically and cleanly on the paramethyl group to introduce the desired active primary benzylic bromine, and without appreciable polymer breakdown or cross-linking.

EXAMPLE 43

This experiment was conducted in order to demonstrate bromination of the paramethylstyrene/isobutylene copolymers using a chemical radical initiator. A five-liter baffled resin flask set up as discussed above (except without the use of the 500 watt tungsten light bulb) was charged with 2,833 g of molecular sieve-dried heptane and 500 g of a random uniform copolymer of para-methylstyrene and isobutylene prepared as in the manner set forth in Examples 3–20 in a continuous low-temperature, one-gallon pilot plant reactor. The copolymer contained 7.2 wt. % paramethylstyrene and had an $\overline{M}_v$ of 65,000. It was stirred under nitrogen purge to form a 15 wt. % solution, and then heated to 75° C. before adding 0.6 g of azo bis isobutyronitrile (AIBN). This amount of AIBN thus added as a radical initiator amounted to 0.12% on copolymer, or 180 ppm on total solution. Immediately thereafter, a 30% solution of bromine in molecular-sieve dried heptane was added quickly from a dropping funnel, and the reaction was stirred at 75° C. with slight nitrogen purge and exposed to normal diffuse laboratory light for 31 minutes before being quenched with excess dilute caustic. The bromine charge was 15 wt. %. on copolymer. The reaction mixture turned a deep reddish amber color as the bromine was added, and HBr evolution was evident by an increase in the bubble rate of the vent gas. The color in the reactor also gradually faded, giving further evidence of reaction. After 31 minutes, the color had faded to a light amber, evidencing that most of the bromine had been consumed, and the reaction was quenched with excess caustic. The quenched solution was cooled and washed, and the brominated copolymer was recovered by alcohol precipitation and vacuum oven drying with 0.1% BHT and 0.1% tetramethylthiuram disulfide added as stabilizers. The recovered brominated copolymer had an $\overline{M}_v$ of 57,000 and included 5.6 wt. % bromine as measured on a calibrated Princeton Gamma Tech. bromine analyzer. Analysis using a 400 MHz NMR showed the presence of 2.4 mole % benzylic bromide groups, with no other brominated structures being detectable. GPC analysis using UV and RI detectors showed the brominated copolymer to be a uniform, narrow molecular weight distribution ($\overline{M}_w/\overline{M}_n$ 2) functional copolymer. Detailed sequence analyses using carbon 13 NMR in conjunction with the other techniques showed that the brominated copolymer was a random, uniform, narrow molecular weight distribution, polymer comprising isobutylene and para-methylstyrene, some of which was in the unbrominated form and some of which was in the form of para-methyl brominated para-methylstyrene. This polymer resulted in a good, tightly cross-linked vulcanizate with a zinc oxide core system.

This reaction was repeated with the reactor being exposed to diffuse laboratory light, and with AIBN, but with the temperature at 30° C. instead of 75° C., there was no indication of any reaction. Furthermore, the recovered copolymer contained only a trace of bromine (less than 0.1 wt. %), and showed no detectable amount of benzylic bromide group by NMR analyses. It failed to give any vulcanization activity with zinc oxide or with promoted zinc oxide vulcanization systems. The recovered copolymer had an $\overline{M}_v$ of 65,000 with 7.2 wt. % para-methylstyrene and appeared to be identical to the starting copolymer, thus demonstrating that the AIBN was ineffective at initiating the bromination reaction at this lower temperature. This Example showed that AIBN is an effective initiator at 75° C., where its half-life is about 100 minutes, but is ineffective at 30° C., where its half-life is greater than 100,000 minutes. Other experiments have shown that bis azo compounds are effective initiators under conditions where their half-life is between 0.5 and 2,500 minutes, and that the bromination reaction rate can be adjusted as desired by choosing the appropriate his azo compound, its concentration, and the reaction temperature. AIBN is an effective initiator for this bromination reaction at temperatures between about 55° and 100° C., and at concentrations of between 0.02 and 1 wt. % on copolymer. Other radical initiators can also be used, but it is preferred to use a radical initiator which is relatively poor at hydrogen abstraction, so that it reacts preferentially with the bromine molecules to form bromine atoms rather than with the copolymer or solvent to form alkyl radicals. These other radical initiators tend to cause more copolymer molecular weight loss, and promote undesirable side reactions such as cross linking.

EXAMPLE 44

A random, uniform copolymer of paramethylstyrene and isobutylene similar to that used in Example 43 was brominated using light as the initiator, and then vulcanized. The copolymer contained 7.3 wt. % para-methylstyrene, and had an $\overline{M}_v$ of 68,000. A 5 liter resin flask set up, as previously described for bromination, was charged with 400 g of the copolymer and 2,933 g of molecular sieve-dried normal hexane. The flask was stirred under slow nitrogen purge to form a 12 wt. % solution and then heated to 35° C. The reactor was illuminated with a 150 watt spotlight mounted adjacent to it, and a 30 wt. % solution of bromine in molecular-sieved dried normal hexane was dripped in from the dropping funnel to effect bromination, while the reactor was stirred under slight nitrogen purge and under illumination from the 150 watt spotlight. A total of 60 g of bromine (15% on copolymer) was dripped in over the course of 30 minutes, with the drip rate being adjusted to maintain a light orange-yellow color in the reactor, and a moderate HBr evolution rate as judged by the bubbling rate of the vent gas. It was evident that the bromination reaction was being initiated, and that the reaction rate was most rapid in the portion of the reactor closest to the spotlight, as color was always lighter in this area. The reaction was stirred under illumination another 15 minutes after completion of the bromine addition, at which point the bromine color had entirely disappeared, and the bubble rate had fallen back to the original rate. The reaction was then quenched with excess dilute caustic solution, the solution was washed, and the copolymer was recovered and dried as described above, with 0.1% BHT and 0.1% tetramethylthiuram disulfide being mixed in as stabilizers prior to vacuum oven drying. The recovered brominated copolymer had an $\overline{M}_v$ of 70,000, and 5.6 wt. % bromine as measured by the Dietert method. Analysis on the 400 MHz NMR showed the presence of 2.4 mole % benzylic bromide groups and 1.2 mole % remaining unbrominated para-methylstyrene. About two-thirds of the para-methylstyrene had been brominated, and there was a just-detectable amount (~0.1 mole %) of dibromomethyl group present. No other brominated structures were detectable. GPC analyses using RI and UV detectors showed the brominated polymer (containing 96.4 mole % isobutylene, 1.2 mole % paramethyl styrene, and 2.4 mole % para bromo methyl styrene) to be uniform and homogeneous compositional distribution with a narrow molecular weight distribution ($\overline{M}_w/\overline{M}_n$~2). Even at this high bromination level there was no molecular weight loss or undesirable side reactions, other than the beginnings of some dibromination of the paramethyl group, The active bromine-containing terpolymer thus produced was then compounded, vulcanized, and evaluated for curing activity and vulcanizate properties, using standard rubber laboratory techniques. A compound comprising 100 parts by weight of brominated polymer, 50 parts by weight of N220 carbon black, and one part by weight of stearic acid was mixed in a laboratory Banbury®, and then portions of this compound were accelerated with various vulcanization systems on a rubber compounding mill. The accelerated compounds were evaluated for vulcanization activity using a Monsanto oscillating disk rheometer, and then physical properties of the vulcanizates were evaluated by vulcanizing test pads under various cure conditions and evaluating stress-strain properties on an Instron® Tensile Testing Machine using standard tensile test specimen dumbbells cut from the pads. All compounding, vulcanization, conditioning and testing was done in accordance with ASTM and standard rubber laboratory practices. Results of this evaluation showed that the polymer had excellent vulcanization activity. Very fast, tight cures were obtained with zinc oxide alone as the vulcanization system and with various promoted zinc oxide systems.

This Example thus shows that highly useful, active bromine-containing terpolymers can be prepared by light-initiated radical bromination of the paramethylstyrene/isobutylene copolymers of this invention.

EXAMPLES 45–79

In order to demonstrate the utilization of alternative initiators for selective bromination of the copolymers of this invention in accordance herewith, a further series of radical brominations of the paramethylstyrene/isobutylene copolymers of this invention were run and the results thereof are set forth in Table IV.

TABLE IV

RADICAL BROMINATIONS OF PARA-METHYLSTYRENE/ISOBUTYLENE COPOLYMERS[1]

| | Copolymer | | Bromination Conditions | | | | | | | Product | | |
|---|---|---|---|---|---|---|---|---|---|---|---|---|
| | Para- | | Solu- | | | Bromine | | Bromi- | | | | |
| Exam- | methyl- | | tion | Initiator | | Charge | | nation | | Mole % | | Weight |
| ple | styrene | | Conc. | | % on | % on | Temp. | Time | | Bromination | | % Bro- |
| No. | Wt. % | Mv | Solvent | % | Type | Poly | Polymer | °C. | (Min.) | Mv | Mono | Di | mine |

| No. | Wt.% | Mv | Solvent | Conc.% | Type | % on Poly | % on Polymer | Temp °C | Time (Min.) | Mv | Mono | Di | Wt% Br |
|---|---|---|---|---|---|---|---|---|---|---|---|---|---|
| 44 | 5.2 | 600,000 | hexane | 15 | light | — | 6.5 | 31 | 13 | 600,000 | 1.35 | <0.05 | 2.7 |
| 45 | 6.6 | 67,000 | hexane | 15 | light | — | 10 | 37 | 25 | 69,000 | 1.55 | <0.05 | 3.3 |
| 46 | 7.2 | 65,000 | hexane | 15 | light | — | 15 | 40 | 52 | 65,000 | 2.4 | 0.11 | 5.6 |
| 47 | 5.2 | 450,000 | hexane | 15 | light | — | 5.0 | 34 | 15 | 450,000 | 1.26 | <0.05 | 1.8 |
| 48 | 5.2 | 290,000 | heptane | 12 | AIBN | 0.26 | 10.0 | 76 | 14 | 253,000 | 1.60 | 0.20 | 3.3 |
| 49 | 5.2 | 301,000 | heptane | 15.2 | AIBN | 0.16 | 6.5 | 67 | 51 | 273,000 | 1.18 | 0.06 | 2.14 |
| 50 | 4.6 | 85,000 | hexane | 30 | light | — | 9.0 | 41 | 58 | 83,000 | 1.40 | 0.23 | 3.3 |
| 51 | 5.2 | 770,000 | heptane | 8.75 | light & AIBN | — | 6.5 | 68 | 3 | 780,000 | 1.0 | <0.05 | 1.65 |
| 52 | 4.6 | 140,000 | hexane | 26 | light | — | 6.5 | 42 | 44 | 136,000 | 1.21 | 0.12 | 2.5 |
| 53 | 5.2 | 350,000 | hexane | 15 | light | — | 6.5 | 34 | 14 | 345,000 | 1.24 | 0.11 | 2.31 |
| 54 | 5.2 | 570,000 | heptane | 14.5 | light & AIBN | 0.18 | 6.5 | 66 | 5 | 516,000 | 1.20 | <0.05 | 2.2 |
| 55 | 6.0 | 460,000 | heptane | 15 | AIBN | 0.63 | 6.5 | 67 | 7 | 413,000 | 1.15 | <0.05 | 2.09 |
| 56 | 4.8 | 504,000 | heptane | 12.5 | AIBN | 0.25 | 6.5 | 75 | 10 | 450,000 | 1.0 | <0.05 | 1.71 |
| 57 | 4.8 | 381,000 | heptane | 12.5 | AIBN | 0.20 | 6.5 | 75 | 8 | 350,000 | 1.0 | <0.05 | 1.75 |
| 58 | 13.9 | 218,000 | heptane | 12.5 | AIBN | 0.20 | 6.5 | 74 | 5 | 215,000 | 1.62 | <0.05 | 2.48 |
| 59 | 13.9 | 218,000 | heptane | 12.5 | AIBN | 0.06 | 6.5 | 75 | 7 | 212,000 | 1.6 | <0.05 | 2.27 |
| 60 | 4.8 | 297,000 | hexane | 14.0 | VAZO 52 | 0.227 | 5.0 | 60 | 8 | 298,000 | 0.75 | 0.07 | 1.35 |
| 61 | 4.8 | 297,000 | hexane | 14.0 | light | — | 5 | 32 | 6 | 308,000 | 1.20 | <0.05 | 2.22 |
| 62 | 4.8 | 297,000 | hexane | 14.0 | light | — | 6.5 | 31 | 7 | 350,000 | 1.20 | <0.05 | 2.2 |
| 63 | 4.8 | 297,000 | heptane | 14.0 | VAZO 67 | 0.175 | 5.0 | 75 | 8 | 277,000 | 0.8 | <0.05 | 1.55 |
| 64 | 4.8 | 297,000 | hexane | 12.5 | VAZO 52 | 0.227 | 5.0 | 50 | 28 | 280,000 | 0.7 | <0.05 | 1.36 |
| 65 | 5.7 | 140,000 | hexane | 18.75 | light | — | 6.0 | 51 | 35 | 138,000 | 0.8 | <0.05 | 1.98 |
| 66 | 4.8 | 297,000 | hexane | 14.0 | light | — | 6.0 | 35 | 9 | 297,000 | 1.1 | <0.05 | 1.84 |
| 67 | 4.8 | 297,000 | hexane | 14.0 | light | — | 3.25 | 30 | 7 | 297,000 | 0.7 | <0.05 | 1.26 |
| 68 | 4.8 | 297,000 | hexane | 7.0 | light | — | 6.5 | 60 | 2.5 | 297,000 | 0.7 | <0.05 | 1.24 |
| 69 | 4.8 | 297,000 | hexane | 7.0 | light | — | 6.5 | 30 | 5 | 297,000 | 1.1 | <0.05 | 1.88 |
| 70 | 4.8 | 297,000 | hexane | 7.0 | light | — | 3.25 | 34 | 3 | 297,000 | 0.5 | <0.05 | 0.86 |
| 71 | 5.2 | 850,000 | hexane | 9.4 | light | — | 6.5 | 34 | 13 | 900,000 | 1.20 | 0.07 | 2.0 |
| 72 | 5.0 | 410,000 | heptane | 15.0 | light | — | 9.0 | 31 | 17 | 280,000 | 1.92 | 0.28 | 3.87 |
| 73 | 5.2 | 580,000 | hexane | 15.0 | light | — | 10.0 | 36 | 26 | 480,000 | 1.84 | 0.34 | 3.94 |
| 74 | 4.9 | 290,000 | heptane | 16.7 | light | — | 9.0 | 35 | 30 | 200,000 | 1.80 | 0.48 | 3.72 |
| 75 | 4.9 | 270,000 | heptane | 15.0 | light | — | 9.0 | 36 | 18 | 205,000 | 1.70 | 0.29 | 3.50 |
| 76 | 5.2 | 350,000 | hexane | 16.0 | light | — | 5.5 | 34 | 14 | 350,000 | 1.23 | 0.07 | 2.21 |
| 77 | 5.2 | 300,000 | heptane | 15.0 | AIBN | 0.17 | 6.5 | 68 | 23 | 300,000 | 1.24 | 0.07 | 2.28 |
| 78 | 5.2 | 300,000 | heptane | 15.0 | light | — | 6.5 | 66 | 8 | 300,000 | 1.37 | 0.10 | 2.52 |

[1]In each of these Examples the bromination reaction was quenched with dilute NaOH, except that in Examples 62 and 66 CaCO$_3$ powder was utilized. In none of the products were any other bromine structures detected, and in particular no bromine was thus observed either as ring bromine or on the polymer backbone chain.

The copolymers utilized in these Examples were all random, uniform, narrow molecular weight distribution copolymers prepared in accordance with his invention. Some were batch polymerized in a laboratory dry box, some were polymerized in a continuous one-gallon reactor, and still others were polymerized in an 1800-gallon continuous polymerization reactor. The copolymers covered a broad range of molecular weights and para-methylstyrene contents. The radical brominations were run in hexane or heptane solutions at concentrations ranging up to nearly 30%. The solution concentrations were generally adjusted to keep the viscosity low enough to achieve good mixing, and were thus lower with the higher molecular weight copolymers. The brominations were run in the apparatus described above using 1, 2 or 5 liter resin flasks, with light or various his azo compounds as the radical initiators. Bromination temperatures were varied between 30° and 76° C. Where his azo compounds were used as the initiator, the temperature was chosen so that the decomposition half-life of the his azo initiator was between 0.5 and 2,500 minutes. With AIBN, a lower practical bromination temperature was about 55° C.; with 2,2'-azobis (2 methyl butane nitrile) (VAZO® 67), a lower practical bromination temperature is about 55° to 60° C.; and with 2,2'-azobis (2,4 dimethylpentane nitrile) (VAZO®52), a lower practical bromination temperature is about 40° C. The light catalyzed bromination can be run at any desired temperature, but less light is required as the temperature is raised, or at a given light irradiation level, the bromination rate becomes faster as temperature is raised. Any desired bromination rate can be achieved by setting the irradiation intensity and temperature or by choosing an appropriate his azo compound and level, and temperature. Most of these runs were carried out to nearly complete exhaustion of the bromine charged, and were made with a slow continuous nitrogen purge to keep the reactor under slight pressure and sparge some of the HBr as it was liberated, with the remaining HBr and any unreacted bromine being quenched with dilute caustic prior to washing and polymer recovery. However, as noted, dried calcium carbonate powder was dispersed in the copolymer solution prior to bromination, and served to absorb the HBr as it was formed, thus eliminating the need for caustic quenching.

The data set forth in Table IV shows that the bromination reaction can be effected, and the brominated polymer recovered, without cross-linking and with minimal molecular weight change. The light catalyzed reactions for the most part show no molecular weight loss, except when bromination is pushed to the extent that dibromomethyl species are formed (see Examples 72–75). The bis azo catalyzed reactions are more prone to show slight molecular weight loss, but without any serious molecular weight degradation. Reactions catalyzed with other radical initiators such as peroxides which are capable of extracting hydrogen atoms result in more serious molecular weight loss and/or cross-linking.

Examples 44–78 further show that the controlled radical bromination of the homogeneous (uniform) compositional distribution narrow molecular weight distribution para-methylstyrene/isobutylene copolymers of this invention converts them into highly versatile and useful functional polymers.

EXAMPLES 80–85

A further series of radical brominations of the para-methylstyrene/isobutylene copolymers of this invention were run in a 100-gallon glass-lined Pfaudler reactor in order to produce larger quantities of the brominated functional polymers hereof. The Pfaudler was jacketed and temperature-controlled, bitted with a nitrogen sparget tube and vented through a knock-out trap and caustic scrubber. The Pfaudler had a variable speed anchor-type agitator and was baffled to provide good mixing. Facilities were provided to charge the bis azo initiator, bromine solution, and caustic quench solution. The quenched solution was washed in the Pfaudler by mixing with an approximately equal weight of 90/10 water/isopropyl alcohol, and then allowing separation, and draining off of the aqueous wash layer. It was given one basic wash and then water/isopropyl alcohol washes. After the final wash, 0.2 wt. % BHT based on polymer weight was added to the Pfaudler solution and stirred in. The brominated polymer was recovered by steam-stripping with 0.5 wt. % on polymer of calcium stearate added during stripping to act as a crumb stabilizer during the stripping operation. The wet crumb was dried by hot milling at about 240° F. The random, uniform, narrow molecular weight distribution para-methylstyrene/isobutylene copolymers used in these larger scale bromination reactions were prepared in a one-gallon continuous reactor (Examples 80 and 85) or in an 1800-gallon reactor (Examples 81, 82, 83 and 84).

The bis azo initiated radical chain bromination reactions proceeded with minimal copolymer breakdown or cross-linking, and bromine substitution occurred almost exclusively on the para-methyl group. In fact, no other brominated structures were detected.

GPC analysis of these brominated and unbrominated polymers using UV and RI detectors showed them to be of homogeneous compositional distribution with $\overline{M}_w/\overline{M}_n$ ratios of about 2 and with essentially superimposeable RI and UV traces comparable to that of the Figure herein.

The brominated polymer of Example 81 in Table V had a Mooney of 31 (1+8 @125° C.) and contained about 1.8 wt. % bromine. Its composition was 0.85 mole % of the brominated para-methylstyrene, 1.5 mole % paramethylstyrene, and 97.65 mole % isobutylene. It was a rubbery, tough elastomer with a Tg of about −60° C. A compound comprising 100 parts by weight of brominated polymer, eight parts of Atomite® calcium carbonate, and one part of stearic acid was prepared on a rubber mill. Portions of this compound were accelerated with various vulcanization systems on a second rubber compounding mill, and then evaluated for vulcanization activity using a Monsanto Rheometer @160° C. using a 3° arc at 1.7 Hz. The rheometer cure curves for the various cured compounds were all indicative of good vulcanization, with delta torque ranging from 38.5 to 32.2, and were comparable to those of isoprene-containing butyl and halobutyl rubbers.

TABLE V

RADICAL BROMINATIONS OF PARAMETHYL STYRENE/ISOBUTYLENE COPOLYMERS IN PFAUDLER

| | Copolymer | | | Bromination Conditions | | | | | |
|---|---|---|---|---|---|---|---|---|---|
| Example No. | Mooney 1 + 8 @ 125° C. | Para-methyl/ styrene Wt. % | Lbs. Charged to Pfaudler | Solvent | Solution Conc. % | Initiator Type | % on Polymer | Bromination Charge % on Polymer | Temp. °C. |
| 80 | 30 | 5.0 | 34.5 | heptane | 10.5 | AIBN | 0.25 | 6.0 | 82 |
| 81 | 31 | 4.8 | 50 | heptane | 15 | AIBN | 0.20 | 5.0 | 80.5 |
| 82 | $M_v$ = 1200K | 4.8 | 30.2 | heptane | 8.5 | AIBN | 0.20 | 6.7 | 78 |
| 83 | 31 | 4.8 | 50 | hexane | 15 | VASO 52 | 0.23 | 3.75 | 60 |
| 84 | 59 | 4.8 | 52 | hexane | 14 | VASO 52 | 0.25 | 4.2 | 57.5 |
| 85 | $M_v$ = 140K | 5.0 | 25 | hexane | 15 | VASO 52 | 0.25 | 6.5 | 61 |

| Example No. | Bromination Time, Min. | Mooney 1 + 8 @ 125° C. | Wt. % Bromine | Mole % Bromomethyl Mono | Di |
|---|---|---|---|---|---|
| 80 | 14 | 29 | 1.64 | 1.0 | <0.05 |
| 81 | 4.5 | 31 | 1.45 | 0.85 | <0.05 |
| 82 | 6.0 | $M_v$ = 1100K | 1.50 | 0.90 | <0.05 |
| 83 | 9.0 | 31 | 1.10 | 0.60 | <0.05 |
| 84 | 10.0 | 60 | 1.19 | 0.70 | <0.05 |
| 85 | 10.8 | $M_v$ = 135K | 1.80 | 1.1 | <0.05 |

EXAMPLES 86–93

Various high molecular weight random uniform copolymers of para-methylstyrene and isobutylene which had been prepared in the manner set forth in Examples 3–20 were dissolved in a diluent, and chlorination reactions were then carried out in an effort to introduce useful chlorine functionality into these copolymers, and most desirably the primary benzylic chloride by substitution on the para-methyl group. These reactions were run using the apparatus and conditions similar to those set forth in Example 41. The major important difference in this case was that the chlorine was fed into the reactor as a gas through the fritted bubbler tube used for nitrogen purging during the bromination reactions. The fritted end of the bubbler tube was immersed in the copolymer solution close to the blades of the turbine mixer so that tiny chlorine gas bubbles exiting the frit were immediately well mixed into the solution to provide good contacting. The chlorination reactions were run by joining the nitrogen and chlorine supply lines to the bubbler tube (with appropriate valving, safety regulators, etc.) so that the reactor could first be nitrogen purged, and then nitrogen could then be replaced with chlorine gas during the reaction, and finally the chlorine gas could be replaced with nitrogen after the reaction, with the reactor continually being under a slight positive pressure to exclude air. The chlorine gas was supplied by vaporizing liquefied chlorine from a cylinder through a pressure regulator and knockout pot (to keep any liquid chlorine droplets from entering the reactor) and its rate was measured and controlled by a calibrated rotometer. Normally either nitrogen or chlorine was fed separately through the fritted bubbler tube into the reactor, but obviously during the transitions between gasses a mixture was fed, and a controlled mixture could be fed continuously if desired. A second difference between the chlorination reactions of this example and the brominations of Example 41 was that no attempt was made to exclude light during the chlorination reactions which were all run under moderate diffuse normal laboratory light, since experience has shown that chlorination reactions are not normally affected by such light. The chlorination reactions were run at a temperature which was controlled by circulating a temperature-controlled heat transfer fluid through the reactor jacket. The reactions were caustic quenched and washed, and the copolymers recovered and dried as outlined above.

EXAMPLE 86

A para-methylstyrene copolymer, containing 5.2 wt. % para-methylstyrene, with an $\overline{M}_v$ of 396,000, was dissolved in cyclohexane to form a 12 wt. % solution, and chlorinated at 30° C. by bubbling about 5 wt. % chlorine on copolymer through the solution and allowing a total reaction time of about 30 minutes before quenching. The recovered copolymer was unchanged from the starting copolymer, with a chlorine content of less than 0.05 wt. %. A series of reactions run by varying reaction time, and the chlorine charge were likewise unsuccessful. The para-methylstyrene/isobutylene copolymers are thus far less reactive under conditions typically used to chlorinate isobutylene-isoprene copolymers than are the diene-functional butyl rubber copolymers.

EXAMPLE 87

The 5.2 wt. % para-methylstyrene copolymer of Example 86 was dissolved in a 90/10 volumetric blend of dried methylene chloride/hexane solvent to form a 10 wt. % solution, and 5 wt. % stannic chloride on polymer was added as a Friedel-Crafts catalyst. The solution was chlorinated at 5° C. by bubbling 5 wt. % chlorine on copolymer through the solution and allowing a total reaction time of 30 minutes before quenching. The recovered polymer contained 1.5% chlorine with an $\overline{M}_v$ of 350,000. However, analysis of this product indicated that nearly all of the chlorine had been substituted on the aromatic ring, and the chlorinated copolymer gave no vulcanization response when compounded and cured as described herein with promoted ZnO cure systems. Use of a polar diluent and a Friedel-Crafts catalyst did permit chlorination to occur, but it resulted in the incorporation of relatively unreactive ring substituted aromatic chlorines, which are not highly useful functional groups. None of the desired active primary benzylic chloride resulting from substitution on the para-methyl groups was formed. Additional experiments with various Friedel-Crafts catalysts and chlorine charges gave similar ineffective results.

EXAMPLE 88

A further series of chlorinations were run in a more polar diluent, but without adding any Friedel-Crafts catalysts. The copolymer used in this Example was the same one used in Examples 86 and 87. In this Example, methylene chloride was used as the polar diluent, but with enough hexane or chloroform present to keep the copolymer in solution. A 90/10 volumetric methylene chloride/hexane blend or an 80/20 volumetric methylene chloride/chloroform blend was thus found to be a satisfactory solvent for this high isobutylene content copolymer. In this Example, the chlorination temperature was varied between 0° and 30° C., and the chlorine charge between 2 and 10 wt. % on copolymer. In this polar diluent chlorination of the copolymer did occur in all cases, but the reactions were very inefficient, with less than 25% of the chlorine charged being found in the copolymer, and the chlorine found to be essentially random with all 24 hydrogen atoms on and in the vicinity of its enchained para-methylstyrene moiety being substituted. Typically, less than 5 wt. % of the chlorine charged was found in the primary benzylic position.

The selectivity of the reaction was not found to be significantly affected by temperature over the range studied, but copolymer molecular weight loss did become more severe as the temperature was raised and the chlorine charge rate increased. Uncatalyzed chlorination was thus not found to be an efficient way of introducing benzylic chloride functionality into para-methylstyrene/isobutylene copolymers.

EXAMPLES 89–94

Another series of Examples was carried out to determine whether the chlorination reaction can be made more selective by using preformed or "in-situ" formed sodium hypochlorite or t-butyl hypochlorite as the chlorinating agent, instead of molecular chlorine.

As the work with molecular chlorine summarized in Examples 86–88 demonstrated, the chlorinations of Examples 82–87 were also much more efficient when a polar diluent is used. The beneficial effect of the polar diluent can be clearly seen by analyzing the results in Example 82 using preformed sodium hypochlorite as the chlorinating agent and methyl trialkyl ammonium chloride (Adogen®465) as a phase transfer agent to achieve contact between the aqueous sodium hypochlorite phase and the copolymer solution phase.

EXAMPLE 89

In this Example a para-methylstyrene/isobutylene copolymer solution containing the Adogert 464 phase transfer agent was prepared and poured into freshly prepared aqueous sodium hypochlorite solution, and the mixture was stirred to effect chlorination. After the desired reaction time, the mixture was allowed to separate, the copolymer solution was washed, and the copolymer was recovered and dried.

EXAMPLES 90–94

A further series of Examples utilizing "in-situ" formed sodium hypochlorite/t-butyl hypochlorite as the chlorinating agent were then carried out, and the results are set forth in Table VI.

TABLE VI

CHLORINATION OF PARA-METHYLSTYRENE/ISOBUTYLENE COPOLYMERS WITH "IN-SITU" SODIUM HYPOCHLORITE/T-BUTYL HYPOCHLORITE[1]

| | Copolymer | | | Chlorination Conditions | | | | Product | | |
|---|---|---|---|---|---|---|---|---|---|---|
| | | | | | | | Chlorine | | | |
| Example No. | Para-methyl-styrene, Wt. % | $M_v$ | Solvent | Solution Conc. | Temp. °C. | Time min. | Charge Wt. % on copolymer | Percent Chlorine | $M_v$ | Mole % Chloromethyl |
| 90 | 5.2 | 458,000 | 80% $CH_2Cl_2$ 20% $CHCl_3$ | 2% | 0° C. | 30 | 20 | 4.6 | 276,000 | 0.7 |
| 91 | 20 | 345,000 | $CH_2Cl_2$ | 3% | 0° C. | 30 | 10 | 5.2 | 340,000 | 0.8 |
| 92 | 15 | 261,000 | 80% $CH_2Cl_2$ 20% $CHCl_3$ | 4% | 0° C. | 30 | 20 | 4.33 | 260,000 | 0.7 |
| 93 | 10 | 645,000 | $CH_2Cl_2$ | 7.7% | 0° C. | 30 | 20 | 5.83 | 650,000 | 0.9 |
| 94 | 7.3 | 64,700 | $CH_2Cl_2$ | 10% | 0° C. | 30 | 17 | 6.21 | 70,000 | 1.0 |

[1]In each of these Examples the chlorination was quenched with dilute NaOH.

The sodium hypochlorite solution was prepared using the 2 liter resin flask set up described in Example 40, and 900 g of 10% aqueous NaOH solution was charged to the reactor, cooled to −4° C., and then converted to hypochlorite by bubbling chlorine gas into the stirred solution through the fritted bubbler tube. A slight stoichiometric excess of chlorine was charged, and the resulting sodium hypochlorite solution was a greenish-yellow and slightly acidic. The copolymer solution was added immediately, with rapid stirring, and the coarse emulsion thus produced was then heated to 30° C. with stirring and allowed to react. In a first run, 1,000 g of a 10% methylene chloride solution of a 7.2 wt. % para-methylstyrene/isobutylene copolymer with an $\overline{M}_v$ of 65,000 was poured into the freshly prepared hypochlorite solution and allowed to react for two hours at 30° C. In a second run, 750 g of a 16% hexane solution of a 4.8 wt. % para-methylstyrene/isobutylene copolymer with an $\overline{M}_v$ of 280,000 was poured into the freshly prepared hypochlorite solution and allowed to react for two hours at 30° C. The copolymer recovered from the first run, with the polar methylene chloride solvent, contained 6.79% chlorine, with about 0.7 mole % of the desired chloromethyl styryl moiety having been formed. It was vulcanizable with zinc oxide to yield a well-cross-linked elastomer. The copolymer recovered from the second run, with the non-polar hexane solvent, contained only 0.85% chlorine with less than 0.1 mole % of the desired chloromethyl/styryl moiety having been formed. It was not vulcanizable with zinc oxide to yield an elastomeric network.

This Example demonstrates that the chlorination is more effective in a polar solvent, and that a copolymer containing active amounts of the desired primary benzylic chloride functionality can be prepared using preformed sodium hypochlorite as the chlorinating agent and a phase transfer catalyst to promote the reaction. However, even under these conditions, most of the chlorine is substituted into other positions around the enchained para-methylstyryl moiety, with less than 10% of the chlorine being substituted as desired on the pare-methyl group.

All of these Examples were run in the apparatus previously described. The paramethylstyrene/isobutylene copolymers were either dissolved in a methylene chloride/chloroform mixed solvent, or dispersed as dilute cement suspensions in methylene chloride. The cement suspensions were prepared by stirring the copolymers in methylene chloride at ambient temperature and then cooling to reaction temperature. Although the low paramethylstyrene content copolymers are not soluble in methylene chloride, they are swollen enough by it to be broken up into very fine droplets of a viscous methylene-chloride-swollen, polymer-rich liquid dispersed in methylene chloride containing some dissolved copolymer. Copolymers above 7.5 wt. % paramethylstyrene content are easily handled in this way as cement suspensions. At high para-methylstyrene contents true solutions in methyl chloride are formed. True solutions of the low para-methylstyrene copolymers result where a cosolvent such as hexane or chloroform is added to the methylene chloride dispersion.

In carrying out these experiments, 0.5% by weight of t-butanol and 0.5% by weight of 1N NaOH solution (on solvent) were added and dispersed in the solution prior to chlorination. The dispersions developed a typical yellow-green hypochlorite color as the chlorine was bubbled in. The solutions or dispersions were quenched, washed and recovered as previously described. Results of those experiments as set forth in Table VI show that chlorination reactions occurred in all cases, and that active amounts of the desired primary benzylic chloride functionality were introduced as determined by vulcanization with zinc oxide. Nevertheless, in all cases, most of the chlorine was substituted in positions other than on the paramethyl group which is the most desired position.

Polymer breakdown was not significant, except in Example 83, in which a high chlorine charge rate was used in conjunction with a low para-methylstyrene-content copolymer and a dilute solution.

EXAMPLE 95

In order to demonstrate the broad range of para-methylstyrene/isobutylene copolymer compositions which can be prepared in accordance with this invention, glass transition temperatures were determined for a series of para-methylstyrene/isobutylene copolymers of varying composition prepared as outlined in the previous examples. The copolymers were all uniform and random, with narrow molecular weight distributions. The entire copolymer composition range was prepared and measured, from polyisobutylene to polyparamethylstyrene. The measurements were made using 15 mg. samples of the copolymers with a Perkin-Elmer 7 Series thermal system at a heating rate of 20° C. per minute. The results obtained are set forth in Table VII.

TABLE VII

| P-methylstyrene % Wt. in Copolymer | Tg, °C. |
|---|---|
| 0 | −63 |
| 4.7 | −59 |
| 10.0 | −56 |
| 15.8 | −51 |
| 19.0 | −48 |
| 23.8 | −39 |
| 49.8 | −12 |
| 85.7 | 91 |
| 100 | 113 |

The glass transition temperature (Tg) rose regularly from −63° C. for polyisobutylene to +113° C. for polyparamethylstyrene, with the rate of rise being modest as small amounts of para-methylstyrene were copolymerized with isobutylene, and the rate of drop being rather sharp as small amounts of isobutylene were copolymerized with para-methylstyrene. There was a fairly slow rise in Tg with increasing amounts of para-methylstyrene up to about 20 wt. % (10.5 mole %), which was then more rapid with further increases in the para-methylstyrene content of the copolymer. This behavior demonstrated that substantial amounts of para-methylstyrene can be copolymerized with isobutylene to provide functionalization sites in a low Tg elastomeric copolymer. The 19 wt. % para-methylstyrene copolymer still has a Tg of −48° C., whereas a linear rise of Tg with para-methylstyrene content would have given a Tg of above −30° C. at this composition.

The copolymers hereof with less than 20 wt. % para-methylstyrene had a Tg which was sufficiently low to function as useful elastomers. At higher paramethylstyrene contents, the copolymers become increasingly leathery and resinous, and eventually they become hard plastics at ambient temperature. Thus, copolymer compositions of the present invention can be selected to provide utility in a broad range of applications.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

EXAMPLE 96—PREPARATION OF GRAFT COPOLYMERS (A)(i) Polyisobutylene-Polystyrene Graft Copolymers In this Example, a graft copolymer of Formula (I) was produced in which a was 980, b was 10, c was 6, d was 4, R and R' were each hydrogen, X was bromine and Nu was polystyryl lithium. It is noted that, in each of Examples 96(A)(1)-(iii) all of the reactions and reagents were handled under vacuum or inert atmosphere (nitrogen or argon), with careful exclusion of water and oxygen. Styrene was dried with triethylaluminum or dibutylmagnesium, and the polymerization solvent (heptane, hexane or tetrahydrofuran) was dried over sodium naphthalenide or butyllithium. All glassware, syringes, and needles were oven dried at 150° C., for three hours. The hot glassware was cooled and assembled under inert atmosphere, usually in a dry box.

The graft reaction of polystyrene to the isobutylene copolymer was carried out in a high vacuum apparatus. The system consists of 1 liter flasks (A and B) which are connected by a teflon stopcock. Another stopcock attaches the entire apparatus to the vacuum line through flask A.

After the apparatus was dried in an oven for over 12 hours, it was immediately put into the vacuum chamber and then moved into the drybox. A 10 gram sample of poly(isobutylene-4-bromomethylstyrene) ($M_w$=150,000, $M_w/M_n$=2.6) was charged into flask B in the drybox before degassing on the vacuum line overnight at 50° C. Dry THF (300 ml) was added to flask B by vacuum distillation from sodium naphthalenide. The polymer was dissolved, and the THF was then removed by vacuum distillation back to the THF pot. The color initially discharged, and after color return, the procedure was repeated until the color no longer discharged. During final dissolution, the apparatus was moved into the drybox and the initiator, 1 ml of 0.25M n-butyllithium/hexane was added to flask A. The quantity of initiator determined the molecular weight of the resulting polystyrene. The system was then reattached to the vacuum line and degassed before dry cyclohexane (300 ml) was vacuum distilled into flask A. Subsequently, 12 ml of styrene monomer was introduced in the same manner. The apparatus was then warmed to room temperature and stirred for three hours, after which the polymerization was completed. The graft-onto reaction was executed by opening the stopcock that joined flask B to flask A, and pouring the polystyryl lithium solution into the vigorously agitated isobutylene copolymer solution. The graft-onto reaction occurred almost instantaneously upon mixing. Before the graft copolymer was isolated the rest of the polystyryl lithium was terminated with methanol and isolated by precipitation in isopropanol (0.1% BHT). The graft copolymer was also isolated in isopropanol/BHT.

The resulting polystyrene homopolymer served as a reference, and had a narrow MW distribution ($M_w/M_n$=1.1) with $M_w$=65,000. The graft copolymer (15.2 grams) was washed with isopropanol/BHT and dried in a vacuum overnight at 45° C. GPC results indicated a broadened distribution ($M_w/M_n$=4) and $M_w$=531,000. The $^{13}C$ NMR spectrum was the combination of polystyrene (chemical shifts=145, 127, 125 ppm) and polyisobutylene (chemical shifts−59.5, 38, 31 ppm).

(A)(ii) Preparation of Polyisobutylene-g-polystyrene Copolymer

Following the procedure of Example 96(A)(i), a 10 gram sample of poly(isobutylene-4-bromomethylstyrene) ($M_w$=25,000, $M_w/M_n$=2.6) was dissolved in 200 ml of dry THF in flask B. This time the graft-onto reaction was conducted using a polymeric Grignard reagent formed by reacting the polystyryl lithium with magnesium bromide (0.5 grams). This polymeric Gridnard was then reacted in the same manner as in Example 96. There was no gelation, and the polymer was isolated by precipitation in isopropanol/BHT. The final graft copolymer was dried in a vacuum oven overnight (16 grams). GPC showed that the resulting polymer had a MW of 1 million, and approximately 30% polystyrene homopolymer.

(A)(iii) Preparation of Polyisobutylene-g-polystyrene Copolymer

The procedure for purification of the polyisobutylene copolymer and for polymerization of the styrene was followed as presented in example 96(A)(i). In this case, the polymerization solvent was cyclohexane/benzene. The resulting polystyryl lithium solution was directly reacted with the poly(isobutylene-4-bromomethylstyrene) solutions together. The resulting crosslinked material was precipitated in isopropanol. This could not be further characterized because of its insolubility.

(B)(i) Preparation of Poly(Methyl)Methylacrylate)

The preparation of the polymethylmethacrylate homopolymer was carried out in a high vacuum apparatus. The system consisted of a 1 liter flask with a stopcock. An expansion bulb (75 cc) with another stopcock attached the entire apparatus to the vacuum line through the expansion bulb.

After the apparatus was dried in an oven for 12 hours, it was cooled down while being purged with nitrogen. The flask was then attached to the vacuum rack and degassed to less than 10 microns of mercury, to assure that all moisture and air contaminants were removed. The flask was then sealed and moved to the argon dry box, where the initiator consisting of 2 ml of SEC-butyllithium/hexane ($1.04$–$10^{-4}$ moles), along with 2 ml of dry 1,1 diphenyl ethene solution ($4.4 \times 10^{-4}$ moles), were added. A deep red solution was formed in the flask. The apparatus was then reattached to the vacuum rack, where the flask was frozen in liquid nitrogen and degassed to less than 10 microns of mercury before vacuum distilling dry THF (300 ml) into the reaction flask.

Subsequently, 10 grams (0.998 moles) of methyl methylacrylate were introduced in the same manner into the reaction flask. While still frozen, the reaction flask was again degassed to less than 10 microns and sealed. The apparatus was then placed in a dry ice acetone bath and allowed to warm to $-78°$ C. The reaction was kept at $-78°$ C. for an additional 60 minutes to allow full conversion of the monomer, at which time methanol was added to the expansion bulb, degassed five times to remove any air, and then introduced to the reaction flask, where the polymerization was terminated. The homopolymer was isolated in methanol and dried in a vacuum oven overnight at room temperature. GPC results indicated a molecular weight distribution ($M_w/M_n$) of 1.27, with a peak molecular weight ($M_w$) of 68,565.

(B)(ii) Preparation of Poly(t-butyl Methacrylate)

In this case, preparation of the homopolymer was carried out under an- argon atmosphere. All glassware was oven dried for 12 hours and then purged with nitrogen as it was cooled. A two-neck 500 ml flask equipped with a stirring bar, argon purge, and a rubber septum was used. Both solvent and monomer were freshly distilled, placed in flasks, and placed in the argon dry box.

The flask was then placed in the argon dry box where 5 ml of SEC-butyllithium/hexane ($2.6 \times 10^{-4}$) moles, along with 5 ml of dry 1,1 diphenylethene solutions ($1.1 \times 10^{-3}$) moles, were added. A deep red color was formed, and 300 ml of freshly distilled tetrahydrofuran was then added to the flask. The rubber septum was placed on one neck of the flask, and a stopper on the other. The flask was then placed in a hood, where the argon bubbler was attached. The flask was then placed in a dry ice acetone bath and cooled to $-40°$ C. The t-butyl methacrylate monomer was freshly distilled into a clean dry flask. The flask was then taken into an argon dry box, where 9.0 ml (0.077 moles) was loaded into a hypodermic needle. The needle was capped and removed from the dry box.

The t-butyl methacrylate was slowly injected into the red THF catalyst solution while at $-40°$ C. The reaction was allowed to continue for an additional 30 minutes after all of the monomer had been added. Methanol was then added to the reaction flask to terminate the polymerization. The homopolymer was isolated in water/methanol solution and dried in a vacuum oven overnight at room temperature. GPC results indicated a molecular weight distribution ($M_w/M_n$) of 1.13 with a peak molecular weight ($M_w$) of 94,707.

(B)(iii) Preparation of Polyisobutylene-g-Polymethylmethacrylate

The graft reaction of polymethylmethacrylate to the isobutylene copolymer was carried out in a high vacuum apparatus. The system consisted of two one liter flasks (A+B) which were connected by a teflon stopcock. An expansion bulb (75 cc) with another stopcock attached the entire apparatus to the vacuum line through flask A.

After the apparatus was dried in an oven for 12 hours, it was cooled down while being purged with nitrogen. A 10 gram sample of (isobutylene-4-bromo methylstyrene) (MW=289,000, $M_w M_n$=1.78) was charged into flask B, while being purged with nitrogen on the lab bench. The apparatus was then attached to the vacuum rack and degassed to less than 10 microns of mercury at room temperature. Dry THF (300 ml) was added to flask B by vacuum distillation from sodium/anthracene. The polymer was dissolved, and the THF was then removed by vacuum distillation back to the THF reservoir, and the polyisobutylene (PIB) skin was degassed to less than 10 microns of mercury overnight. The next day dry THF (300 ml) was distilled back to flask B, and after final dissolution of the polymer, the valve above flask B was closed and the apparatus moved into the argon dry box, and the initiator, 1.75 ml of SEC-butyllithium/hexane solution ($0.1 \times 10^{-5}$ moles) along with 1.75 ml of 1,1 diphenyl ethene/hexane solution ($3.8 \times 10^{-4}$ moles), was added to flask A and sealed. The apparatus was then reattached to the vacuum system, and flask A, frozen with liquid nitrogen and degassed to less than 10 microns of mercury, before vacuum distilling dry THF into flask A. Subsequently, 10 grams (0.99 moles) of methylmethacrylate monomer was introduced in the same manner into flask A. While still frozen, the reaction flask was again degassed to less than 10 microns of mercury and sealed. The flask was then allowed to warm to $-78°$ C. The reaction was allowed to mix for 50 minutes at $-78°$ C. to allow adequate time for the methylmethacrylate to fully polymerize.

The graft-onto reaction was executed by first cooling down the polyisobutylene cement in flask B to $-50°$ C. and then opening the stopcock that joined flask B to flask A, and pouring the living polymethylmethacrylate solution into the vigorously agitated polyisobutylene copolymer solution. The graft-onto reaction occurred almost immediately upon mixing. The reaction was stirred at $-50°$ C., and a small portion of the polymethylmethacrylate homopolymer solution was saved. This was terminated with methanol, and precipitated in methanol. The polymer was filtered and dried in a vacuum oven overnight.

The resulting polymethylmethacrylate homopolymer served as a reference, and had a molecular weight distribution ($M_w/M_n$=1.12) and a peak molecular weight ($M_w$) of 121,555. The graft copolymer was terminated with methanol and precipitated in acetone/IPA. The resultant liquid was centrifuged and dried in a vacuum oven overnight at room temperature. GPC results indicated a molecular weight distribution ($M_w/M_n$) of 2.08 and a molecular weight ($M_w$) of 347,398.

(B)(iv) Preparation of Polyisobutylene-g-Polymethylmethacrylate

Following the procedure of Example (B)(iii), a 10 gram sample of polyisobutylene copolymer containing 1.45 mole percent 4-bromo methylene ($M_w$=289,000) was dissolved in 300 ml of dry THF in flask B. The polymethylmethacrylate polymerization was conducted in THF at −78° C. for 60 minutes.

The graft reaction was carried out at −40° C. instead of −50° C., as in Example (B)(iii). Before the graft copolymer was isolated, a small (50 cc) remaining sample of the living polymethacrylate was terminated with methanol and isolated by precipitation in methanol. The graft copolymer, after reacting for two hours, was also terminated with methanol and isolated in 50/50 isopropanol methyl ethyl ketone.

The resulting polymethylmethacrylate homopolymer served as a reference and had a molecular weight distribution ($M_w/M_n$) of 1.17, and a peak molecular weight ($M_w$) of 129,026. The graft copolymer was washed with isopropanol, and dried in a vacuum oven overnight at room temperature. GPC results showed a molecular weight distribution ($M_w/M_n$) of 2.67, and a molecular weight ($M_w$) of 446,660.

(B)(v) Preparation of Polyisobutylene-g-Polymethylmethacrylate

The procedure in this Example was exactly the same as Example (B)(iii) in that 10 grams of polyisobutylene copolymer containing 1.45 mole percent 4 bromo methylstyrene ($M_w$=289,000, $M_w/M_n$=1.78) was dissolved in 300 ml of THF in flask B, and sealed. The apparatus was then moved to the argon dry box, where 5 ml of SEC-butyllithium/hexane solution (2.6×10⁻⁴ moles) along with 5 ml. of 1,1 diphenylethene/hexane solution (1.1×10⁻³ moles) were added to flask A, instead of the 9.1×10⁻⁵ moles of SEC butyllithium and 3.8×10⁻⁴ moles of 1,1 diphenylethene as described in Example (B)(iii). A lower molecular weight polymethylmethacrylate was desired to graft onto the polyisobutylene backbone. The reaction time and temperature for the polymethylmethacrylate reaction was the same as in Example (B)(iii), i.e., 60 minutes at −78° C.

The graft-onto reaction was carried out in the same manner as in Example (B)(iii). Before the graft copolymer was isolated, the small (50 cc) remaining sample of the living polymethylmethacrylate cement was terminated with methanol and precipitated in methanol, filtered and dried in a vacuum oven overnight at room temperature. As the resulting polymethylmethacrylate homopolymer served as a reference, and had a molecular weight distribution (Mw/Mn) of 1.10, and a peak molecular weight (Mw) of 33,994. The graft copolymer was also terminated with methanol and precipitated in a 50/50 acetone/methanol solution. A portion of the graft was filtered and dried in vacuum oven overnight at room temperature. GPC results showed a molecular weight distribution (Mw/Mn) of 2.49, and a molecular weight (Mw) of 387,384.

(B)(vi) Preparation of a Polyisobutylene-g-Butyl Methacrylate

In this Example, the graft reaction of the poly t-butyl methacrylate to the polyisobutylene was carried out in an argon dry box, at room temperature and pressure. The polyisobutylene was treated in the same manner as in Example (B)(iii), except that the polymer was placed in a single flask, and after the final dissolution the flask was taken to an argon dry box where it was returned to atmospheric pressure. The t-butyl methacrylate polymerization was carried out in a separate oven dried and purged glassware, similar to that described in Example (B)(ii). Both solvent (THF) and monomer were freshly distilled, placed in flasks, and placed in the argon dry box. Then 9 ml of a SEC-butyllithium/hexane solution (4.68×10⁻⁴ moles), along with 9 ml of a 1,1 diphenylethene/hexane solution (1.99×10⁻³ moles), were added to the oven, dried and purged 500 ml two-neck flask equipped with a magnetic stirring bar. A deep red solution resulted, and 200 ml of THF was then added to the flask, and the deep red solution was diluted to a clear red liquid. Then 8.0 grams (0.056 moles) of freshly distilled t-butyl methacrylate was very slowly added to the deep red solution. The red color in the flasks disappeared as the first drops of the monomer contacted the liquid. After all of the monomer was added, a water white solution was present in the reaction flask. This was allowed to react for 90 minutes, and then with polyisobutylene solution in another flask, the living poly t-butyl methacrylate solution was transferred with a hypodermic needle to the PIB cement. When all of it had been added, it was stirred overnight at room temperature, and the graft reaction was then terminated with isopropyl alcohol. Before the graft copolymer was isolated, the remaining (50 cc) poly t-butyl methacrylate homopolymer was terminated with isopropyl alcohol and precipitated in a water/isopropanol solution, filtered, and dried in a vacuum oven overnight at room temperature. The resulting poly t-butyl methacrylate homopolymer served as a reference, and had a molecular weight distribution ($M_w/M_n$) of 1.69, with a peak molecular weight (Mw) of 26,649.

The graft copolymer was isolated in an isopropanol water solution, redissolved in THF, reprecipitated in a methanol/water solution, and dried in a vacuum oven overnight at room temperature. GPC results indicated a molecular weight distribution ($M_w/M_n$) of 2.76, and a molecular weight ($M_w$) of 301,762.

EXAMPLE 97—PREPARATION OF NUCLEOPHILE

A monofunctional polymeric nucleophile based upon polystyrene was prepared by neutralization of carbon dioxide terminated polystyryl lithium or polystyrene carboxylic acid. In this example, the polystyrene carboxylic acid was prepared by "living" anionic polymerization of styrene (10% wt.) in THF or cyclohexane at 40° C. with s-butyl lithium catalyst. The polymerization was terminated at −78° C. by addition of the "living" polymer solution to a saturated solution of carbon dioxide in tetrahydrofuran. The polymer was precipitated in isopropanol containing 1 ml HCl and 0.2 wt. % BHT. The polymer was dried for 24 hours at 45° C. and 0.1 mm. The molecular weight of the polystyrene carboxylic acid was readily varied by altering the monomer to initiator ratio, and a typical molecular weight was 30,000. The polystyrene carboxylic acid was neutralized in THF solution with either the potassium or tetrabutylammonium salt of BHT (prepared by reacting an excess of BHT with potassium tert-butoxide or tetrabutylammonium hydroxide, and the polystyrene carboxylate was precipitated in isopropanol/BHT (0.2 wt. %). The polymeric salt was dried for 24 hours at 45° C. and 0.1 mm.

EXAMPLE 97A—NUCLEOPHILIC DISPLACEMENT

Since nucleophilic displacements are generally dependent upon the solvation state of the reactants and of the products, these reactions were run in a variety of solvents. In particular, the solvents employed were (i) THF, in which most cations are solvated; (ii) cyclohexane, in which few ions are solvated (and thus analogous to reactions in the melt); and (iii) cyclohexane with 18-crown-6, which specifically solvates the potassium cation.

Initially, THF solutions (10 wt. %) of the 4-bromomethylstyrene-isobutylene copolymer used in Example (A)(i), and the potassium salt of polystyrene carboxylic acid, were each prepared and added, along with a magnetic stir bar, into a 250 ml round-bottom flask. The flask was equipped with a serum stoppered condenser, and a nitrogen purge was established. The flask was heated to reflux and aliquots were periodically removed. The reaction was complete after 48 hours (as determined by GPC). The polymer was precipitated in isopropanol containing 0.5 ml HCl and 0.2 wt. % BHT. The polymer was dried for 24 hours at 45° C. and 0.1 mm Hg pressure. Evidence of grafting included changes in the GPC integrated areas, morphology and solubility of the resulting polymer.

Melt reactions between pairs of polymer reagents can provide a straightforward synthetic route to provide commercial quantities of materials. One drawback to this method, however, is the poor agitation which is available in Brabender mixers. This tends to obfuscate fundamental studies of bulk reactions. In this example, a model solution reaction in cyclohexane was used to demonstrate the feasibility of the melt system. This model system allowed temperature and mixing to be standardized, thereby providing clear information about the reaction. Thus, the cyclohexane solutions (10 wt. %) of 4-bromomethylstyrene-isobutylene copolymer used in Example (A)(i) and the potassium salt of polystyrene carboxylic acid produced in Example 2, were each prepared and reacted as described above for the THF reaction. After a 48 hour reaction period, the extent of grafting was approximately 10% (as determined by GPC). In order to decrease reaction times and increase the grafting efficiency, it was necessary to solvate the cation. This was done by two methods, namely the addition of 18-Crown-6 to the reaction containing the potassium salt of the polystyrene carboxylic acid, and by preparing and reacting the tetrabutylammonium salt of polystyryl carboxylic acid. Both of these methods reduced the reaction time to one hour and increased the extent of grafting.

EXAMPLE 98—GRAFT COPOLYMERS OF POLY(2,6-DIMETHYL-1,4-PHENYLENE OXIDE)

The graft reaction of poly(2,6-dimethyl-1,4-phenylene oxide) to the isobutylene copolymer was carried out in a one liter flask. A 30 gram sample of the poly(isobutylene-4-bromomethylstyrene) from Example 6(A)(i) was placed into a 500 ml flask and dissolved in toluene (300 ml). The poly(2,6-dimethyl-1,4-phenylene oxide) (10 grams, prepared by phase-transfer polymerization of 4-bromo-2,6-dimethylphenol; $M_w$=18,000, $M_n$=9,000)) was placed in a second one liter flask, along with toluene (500 ml). The toluene was heated to 70° C., and the poly(2,6-dimethyl-1,4-phenylene oxide) was dissolved. Tetrabutylammonium hydroxide (2 ml, 1M in methanol), and BHT (5 grams) were then added to the poly(2,6-dimethyl-1,4-phenylene oxide) solution. After 15 minutes, the poly(isobutylene-co-4-bromomethylstyrene) solution was added, and the solution was kept at 70° C. for four hours. After four hours, the polymer was poured through a 150 mesh screen (to remove the gel fraction which results from a nucleophile with a functionality greater than two, and none was observed) and isolated by coagulation in isopropanol/BHT.

The graft copolymer was then dried in a vacuum oven at 50° C. for 24 hours. The screen contained less than 0.1 grams of polymer. The system was thus largely free of a gel fraction. The isolated graft copolymer (39.0 grams, 95% yield) was a clear, tough yellow, elastomer. DSC indicated the presence of the polyisobutylene copolymer ($T_g$, −61° C.) and poly(2,6-dimethyl-1,4-phenylene oxide) ($T_g$, 90°–140° C., peak at 110° C.). The quantity of poly(2,6-dimethyl-1,4-phenylene oxide) in the graft (as determined by NMR analysis) was 25%. This value was in good agreement with the experimental quantities of the polymer used. The graft copolymer had a microphase separated morphology with spherical PPO domains averaging 5 to 10 nm. The mechanical properties of the graft copolymer were also good, namely modulus at 100% elongation: 350 psi; modulus at 300% elongation: 1250 psi: and tensile strength at break: 1350 psi, with a 320% elongation.

EXAMPLE 99—GRAFT COPOLYMER OF POLYPROPYLENE

The graft reaction of maleated polypropylene to the isobutylene copolymer was carried out in a one liter flask. A 40 gram sample of the poly(isobutylene-4-bromomethylstyrene) used in Example 96(A)(i) was placed into a 500 ml flask and dissolved in xylenes (300 ml). The himic arthydride modified polypropylene (10 grams, TSK C900) was placed in the one liter flask, along with the xylenes (500 ml). The solution of xylenes was heated to reflux, and the polypropylene was dissolved. The flask was cooled to 80° C. and methanol (5 ml), tetrabutylammonium hydroxide (1 ml, 1M in methanol), and BHT (2 grams) were added to the polypropylene solution. This was reacted for one hour, and the resulting tetrabutylammonium salt of polypropylene methylsuccinate was freed of residual methanol by heating the flask to reflux. This solution was then cooled to 80° C., and the polyisobutylene-copolymer cement was then added. This was reacted for four hours before the polymer was poured through a 150 mesh screen (to remove the gel fraction which results from a nucleophile with a functionality greater than two) and isolated by coagulation in isopropanol/BHT.

The graft copolymer was then dried in a vacuum oven at 50° C. for 24 hours. The screen contained less than 0.5 grams of polymer. The system was thus largely free of a gel fraction. The graft copolymer was a clear, tough yellow, elastomer. DSC indicated the presence of the polyisobutylene copolymer ($T_g$−61° C.) and polypropylene ($T_m$ 120°–168° C., peak at 154° C.). The quantity of polypropylene in the graft (as determined by thermal analysis) was 20%. This value was in good agreement with the experimental quantities of the polymer used. The mechanical properties of the graft copolymer were also good, namely modulus at 100% elongation: 158 psi; modulus at 300% elongation: 423 psi; and tensile at break 955 psi with a 690% elongation.

EXAMPLE 100—POLYSTYRENE GRAFT COPOLYMERS FORMED USING POLYSTYRENE CARBOXYLIC ACID (A) In this example, polystyrene graft copolymers were formed using polystyrene carboxylic acid prepared by carbonation of poly(styryl)lithium in cyclohexane using 1,1-diphenylethylene, tetrahydrofuran, and carbon dioxide. A three liter round bottom flask was fitted with a reflux-takeoff head and an adapter containing a stopcock and serum stopper. The flask was charged with 2.75 liters of cyclohexane. The cyclohexane was distilled until 2 liters remained, then the flask was allowed to cool to 40° C. before styrene (200 grams, 300 ml) was added. The flask was placed in a hexane bath to aid in the regulation of the temperature. Polymerization was then initiated by adding 25 ml s-butyllithium (1M, in hexane). The temperature of the bath rose to 50° C. and the viscosity increased rapidly. After four hours, a solution of 1,1-diphenylethylene in THF was added (50 ml of 0.05 grams/ml solution). A bright orange-red color immediately appeared. The flask was then cooled to $-10°$ and reagent grade carbon dioxide was bubbled into the flask. The color was discharged instantaneously with mixing. The resulting polymer was neutralized with dilute HCl (3 ml of conc. HCl, 7 ml of $H_2O$, and 50 ml of THF) and precipitated in isopropanol. The resulting polymer had a narrow molecular weight distribution ($M_w$ =12,000, $M_n$=11,000). A cyclohexane solution containing 7.5 grams of poly(styryl)carboxylic acid (as prepared above) was treated with tetrabutylammonium hydroxide (10 ml, 1M in methanol) and BHT (2 grams). This solution was then added to a 1 liter flask containing a cyclohexane solution of poly(isobutylene-co-4-bromomethylstyrene) (22.5 grams in 500 ml). The flask was heated to 70° C. and the mixture was reacted for four hours. The solution was then placed in a teflon tray and the solvent was removed in vacuum. FT-infrared analysis of thin films indicated that all the carboxylate groups present in the sample were converted into the ester form. GPC analysis of THF solutions (3 mg/ml) of the graft copolymer conducted on a Waters 150 GPC at 0.5 cc/min indicated that less than 5% ungrafted polystyrene remained.

(B) In this example, polystyrene graft copolymers were formed using polystyrene carboxylic acid prepared by carbonation of poly(styryl) lithium in cyclohexane using tetramethylethylene-diamine and carbon dioxide. A three liter round bottom flask was fitted with a reflux-takeoff head and an adapter containing a stopcock and serum stopper. The flask was charged with 2.75 liters of cyclohexane. The cyclohexane was distilled until 2 liters remained, then the flask was allowed to cool to 40° C. before styrene (104 grams, 100 ml) was added. The flask was placed in a hexane bath to aid in the regulation of the temperature. Polymerization was initiated by adding 18.9 ml s-butyllithium (1M in hexane). The temperature of the bath rose to 50° C. and the viscosity increased rapidly. After four hours, a solution of tetramethylethylene-diamine in cyclohexane was added (25 ml of 0.25 grams/ml solution). The flask was then cooled to $-10°$ and reagent grade carbon dioxide was bubbled into the flask. The color discharged instantaneously with mixing. The resulting polymer was split into two portions. A small aliquot was analyzed by GPC ($M_w$=5,896, $M_n$=5,834, $M_w/M_n$–1.06). This sample was free of high molecular weight modes which are indicia of coupling side-reactions.

Polystyrene lithium carboxylate (50 grams), prepared as above, was reacted with tetrabutylammonium fluoride (15 ml, 1M in THF). The resulting solution was added to a solution of poly(isobutylene-co-4-bromomethylstyrene) (150 grams in 1.5 liters of cyclohexane). The mixture was then stirred and heated slowly to 70° C., at which time it was reacted for two hours. After two hours the polymer was isolated by precipitation in isopropanol (0.1 gram BHT). The resulting graft copolymer was transparent and tough. GPC indicated that more than 90% of the polystyrene was grafted.

EXAMPLE 101—USE OF GRAFT COPOLYMERS AS COMPATIBILIZERS

A first sample (A), prepared as in Example 98, composed of 67% styrene and 33% poly ( isobutylene-co-4-bromomethylstyrene), was an almost clear, tough plastic. TEM analysis indicated that the polyisobutylene copolymer was the dispersed phase, with an average domain size of 0.04 micrometers. A second sample (B), also prepared as in Example 98, was composed of 80% polyisobutylene copolymer and 20% polystyrene, and was a transparent thermoplastic elastomeric material (force to break—570 psi, with an ultimate elongation of 540%); i.e., the sample would recover to almost its original length after extention to 100% elongation. The morphology of this graft had polystyrene as the dispersed phase, with spherical domains averaging 0.03 micrometers. The morphology of a simple biblend of polystyrene and polyisobutylene has a macrophase separated structure (domains averaging 10 micrometers). The addition of 15% of the graft copolymer (B) resulted in compatibilization, with most of the polystyrene forming domains averaging 0.5 micrometers. Increasing the level of the added graft copolymer did not result in any significant decrease in the polystyrene domain size. However, when the level of graft copolymer reached 40%, the resulting blend had the mechanical properties of the graft copolymer. Thus, it was not necessary to use pure graft copolymers to get thermoplastic elastomer (TPE) type properties. These graft copolymers were thus useful as impact modifiers, TPE's or adhesives.

EXAMPLE 102—PREPARATION OF GRAFT COPOLYMERS (A)(i) Polyisobutylene-Polyisoprene Graft Copolymers In this Example, a graft copolymer was produced in which R and R' in Formula (I) were hydrogen, and the nucleophile in Formula (II) included one which e, h and m were 0, $R_8$ was a methyl group, and $R_6$, $R_7$, and $R_9$ through $R_{11}$ were hydrogen. It is initially noted that, in each of Examples 102(A)(i)–(A)(iv) all of the reactions and reagents were handled under vacuum or inert atmosphere (nitrogen or argon), with careful exclusion of both oxygen and water. In Examples 102(A)(i)–(A)(iii) isoprene was dried by distillation from triethylaluminum or dibutylmagnesium, and the polymerization solvent (heptane, hexane or THF) was dried by distillation from sodium naphthalenide or butyllithium. Isoprene or THF was then vacuum distilled into the reaction just prior to use. All glassware, syringes and needles were oven dried at 150° C. for three hours. The hot glassware was cooled and assembled under inert atmosphere usually in a dry box.

The graft reaction of polyisoprene to the isobutylene copolymer was carried out in a high vacuum apparatus. The system consisted of two 1 liter flasks (A and B), which were connected by a teflon stopcock. Another stopcock attached the entire apparatus to the vacuum line through flask A.

After the apparatus was dried in an oven for over 12 hours, it was immediately put into the vacuum chamber of the dry box, which was then placed under a dry inert atmosphere for 30 minutes before being moved into the drybox. A 10 gram sample of poly(isobutylene-co-4-bromomethylstyrene) ($M_w$=150,000, $M_w/M_n$=2.6) was placed into flask B in the dry box. The apparatus was then removed from the dry box and attached to a vacuum line. The pressure in the apparatus was reduced to $10^{-5}$ mm Hg and the temperature was raised to 50° C. and kept there overnight.

The poly(isobutylene-co-4-bromomethylstyrene) was then purified using successive THF dissolution—precipitation cycles: THF(300 ml) was vacuum distilled from a green solution of sodium naphthalenide containing excess sodium and condensed into the flask containing the polymer. It is well known in the art that sodium naphthalenide exists only in the total absence of water and oxygen; hence, the green color is an indication of the solvent purity. The mixture was agitated until the polymer dissolved. Then the THF and volatile impurities were vacuum distilled from the polymer solution and condensed back into the flask containing the sodium naphthalenide. This action resulted in a discharge of the green color; which gradually returned as the impurities were consumed in the reaction with sodium. This cycle was repeated until the green color of the sodium naphthalenide solution was not discharged. Then the polymer was redissolved once more with THF and the apparatus was brought into the dry box. Butyllithium (1 ml of 0.25M in hexane) was added to the other flask (A). The initiator quantity determined the molecular weight of the resulting polyisoprene. The system was then removed from the dry box and reattached to the vacuum line. Hexane (300 ml) was vacuum distilled from butyllithium and condensed into the flask (A) containing the initiator. Next, isoprene (12 ml) was vacuum distilled from butylmagnesium and condensed into the initiator solution (flask A). The polymerization was run at least 3 hours before proceeding to the graft reaction.

The graft reaction was conducted by pouring the polyisoprenyllithium solution into the flask containing the polyisobutylene copolymer. However, the hexane polymerization solvent was replaced with THF, after isoprene polymerization and prior to grafting in order to avoid gel formation. In general, it is also possible to conduct gel-free graft reactions in mixed solvents: increasing the solvent polarity by the addition of at least 50% by volume of a polar nonprotic solvent like THF. The graft-onto reaction was initiated by opening the stopcock which joined the two flasks and pouring all, except for a small quantity retained for GPC analysis, of the polyisoprenyllithium solution into the vigorously agitated polyisobutylene copolymer solution. The graft reaction occurred almost instantaneously upon mixing. The graft copolymer was then isolated in isopropanol containing 0.1% BHT.

The resulting polyisoprene homopolymer served as a reference, and had a narrow MW distribution $(M_w/M_n)=1.1$ with $M_n=92,000$. The graft copolymer (15.2 grams) was washed with isopropanol/BHT and dried in a vacuum oven overnight at 45° C. GPC results (based on polystyrene calibration standards) indicate a broad distribution $(M_w/M_n= 8)$ and $M_w=560,000$.

(A)(ii) Polyisobutylene-Polyisoprene Graft Copolymer

Following the procedure of Example 102(A)(i), a 10 gram sample of polyisobutylene copolymer, containing 1.5 mole percent 4-bromomethylstyrene, $M_w=250,000$, $M_w/M_n=2.6$, was dissolved in 200 ml dry THF in flask B. The polymerization was conducted in hexane, as in example 102(A)(i). This time, however, the graft-onto reaction was conducted using the as-prepared polyisoprenyl lithium hexane solution by pouring it into the vigorously agitated polyisobutylene copolymer solution. Gel formation was observed instantaneously with mixing. An elastic polymer was obtained after adding 400 ml of isopropanol into the reactor. However the resulting polymer was insoluble.

(A)(iii) Preparation of Polyisobutylene-Polyisoprene Graft Copolymer

The procedure for the purification of the polyisobutylene copolymer and for the polymerization of the isoprene was again followed as presented in Example 102(A)(i). This time, however, instead of replacing the hexane polymerization solvent, an excess of tetramethylethylenediamine (TMEDA) was added. This complexing agent activated the displacement reaction, and no gel was observed when the polyisoprenyl lithium solution containing TMEDA was added to the polyisobutylene copolymer solution. The resulting graft copolymer (18.5 grams) was isolated by precipitation in isopropanol/BHT and dried in a vacuum oven overnight (0.1 mm, 50° C.). GPC measurement of the resulting graft copolymer indicated a broader MW distribution $(M_w/M_n =8)$, peak at 630,000 with a shoulder at 180,000.

(A) (iv) Preparation of Polyisobutylene/Styrene-Butadiene Rubber Graft Copolyer

Once again, following the procedure of Example 102(A)(i), a 10 gram sample of poly(isobutylene-co-4-bromomethylstyrene) (Mw=230,000, Mw/Mn=2.8) was placed into the apparatus and subjected to the identical purification cycles. The pressure in the apparatus was reduced to $10^{-5}$ mm Hg and the temperature was raised to 50° C. and kept there overnight. The poly(isobutylene-co-4-bromomethylstyrene) was then purified using successive THF dissolution—precipitation cycles: THF (300 ml) is vacuum distilled from a green solution of sodium naphthalenide containing excess sodium and condensed into the flask containing the polymer. It is well known in the art that sodium naphthalenide exists only in the total absence of water and oxygen; hence, the green color is an indication of the solvent purity. The mixture was agitated until the polymer dissolves. Then the THF and volatile impurities were vacuum distilled from the polymer solution and condensed back into the flask containing the sodium naphthalenide. This action resulted in a discharge of the green color; which gradually returned as the impurities were consumed in the reaction with sodium. This cycle was repeated until the green color of the sodium naphthalenide solution was not discharged. Then the polymer was redissolved once more with THF and the apparatus was brought into the dry box. Butyllithium (2 ml of 0.1M in hexane) was added to the other flask (A). The quantity of the initiator determined the molecular weight of the resulting styrene-butadiene rubber (SBR). The system was then removed from the dry box and reattached to the vacuum line. Hexane (300 ml) was vacuum distilled from butyllithium and condensed into the flask (A) containing the initiator. Next, 1,3-butadiene (10.7 ml ) and styrene (3.6 ml ) were vacuum distilled from butylmagnesium and condensed into the initiator solution (flask A). The polymerization was run at least 28 hours before proceeding. After 28 hours the flask was disconnected from the vacuum line and brought into the drybox where a THF solution of 1,1-diphenylethylene (4 ml of a 0.1 molar solution) was added to the connecting tube. The apparatus was then removed from the drybox and reattached to the vacuum line. The 1,1-diphenylethylene solution was degassed with three freeze-pump-thaw cycles: frozen with liquid nitrogen; evacuated to $10^{-5}$ mm; system closed and thawed. Then the colorless 1,1-diphenylethylene solution was added to the yellow-orange styrene-butadiene solution (a yellow-orange color is indicative of benzylic and allylic lithium carbanions). This mixture was reacted for 1 hour after which a deep orange-red color resulted (which is characteristic of diphenylmethyl carbanions and is consistent with the conversion of all chains ends to diphenylmethyllithium.

The graft reaction was conducted by pouring the poly-(styrene-butadiene)lithium solution into the flask containing the polyisobutylene copolymer. In this example, it was not necessary to replace the hexane polymerization solvent. Instead, gelation was minimized through the conversion of very active benzylic (styryl) and allylic (butadienyl) chain ends to much less active and more stable diphenylmethyllithium chain ends. The graft-onto reaction was then initiated by opening the stopcock which joined the two flasks and pouring all, except for a small quantity retained for GPC analysis, of the poly(styrene-butadiene) lithium solution into the vigorously agitated polyisobutylene copolymer solution. The graft reaction occurred almost instantaneously upon mixing. The graft copolymer was then isolated in isopropanol containing 0.1% BHT.

The resulting styrene-butadiene rubber homopolymer had a narrow molecular weight distribution (Mw/Mn=1.05) with Mw=84,000. The graft copolymer had a molecular weight distribution of Mw/Mn=3.2 and Mw=538,000.

EXAMPLE 103 PREPARATION OF NUCLEOPHILE

A monofunctional nucleophile based upon polyisoprene was prepared, namely a nucleophile of Formula (II) in which $R_8$ was a methyl group, m was 0, and $R_6$, $R_7$ and $R_9$ through $R_{11}$ were hydrogen. This nucleophile was prepared by neutralization of carboxylic acid-terminated polyisoprene. In this example, the polyisoprene carboxylic acid was prepared by "living" anionic polymerization of isoprene (10% wt.) in heptane at 40° C. with s-butyl-lithium catalyst. The polymerization was terminated at −78° C. by addition of the "living" polymer solution to a saturated solution of carbon dioxide in tetrahydrofuran. The polymer was precipitated in isopropanol containing 1 ml of HCl and 0.2 wt. % BHT. The polymer was then kneaded in fresh isopropanol/BHT before drying for 24 hours at 45° C. and 0.1 mm Hg pressure. The molecular weight of the polyisoprene carboxylic acid was 20,000. The polyisoprene carboxylic acid was neutralized in THF solution with either potassium t-butoxide or tetrabutylammonium hydroxide. The polyisoprene carboxylate was precipitated in isopropanol/BHT (0.2 wt. %) and the polymeric salt was dried for 24 hours at 45° C. and 0.1 mm Hg pressure. FTIR analysis of the polyisoprene carboxylic acid showed a peak at 1710 cm$^{-1}$ which corresponded to the carboxylic acid end group. This peak disappeared, and a new peak at 1580 cm$^{-1}$ appeared after neutralization, which is consistent with the formation of the corresponding salt.

EXAMPLE 104—NUCLEOPHILIC DISPLACEMENT

Since nucleophilic displacements are generally dependent upon the solvation state of the reactants and of the products, these reactions were run in a variety of solvents. In particular, (i) THF, in which most anions and cations are solvated; (ii) cyclohexane, in which few ions are solvated (and thus, this was analogous to reactions in the melt); and (iii) cyclohexane with 18-crown-6, which specifically solvated the potassium cation.

Initially, THF solutions (10 wt. %) of the para-bromomethylstyrene copolymer used in Example (A)(i) and polyisoprene potassium carboxylate were each prepared and added along with a magnetic stir bar into a 250 ml roundbottom flask. The flask was equipped with a serum stoppered condenser and a nitrogen purge was established. The flask was heated to reflux and aliquots were removed periodically. The reaction was complete after 48 hours (no further change in GPC peak areas observed). The polymer was precipitated in isopropanol containing 0.5 ml of HCl and 0.2 wt. % BHT. The polymer was dried in 24 hours at 45° C. and 0.1 mm pressure. Evidence for grafting was obtained by comparing GPC integrated areas and morphology for the grafts to those obtained for blends of the same composition. In the 50:50 blend, the high molecular weight peak area corresponding to the polyisobutylene copolymer was equal to the low molecular weight peak area corresponding to polyisoprene carboxylic acid. Upon grafting, this ratio was 70% high molecular weight, corresponding to graft copolymer, and 30% low molecular weight ungrafted polyisoprene.

Melt reactions between pairs of polymer reagents can provide a straightforward synthetic route to commercial quantities of materials. However, the limited agitation which is available in laboratory scale equipment used to study such reactions, e.g., Brabender mixers, tends to obfuscate fundamental studies of bulk reactions. The following experiment used a model solution reaction in cyclohexane to demonstrate the feasibility of the melt system. This model system allowed temperature and mixing to be standardized thereby providing clear information about the reaction. Thus cyclohexane solutions (10 wt. %) of the para-bromomethylstyrene copolymer used in Example 102 (i) and the potassium polyisoprene carboxylate produced in Example 103(B) were each prepared and reacted as described above for the THF reaction. After a 48 hour reaction period the extent of grafting was approximately 10% (GPC and FTIR). In order to decrease reaction times and increase the grafting efficiency it was necessary to solvate the cation. This was done by two methods: addition of 18-crown-6 to the reaction containing the potassium salt, and by preparing and reacting tetrabutylammonium polyisoprene carboxylate. Both of these methods reduced the reaction time to one hour, and increased the extent of grafting.

EXAMPLE 105—PREPARATION OF POLYISOPRENE GRAFT COPOLYMER FORMED USING POLYISOPRENECARBOXYLIC ACID (A)(i) In this Example, polyisoprene graft copolymers were formed using polyisoprene carboxylic acid which was prepared by carbonation of poly(isoprenyl) lithium in heptane using 1,1-diphenylethylene, tetrahydrofuran, and carbon dioxide. A three liter round bottom flask was fitted with a reflux-takeoff head and an adapter containing a stopcock and serum stopper. The flask was charged with 2.75 liters of heptane. The heptane was distilled until 2 liters remained, and the flask was then allowed to cool to 40° C. before isoprene (200 grams, 300 ml) was added. The flask was placed in a hexane bath to aid in regulation of the temperature. Polymerization was initiated by adding 25 ml of s-butyllithium (1M, in hexane). The temperature of the bath rose to 50° C., and the viscosity increased rapidly. After four hours, a solution of 1,1-diphenylethylene in THF was added (50 ml of 0.05 grams/ml solution). A bright orange-red color immediately appeared. The flask was then cooled to −10° and reagent grade carbon dioxide was bubbled into the flask. The color was discharged instantaneously with mixing. The resulting polymer was neutralized with dilute HCl (3 ml of concentrated HCl, 7 ml of water, and 50 ml of THF) and coagulated in isopropanol. The resulting polymer had a narrow molecular weight distribution ($M_w$=74,000, $M_n$=68, 000). A heptane solution containing 7.5 grams of poly(isoprenyl)carboxylic acid (as prepared above) was treated with tetrabutylammonium hydroxide (10 ml, 1M, in methanol) and butylated hydroxytoluene (BHT=2 grams). This solution was then added to a 1 liter flask containing a heptane solution of poly(isobutylene-co-4-bromomethylstyrene) (22.5 grams in 500 ml). The flask was heated to 70° C. and the mixture was reacted for four hours. The solution was then placed in a teflon tray and the solvent was removed in vacuum. FT-infrared analysis of thin films indicated that all of the carboxylate groups present in the sample were converted into the ester form. GPC analysis of the THF solutions (3 mg/ml) of the graft copolymer conducted on a Waters 150 GPC at 0.5 cc/min indicated that less than 5% ungrafted polyisoprene remained.

(A)(ii) In this Example, polyisoprene graft copolymer was formed using poly(isoprene)carboxylic acid prepared by carbonation of poly(isoprenyl) lithium in heptane using tetramethylethylenediamine and carbon dioxide. A three liter round bottom flask was fitted with a reflux-takeoff head and an adapter containing a stopcock and serum stopper. The flask was charged with 2.75 liters of heptane. The heptane was distilled until 2 liters remained, and the flask was then allowed to cool to 40° C. before isoprene (200 grams) was added. The flask was then placed in a hexane bath to aid in the regulation of the temperature. Polymerization was initiated by adding 18.9 ml s-butyllithium (1M, in hexane). The temperature of the bath rose to 50° C., and the viscosity increased rapidly. After four hours, a solution of the TMEDA in heptane was added (25 ml of 0.25 gm/ml solution). The flask was then cooled to −10° and reagent grade carbon dioxide was bubbled into the flask. The color discharged instantaneously with mixing. The resulting polymer was split into two portions. A small aliquot was analyzed by GPC ($M_w$=58,960), $M_n$=58,340, $M_w/M_n$=1.06). This sample was free of high molecular weight modes, which are indicia of coupling side-reactions.

Polyisoprene lithium carboxylate (50 grams), prepared as above, was reacted with tetrabutylammonium fluoride (15 ml, 1M in THF). The resulting solution was added to a solution of poly(isobutylene-co-4-bromomethylstyrene) (150 grams in 1.5 liters of heptane). The mixture was stirred and heated slowly to 70° C., at which time it was reacted for two hours. After two hours the polymer was isolated by coagulation in isopropanol (0.1 gram BHT). GPC of the resulting graft copolymer indicated that more than 90% of the polyisoprene was grafted.

EXAMPLE 106—USE OF GRAFT COPOLYMERS AS COMPATIBILIZERS

In this Example, a graft copolymer composed of 50% para-bromomethylstyrene copolymer and 50% polyisoprene used in Example 8(A)(i) was analyzed by TEM. This sample, when cast from THF on water, exhibited polyisoprene domains whose size averaged 0.04 μm. Cast films of a blend with the same composition were macroscopically heterogeneous in which large domains (>10 μm) of each polymer were observed under optical phase contrast. When the graft copolymer was added to the blend (⅓ para-bromomethylstyrene, ⅓ polyisoprene, and ⅓ of the graft copolymer), the morphology was altered, and the polyisoprene domains averaged 0.1 μm with the graft material forming the continuous phase. This demonstrated the utility of the graft copolymer as a compatibilizer for these blends.

EXAMPLE 107

Preparation of Pendant Functionalized Isobutylene/Para-methylstyrene Copolymer Containing Ionomeric S-Isothiouronium Salt Groups In this example, a tough ionomerically cross-linked S-Isothiouronium salt derivative of a random isobutylene/para-methylstyrene/para-bromomethylstyrene "base" polymer was prepared. A random isobutylene/paramethyl styrene copolymer containing 6.6 wt. % paramethyl styrene with a viscosity oversize molecular weight of 68,000 was polymerized in the pilot plant and then radically brominated using light initiation in heptane solution in the laboratory to give a "base" polymer with a viscosity average molecular weight of 68,000 and containing 96.7 mole % isobutylene, 1.5 mole % para-methylstyrene, and 1.8 mole % paramethyl brominated paramethyl styrene. In this example (experiment) 52.7 g. of this base polymer was dissolved in 750 g of toluene in a 1.5 l resin flask under slight nitrogen purge connected through a reflux condensed to a bubbler. 2.5 g of thiourea dissolved in 250 g. isopropyl alcohol was added with stirring to give a 5% solution of "base" polymer in a 75/25 toluene/alcohol solvent with 4.7 wt. % thiourea on polymer. (>2 moles thiourea/mole benzylic bromine). The solution was heated with stirring under nitrogen to >77° C. and stirred hot for 7 hours and then cooled. The polymer solution was allowed to settle and then decanted from the settled white solids (unreacted excess thiourea)). Attempts to water wash the decanted polymer solutions to remove more of the unreacted thiourea were unsuccessful because it formed stable emulsions, so the polymer was recovered by precipitating and kneading in alcohol to remove unreacted thiourea. Even this proved to be difficult because the polymer solution dispersed in the alcohol and it had to be evaporated and then treated with fresh alcohol to finally recover the polymer as a mass. The recovered polymer was vacuum oven dried @70° C. with 0.2% BHT mixed in as on antioxidant to give a spongy light tannish extremely tough ionically cross-linked elastomer.

The dried polymer was insoluble in toluene or hexane because of the ionic cross-links but dissolved readily in a 80/20 toluene/isopropanol solvent blend which solvated the ionic cross-links to give a fluid solution from which very tough elastomeric films could be cast or coatings could be applied to various substrates. Analysis on the recovered polymer showed no change in molecular weight or bromine content but the presence of the expected stoichiometric amounts of nitrogen and sulfur. NMR analysis confirmed the disappearance of the benzylic bromine and its conversion to the S-Isothiouronium salt.

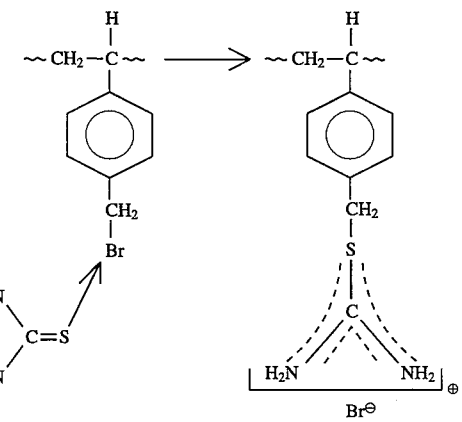

Analyses

| | Starting Base Polymer | Pendant Functionalized Polymer |
|---|---|---|
| Mv | 68K | 68K |
| wt. % Br | 2.54 | 2.53 |
| wt. % N | — | 0.88 |
| wt. % S | — | 1.01 |
| NMR | | |
| mole % Benzylic Br | 1.8 | — |
| mole % S-Isothio-uronium salt | — | 1.8 |
| mole % para-methylstyrene | 1.5 | 1.5 |
| IB | | |

107B

In this example, a tough ionomerically cross-linked S-Isothiouronium salt derivative of a random isobutylene/ para-methylstyrene/para-bromomethylstyrene "base" polymer was prepared by a sequential reaction route with the bromination reaction followed by the nucleophilic substitution reaction without isolating or recovering the "base" brominated polymer. A random isobutylene/paramethylstyrene copolymer containing 5.8 wt. % paramethylstyrene with a viscosity average molecular weight of 350,000 was polymerized in the pilot plant one gallon continuous stirred tank reactor. 450 g. of this copolymer was dissolved in 2550 g of mole-sieve dried B&J heptane in a 5 l resin flask for radical bromination. The flask had a glass frit immersed in the solution for nitrogen purging, had a bottom draw-off to permit washing and drawing off the aqueous layer, and was connected through a reflux condensed to a dilute caustic trap to scrub the purge gas. The 15% solution of polymer in heptane was heated to 30° C. with stirring and illuminated with a 150 Watt spotlight to initiate radical bromination. Then 40.5 g of bromine (9% on polymer) dilute to 30% in dried heptane was added through a dropping funnel. After 15 minutes when the bromine color had completely faded, the light was turned off and 22 g. of 50% NaOH diluted to 350 ml. was stirred in as a quench. Then the stirrer was stopped and the basic aqueous layer was allowed to settle and was drained off. Three additional water washes were given in this way and then a sample of the cement was taken for recovery and analyses of the "base" brominated polymer.

To the remaining "wet" "base" polymer cement was added 40 g of thiourea dissolved in 900 g. of a 50/50 heptane/isopropyl alcohol mixture and the reactor was heated to reflux at 75° C. with stirring and slight nitrogen purge. It was stirred hot @75° C. for six hours and then allowed to coal and settle. As was the case in example 1A, the functionalized polymer solution could not be water washed because it formed stable emulsions, so the polymer was recovered in isopropyl alcohol as for example 107A. It was vacuum oven dried @70° C. with 0.2% BHT mixed in as an antioxidant. The recovered polymer was a spongy tannish extremely tough ionically cross-linked elastomer much like in example 1A but, was even more elastomeric with higher strength and better elongation. It was insoluble in heptane, or toluene because of the ionic cross-links and also unaffected by alcohol because of its composition. However, it dissolved readily in a 90/10 toluene/isopropanol mixture which disrupted the ionic cross-links by solvation.

In the first step of this sequential reaction, a portion of the enchained paramethylstyrene moieties in the isobutylene/paramethylstyrene copolymer were converted to enchained paramethyl moieties to produce a "base" terpolymer containing benzylic halogen (as an enchained electrophile).

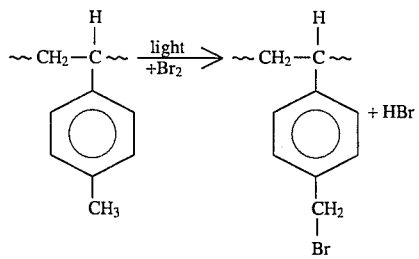

Analyses on the dried sample of recovered brominated polymer are shown below:

| | Analyses | |
|---|---|---|
| | Starting Copolymer | Radically Brominated "Base" Terpolymer |
| Mv | 350,000 | 280,000 |
| wt. % Br | — | 3.5 |
| NMR Results | | |
| Mole % PMS | 2.9 | 0.7 |
| Mole % Br PMS | — | 1.9 |
| Mole % $Br_2$ PMS | — | 0.3 | where
  PMS=enchained paramethyl styrene
  Br PMS=enchained paramethyl brominated paramethylstyrene
and
  $Br_2$ PMS=enchained dibrominated paramethylstyrene i.e.

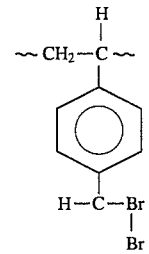

In this example a very high bromine charge was used ∧ 1.15 mole $Br_2$/mole enchained PMS) and about 75% of the enchained paramethyl styrene units were brominated. This high bromination level caused the observed molecular weight loss and resulted in some dibromination of the enchained paramethyl styrene moieties. If a lower bromine change had been used so that <60% of the enchained paramethylstyrene units were brominated, then essentially no dibromination would have occurred and there would have been essentially no molecular weight loss.

In the second step of this sequential reaction; a portion of the enchained para-bromomethylstyrene units were converted to S- isothiouronium salt units as in example 1A. In this, example the nucleophilic substitution reaction as run at 75° C. for 6 hours in an 87/13 heptane/alcohol solvent at a 10 wt. % base polymer concentration with ⋏3 mole of thiourea/mole of benzylic bromine. Analyses on the recovered polymer are shown below:

| | "Base" Terpolymer | Pendant Functionalized Polymer |
|---|---|---|
| Mv | 280,000 | 280,000 |
| wt. % Br | 3.15 | 3.0 |
| wt. % N | — | 0.45 |
| wt. % S | — | 0.5 |
| Mole % Br PMS | 2.2 | 1.3 |
| Mole % S-Isothiouronium salt | — | 0.9 |
| Mole % PMS | 0.7 | 0.7 |

In this reaction only a portion of the benzylic bromines were replaced by S-isothiouronium salt groups despite the larger molar excess of thiourea used because the wet 87/13 heptane/alcohol blend used this experiment is a less favorable reaction medium in which to run the nucleophilic displacement reaction than the 75/25 toluene/isopropanol mixture used in example 1A. The rate of nucleophilic displacement reactions are strongly influenced by the reaction medium and solvation, and these factors can be used to control reaction rate.

In this nucleophilic substitution reaction about half of the benzylic bromine was converted to S-isothiouronium salt to give a functionalized polymer containing both benzylic bromine and S-isothiouronium salt functionality. This mixed functionality polymer is very interesting because not only is it a tough elastic material due to the ionic cross-links but it also contains active benzylic bromine functionality which can be utilized for other reactions including forming covalent permanent cross-links in many ways. In fact this mixed functionality polymer containing both benzylic bromine and S-isothiouronium salt functionalities forms permanent covalent cross-links simply by heating above 100° C. probably via an, N-alkylation reaction between an attached thiourea group and an unconverted benzylic bromine on another chain with formation of a cross-link and release of HBr—it is preferred to have an acid scavenger such as zinc oxide present to pick up the released HBr and stabilize the cross-linked polymer in situations where this permanent cross-linking is desired.

To demonstrate the reversible ionic cross-links and permanent covalent cross-links upon heating: A portion of the mixed pendant functionalized polymer of this example was dissolved in a 90/10 toluene/isopropanol solvent blend as a 15% solution and cast on a glass plate as a film by allowing the solvent to evaporate and deposit a tough rubber film. Drying was completed in a vacuum oven at 70° C. A very tough elastomeric film was deposited on the glass with very strong adhesion. The film could not be removed by toluene, heptane, or alcohol. However, a position of the film was exposed to a 90/10 toluene/isopropanol mixture and redissolved. Another portion of the film was placed in a vacuum oven @120° C. for 2 hours—it had darkened somewhat, but was still a very tough, strongly adhered elastomeric film. During the heating though it had formed covalent cross-links as shown by the fact that it could no longer be dissolved and removed even in a toluene/isopropanol solvent blend. The blend only served to swell the film—but did not dissolve it or remove it from the glass.

The S-isothiouronium salt pendant functionality impacts very interesting and useful properties to the "base" polymer. The salt is a strong cationic ionomer and the salt groups associate in the polymer/(hydrocarbon) matrix to provide strong ionic cross-links. It is also a strongly hydrogen bonding group because of the NH hydrogens and the reversible cross-links involve hydrogen bonding. This hydrogen bonding ability also permits associations with other groups and enhances adhesion to many surfaces. Another desirable characteristic for some uses is that the ionic groups do not contain any metal ions. And the ability of the mixed functionality polymer of this example to form permanent covalent cross-links by heating adds yet another characteristic useful in some applications. Clearly this pendant cationic S-isothiouronium salt pendant functionality is very interesting and useful in selected applications. it is a strong cationic ionomer with strong hydrogen-bonding propensity.

107C

In this example, a tough ionomerically cross-linked S-isothiouronium salt derivative of a random isobutylene/paramethylstyrene/para-bromomethylstyrene "base" polymer was prepared and converted to salts with various anions. A random isobutylene/paramethylstyrene copolymer containing 7.0 mole % paramethyl styrene with a Mooney viscosity of 30.2 ($M_L$(H8) @125 C.) was polymerized in a blocked operation in an 1800 gallon continuous reactor using commercial butyl plant facilities and then radically brominated using VAZO 52 initiation in heptane solution in a 100 gallon glass lined pfaudler reactor to give a "base" polymer with a Mooney viscosity of 29 and containing 2.0 mole % paramethylstyrene, 5.0 mole % paramethylstyrene, and 93 mole % isobutylene. In the nucleophilic substitution reaction, 450 g. of the "base" polymer was dissolved in 2750 g of toluene in a 5 l resin flask under slight nitrogen purge connected through a reflux condenser to a bubbler. 38.5 g of thiourea ($\wedge$3 moles/mole benzylic bromine) dissolved in 907 g isopropanol was added with stirring to give an 11% "base" polymer solution in a 75/25 toluene/isopropanol solvent blend. The solution was then heated with stirring under sl.$N_2$ purge to reflux @86° C. The thiourea partially precipitated and was initially partially present as fine dispersed crystal in the mixed solvent at room temperature but gradually dissolved or the solution was heated and the nucleophilic substitutions reaction progressed. The solution was stirred hot at 86° C. for 6 hours and then cooled and allowed to settle so that the pendant functionalized polymer solution could be disconnected from the settled unreacted excess thiourea. As in the other examples the solution of the S-isothiuronium salt functionalized polymer could not be water washed because it formed stable emulsions, but a portion was shaken with an equal volume of water to yield a stable emulsion anyway and the emulsion was set aside for other work. Meanwhile a portion of the polymer was recovered by precipitation in isopropanol. It was kneaded to wash out unreacted thiourea and then further purified by redissolation in 90/10 toluene/IPA and then reprecipitation in isopropanol. This purified functionalized polymer was vacuum oven dried @ 70° C. with 0.2 wt. % BHT mixed in as an antioxidant. This dried recovered polymer was a spongy light tan extremely tough ionically cross-linked elastomer as in the previous examples. It was insoluble in hydrocarbons or alcohols but readily dissolved in a 90/10 toluene/isopropanol mixture.

Analyses showed a complete conversion of the benzylic bromines to S-isothiouronium bromide salt as shown below:

| | Analyses | |
|---|---|---|
| | "Base" Terpolymer | S-Isothiouronium Bromide Pendant functionalized Polymer |
| Mv | 280K | 280K |
| wt. % Br | 3.0 | 2.5 |
| wt. % N | — | 0.88 |
| wt. % S | — | 1.0 |
| NMR | | |
| Mole % Benzylic Br | 2.0 | — |
| Mole % S-Iso-thiouronium bromide | — | 2.0 |
| Mole % Paramethyl Styrene | 5.0 | 5.0 |

The stable emulsion formed by shaking the S-isothiouronium salt functionalized polymer in the 75/25 toluene/isopropanol reaction solvent with water had a pH of $\wedge$6. Dilute NaOH solution was added to a portion of this emulsion to raise the pH to 10 and the basic emulsion was shaken; it separated at once to a clear basic water layer and a gelatinous swollen polymer layer. This layer could not be redispersed by shaking it with fresh water or water/alcohol mixtures—so after several attempted washes the polymer was recovered by precipitation in isopropanol. Recovery was very difficult because the gelatinous mass was so tough and the solvent extracted very slowly. The recovered polymer was permanently cross-linked and insoluble in anything. Analyses showed that most of the bromine and about half of the nitrogen was lost, but all of the sulfur was still present.

Shaking with excess base apparently destroyed the emulsion by freeing the S-alkyl thiourea from the bromide salt as shown:

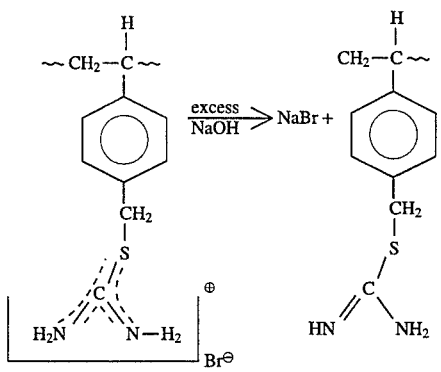

but the S-alkyl thiourea derivative was unstable in the basic solution and rapidly decomposed (via hydrolysis, etc.) to yield a cross-linked polymer.

Other portion of the stable emulsion @pH ∧6 were carefully neutralized cold with dilute caustic and then acidified with various acids (HCl, $H_2SO_4$, acetic etc.) and reshaken to form in each case stable emulsions from which the polymer was recovered by precipitation in isopropanol (sometimes requiring a partial evaporation of solvent before the polymer would mass together to permit kneading and washing). In this way, various isothiouronium salt derivatives were recovered:

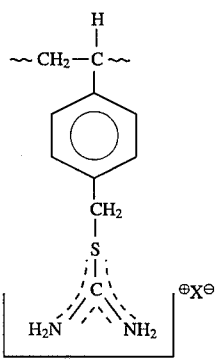

wherein X was $Cl^\ominus$, $HSO_4^\ominus$,

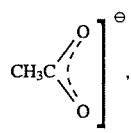

⊖, etc.

The salts were all soluble in a 90/10 toluene/isopropanol mixture and tough ionomerically cross-linked coatings could be deposited on various substrates from these solutions by evaporating the solvent.

As is discussed in later examples with other cationic ionomer pendant functionalized derivatives of this invention, the various salts are also easily converted to latexes by stripping the solvent from the stable emulsion to give stable aqueous dispersions (latexes) of the ionomerically cross-linked particles from which coatings can be deposited.

Either the solutions or latexes of these S-isothiouronium salt derivatives are also useful as adhesives, binders, etc.

EXAMPLE 108

Preparation of Pendant Functionalized
Isobutylene/Paramethyl Styrene Copolymer
Containing Ionomeric Quaternary Ammonium Salt
Groups

108A

In this example, a tough isonomerically cross-linked quaternary ammonium salt derivative of a random isobutylene/para-methylstyrene/para-bromomethylstyrene "base" polymer was proposed. A random isobuthylene/para-methylstyrene copolymer containing 4.8 wt. % para-methylstyrene and a Mooney viscosity of 30 ($M_L$(H8) @125° C.) was polymerized in a commercial 1800 gallon butyl polymerization reactor and then radically brominated using VA20 52 initiation in hexane solution in a 100 gallon glass-lined pfaudler Br reactor to give a "base" terpolymer with a Mooney viscosity of 29 with 2.6 wt. % bromine. The "base" terpolymer composition was 1.4 mole % para-bromomethylstyrene (including ∧0.1 mole % dibrominated paramethylstyrene) 0.9 mole % paramethyl styrene and 97.7 mole % isobutylene (there was a small amount of dibromination and slight molecular weight loss due to the relatively high bromination level of ∧61% of the para-methylstyrene "mer" units. In the nucleophilic substitution reaction, 450 g of the "base" terpolymer were dissolved in 2800 g of toluene in a 5 l. resin flask under slight nitrogen purge and connected through a reflux condenser to a scrubber and bubble to give a 13.85 wt. % solution. Then 47.2 g of triethyl amine dissolved in 700 g. of isopropanol were added slowly with stirring to give on 11.4% solution of "base" terpolymer in an 80/20 toluene/isopropanol solvent blend with ∧3 moles triethanol amine per mole of benzylic bromine. The solution was then heated with stirring to reflux at 85°→86° C. under slight nitrogen purge. The solution was stirred at reflux for 6 hours and then allowed to cool under nitrogen. A trial on an aliquot showed that the solution emulsified when shaken with water or water/alcohol (70/30) mixtures so it could not be washed. The emulsions had a pH of ∧8. It remained stable when acidified and even when the pH was raised to 10→11 with NaOH solution would still not separate well. Hence the functionalized polymer was recovered by precipitation and kneading in isopropanol and further freed of unreacted triethyl amine by redissolution in a toluene/isopropanol blend and reprecipitation in isopropanol. The purified functionalized polymer was vacuum oven dried at 70° C. after 0.2 wt. % BHT had been mixed in as an antioxidant. The dried recovered polymer was a spongy slightly off-white extremely tough ionically cross-linked elastomer. The pendant cationic quanternary ammonium salt groups which had become attached to the "base" terpolymer by nucleophilic displacement of the benzylic bromines self-associated to give a tough ionically cross-linked elastomer. It was insoluble in hydrocarbons or alcohols but readily dissolved in a 90/10 toluene/isopropanol mixed solvent which disrupted the ionic cross-links by soloation. The nucleophilic displacement reaction is shown below:

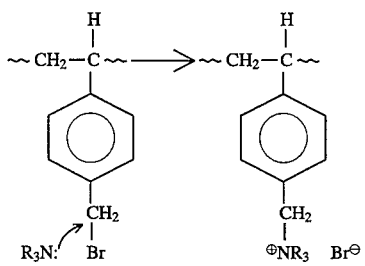

Analyses as summarized below showed essentially complete substitution of benzylic bromines had occurred to give the pendant quaternary ammonium salt functionalized polymer.

| Analyses | | |
|---|---|---|
| | Starting "Base" Terpolymer | Pendant Functionalized Polymer |
| Mv | 270,000 | 270,000 |
| wt. % Br | 2.6 | 2.2 |
| wt. % N | \ | 0.34 |
| NMR | | |
| mole % Benzylic Br | 1.4 | \ |
| mole % Quat. | \ | 1.4 |
| mole % Paramethylstyrene | 0.9 | 0.9 |

The proton NMR spectra showed the disappearance of the resonances at 4.47 ppm due to the benzylic hydrogens adjacent to the bromine and the appearance of two new resonances: one at 4.7 ppm due to the benzylic hydrogens adjacent to the quaternary nitrogen and another at 3.5 ppm due to the methylene hydrogens adjacent to the quanternary nitrogen. The resonances at 2.3 ppm due to the paramethyl hydrogens of the enchained paramethyl styrene "mer" units remained unchanged by the nucleophilic substitution reaction:

PROTON NMR RESONANCES FOR
ENCHAINED "MER" UNITS

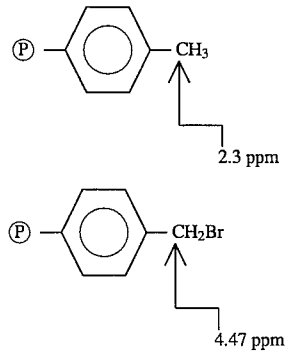

-continued
PROTON NMR RESONANCES FOR
ENCHAINED "MER" UNITS

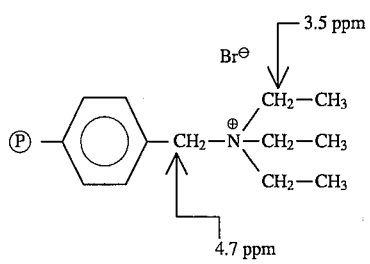

A portion of the dried pendant functionalized polymer of this example was dissolved in a 90/100 hexane/isopropanol solvent blend to give a 15 wt. % solution. This solution was cast on a glass plate and allowed to evaporate to deposit a tough rubbery fil. Dying was completed in a vacuum oven at 70° C. An extremely tough ionically cross-linked film with excellent adhesion to the glass was deposited in this way. The film could be dissolved off again with the mixed hydrocarbon/alcohol solvent blend. In a similar manner a film of tough ionically cross-linked elastomer was deposited on several porous substrates (i.e. coarse woven fabrics) by impregnating the substrates with the solution by dipping and then allowing the solvent blend to evaporate to produce a "proofed" fabric coated with a tough ionically cross-linked elastomer. The "proofed" fabrics were water resistant with water droplets simply "beading-up" and running off when applied. They would also be expected to possess the high germicidal properties characteristic of quaternary ammonium salts. This quaternary ammonium salt functionalized polymer would also be useful in many adhesives and binder applications where its high strength, toughness water resistance, germicidal properties, environmental resistance and good aging properties would be beneficial. It would also function well as a corrosion-resistant coating on metals where the water resistance, environmental resistance, good adhesion and corrosion-inhibiting properties of cationic ionomers would be desirable. The ability to self-cross-link through ionic associations without the need to add vulcanization agents (with their attendant problems of extractability, toxicity, cost, etc.) or be subjected to a heated vulcanization step is a highly desirable property of this cationically functionalized polymer.

108B

In this example a pendant functionalized primarily isobutylene-based copolymer containing cationic quaternary ammonium salt groups was prepared and converted to an emulsifier-free stable latex. An isobutylene-based polymer with an $M_v$ of 45,000 and containing 2.0 mole % parachloromethylstyrene "mer" units was dissolved in a 70/30 toluene/isopropanol solvent blend to form a 35% solution by overnight shaking in a 2 gallon container. This solution was charged along with 1.4 times the stoichiometric amount of triethyl amine (based on the amount of benzylic chlorine) to a 5l resin flask set-up as described in Example 107A and heated to 82° C. with stirring for 4 hours to complete the nucleophilic substitution reaction. A sample of the pendant functionalized polymer was recovered for analysis as outlined in Example 2A by precipitation and kneading in isopropanol, resolution in toluene/isopropanol and reprecipitation in isopropanol before vacuum-oven drying at 70° C. with 0.2 wt. % BHT mixed in as an antioxidant. The purified, dried, recovered pendant functionalized polymer was an extremely tough white crumb which was ionomerically cross-linked as shown by insolubility in toluene, but ready solubility in a 90/10 toluene/isopropanol solvent blend. Analysis showed that complete conversion of benzylic chlorines to quaternary ammonium salt groups had occurred. The recovered polymer contained 0.48 wt. % nitrogen and NMR analysis showed the presence of 2.0 mole % benzyl triethyl ammonium chloride salt groups.

The balance of the cooled solution resulting from the nucleophilic substitution reaction was simply mixed "as is" with distilled water at a 40/60 water/solution ratio by volume to give a stable oil-in water emulsion which was refined first with a dispersator and then in a colloid mill to give a very stable fine particle size raw latex. The raw latex was stripped by heating with stirring under nitrogen to remove the solvents and part of the water to give a stable finished latex containing 50% solids. No emulsifiers were required in making the latex and the preparation and stripping, were accomplished easily with no foaming problems as are normally experienced in preparing, stripping and concentrating latexes containing added "soaps" as emulsifiers.

Castings from the finished latex dried to clear, hydrophobic, rubbery, tough, ionomerically cross-linked films as described for the solution cast films of Example 107A. This emulsifier-free cationic latex makes possible the use of this tough, ionically cross-linked cationically functionalized polymer in a host of applications, including dipped goods, binders, nonwovens, coatings, etc., which could benefit from its excellent aging and environmental resistance along with its other "unique" properties.

The ability of the pendant attached quaternary ammonium salt groups to stabilize the emulsion and latex so that no added "soaps" are required, and then to self-associate in the deposited film to provide "ionomeric" cross-links is especially important. The added "soaps" required as emulsifiers in most latexes have many drawbacks associated with them, such as: they promote foaming; they interfere with adhesion of the latex polymer to fillers or fibers used as reinforcing agents, and interfere with adhesion of the latex polymer to surfaces or substrates it is deposited on; they are extractable to create applications problems including toxicity and environmental concerns; they can migrate to the surface of the deposited films or to interfaces in filled deposited films to create problems; they impart hydrophilicity and enhance water absorption in deposited coatings, etc. In the emulsifier-free cationic latexes of this invention, all these drawbacks are eliminated. The pendant quaternary ammonium salt groups provide emulsion stabilization in the latex, but then self-associate to provide ionic cross-links in the dried polymer so that it is hydrophobic with less water absorption and with excellent adhesion to substrates it is deposited on or to fibers or fillers dispensed in it.

108C

In this example, an attempt to prepare a quaternary ammonium salt derivative of a random isobutylene/paramethylstyrene/para-bromomethylstyrene "base" terpolymer was unsuccessful because reaction conditions were not properly chosen. In this example, the same "base" terpolymer used in Example 2A was used. Its composition was 1.4 mole % para-bromomethylstyrene, 0.9 mole % paramethylstyrene and 97.7 mole % isobutylene with a viscosity average molecular weight of about 270,000. In the attempted nucleophilic substitution reaction, 450 g. of this "base" terpolymer was dissolved in 3,500 g. of heptane to give an 11.4% solution and then 47.2 g. of triethyl amine was added and stirred in ($\wedge$3 m triethyl amine/mole benzylic bromine). The solution was heated to 90° C. with stirring under slight nitrogen purge and kept hot for 7 hours before being allowed to cool. In this case, the polymer solution had little tendency to emulsify when shaken with water but separated quickly and cleanly as is usual for solutions of the "base" terpolymer. Recovery of the polymer as outlined in Example 107A by precipitation, resolution, and reprecipitation followed by vacuum-oven drying at 70° C. gave a dried polymer which was indistinguishable from the starting "base" terpolymer. Analysis showed all the benzylic bromines remained and there was no nitrogen or quaternary ammonium salt groups present. Despite the fact that the same "base" terpolymer was used with the same stoichiometric excess of triethyl amine and an even hotter reaction temperature for a longer time than in Example 107A no nucleophilic substitution occurred because the heptane solvent used is not a good solvating agent for intermediates along the desired reaction route. Heptane is not a favorable medium for the quaternization reaction: it does not facilitate the nucleophilic substitution reaction by solvation at the reaction site as does the mixed toluene/isopropanol solvent blend used in Example 2A. This example shows the importance of observing the "key" requirements as outlined in this invention in order to produce the pendant functionalized polymers claimed.

EXAMPLE 109

Preparation of Pendant Functionalized Isobutylene/Substituted Para-methylstyrene Copolymer Containing Ionomeric Quaternary Phosphonium Salt Groups In this example, a pendant functionalized primarily isobutylene-based copolymer containing cationic quaternary phosphonium salt groups was prepared and converted to a stable, emulsifier-free latex. An isobutylene-based polymer with an $M_v$ of 17,000 and containing 1.9 mole % para-chloromethylstyrene "mer" units was dissolved in a dried 75/25 heptane/isopropyl alcohol solvent blend under nitrogen to form a 40% polymer solution in a 5 l resin flask. The reactor was connected through a dry ice-cooled cold finger (set-up to reflux condensables back into the flask) to a scrubber for vented gasses and bubbler to maintain several inches of water positive pressure on the reactor. A slow dry nitrogen flow was maintained through the system to maintain the reactants under a dry, inert atmosphere. With stirring at 25° C. and while maintaining the dry nitrogen seal, twice the stoichiometric amount of triethyl phosphine (on benzylic chlorine) as a 67% solution in isopropanol was allowed to drip in slowly from a sealed dropping funnel. The mixture was heated with stirring to reflux at 77° C. and stirred for 2 hours at reflux under nitrogen before being cooled. A sample of the pendant functionalized polymer was recovered from the resulting clear fluid solution for analysis by precipitation and kneading in isopropanol, resolution in hexane/isopropanol, and reprecipitation in isopropanol followed by vacuum-oven drying at 70° C. with 0.2% BHT mixed in as an antioxidant. Despite the very low molecular weight, the recovered polymer was a tough elastomeric ionically cross-linked polymer very unlike the soft, sticky, semi-fluid starting "base" polymer. Analysis showed it contained 0.95 mole % phosphorus indicating about a 50% conversion of benzylic chlorines to quaternary phosphonium salt groups had occurred.

The remaining cooled solution from the nucleophilic substitution reaction was simply mixed "as is" with distilled water at a 40/60 water/solution ratio by volume to give a stable oil-in-water emulsion which was refined and then stripped and concentrated as in Example108B to give a stable, emulsifier-free fine particle size cationic latex at 50% solids by weight. As in Example 108B the latex preparation and stripping was accomplished easily with no foaming problems, and castings from the latex dried to hydrophobic, clear, tough, ionically cross-linked elastomeric films which would be useful in a broad spectrum of applications as already outlined. The pendant functionalized polymer of this latex contained mixed functionalities, benzylic chlorines and quaternary phosphonium chloride salt groups because the nucleophilic substitution reaction had not gone to completion. Nevertheless, the presence of 1% quaternary phosphonium chloride salt groups was adequate to permit preparation of the stable emulsifier-free latex, and was adequate to provide ionic cross-linking in deposited polymer films. The presence of the benzylic chloride would permit permanent covalent cross-link to be formed in many ways or permit other reactions to be run on this useful pendant functionalized polymer.

The nucleophilic substitution reaction is shown below:

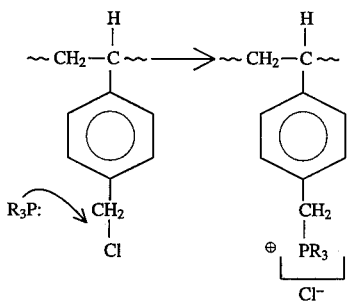

Analysis showed that the reaction was accomplished without degradation or cross-linking and under the conditions of this experiment achieved a 50% conversion of benzylic chlorines to quaternary phosphonium chloride salt groups. Higher conversions could be achieved with longer reaction times and/or higher reaction temperature—or by choosing a more favorable reaction medium.

Examples 107–109 all show that the backbone saturated pendant functionalized copolymers of this invention containing various cationic pendant functionality are readily prepared by following the procedures of this invention; and that they have useful combinations of properties for various applications. The pendant cationic groups are capable of imparting self-emulsification properties to make possible the facile preparation of emulsifier-free cationic latexes and the pendant cationic groups self-associate in dry deposited films to provide ionic cross-links which are reversible by proper solvation.

Three classes of cationic pendant functionalized copolymers have been exemplified (i.e. S-isothiouonium salts, quaternary ammonium salts, and quaternary phosphonium salts), but others such as the sulfonium salts using thioethers as the nucleophile as shown below are also possible:

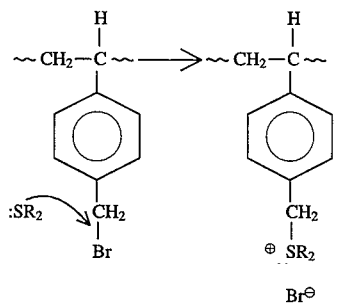

Properties of these cationic pendant functionalized polymers can be varied and controlled by the type of cationic group attached as well as by the R groups present and the counterion so that a broad range of properties is possible. Thus, while we have exemplified only the triethyl quaternary ammonium and phosphonium salts, the quaternary salts with other R groups are readily prepared to impart modified properties. Generally as the R groups become smaller (i.e. from ethyl to methyl), the ionic associations become stronger and more difficult to disrupt, but hydrophobicity improves as the R groups become larger. Properties are also strongly influenced by the counterion (i.e. chloride, bromide, bisulfate, etc.). Similarly properties of the S-isothiouronium salts are strongly dependent upon whether thiourea itself (as used in our examples) or substituted thioureas are used as the nucleophile. Strength of the ionic cross-links and hydrogen bonding properties are both diminished as substituted thioureas containing more and longer R groups are used to prepare the salts. Also the R groups themselves can contain other functionality to prepare cationic salts containing other useful functionality as for instead using triethanol amine as the nucleophile to prepare a pendant functionalized polymer containing quaternary ammonium salt groups with hydroxy functionality to permit further reactions or promote adhesion or dispersant action, etc.:

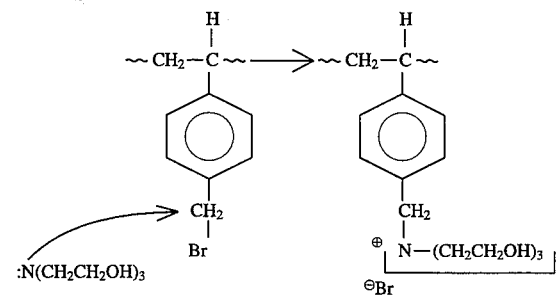

In addition, although not exemplified herein, it would be obvious to one skilled in the art that pendant anionic groups could also be attached to prepare anionic pendant functionalized polymers such as carboxylates or sulfonates.

EXAMPLE 110

Preparation of Pendant Functionalized Isobutylene/Paramethylstyrene Copolymer Containing Hydroxy Functionality

110A

In this example, pendant functionality was attached to a random isobutylene/paramethylstyrene/para-bromomethylstyrene "base" terpolymer by nucleophilic substitution using diethanol amine as the nucleophilic reagent. A random isobutylene/paramethyl styrene copolymer containing 4.7 wt. % paramethyl styrene with a viscosity average molecular weight of 140,000 was polymerized in the pilot plant and then radically brominated using VAZO 52 initiation at 60° C. as a 15% solution in hexane in a 100 gallon glass-lined pfaudler reactor to give a "base" terpolymer with a viscosity average molecular weight of 135,000 containing 1.6 wt. % bromine. The "base" terpolymer composition was 0.9+ mole % para-bromomethylstyrene, 1.4 mole % paramethylstyrene, and 97.7 mole % isobutylene. In the nucleophilic substitution reaction, 750 g. of the "base" terpolymer were dissolved in 2438 g. of toluene in a 5 l resin flask set-up as in Example108A by stirring under nitrogen to form a 23.5 wt. % solution. Then 48 g. diethanol amine (~3 moles/mole bromine) in 610 g. of isopropanol was added slowly with stirring at room temperature to give a 19.7 wt. % polymer solution in an 80/20 toluene/isopropanol solvent blend with 3 moles/mole of bromine of the nucleophilic reagent. The solution was heated with stirring under N₂ to reflux at ~87° C. and stirred at reflux for 7 hours before being allowed to cool. Several samples were taken during the reaction to determine when the reaction was completed. All the samples and the final solution emulsified when shaken with water or water/isopropanol so that it was not possible to wash out the unreacted diethanol amine. As shaken, the emulsions had a pH of ~8, but were stable even when made more basic or acidified so that the polymer was recovered by precipitation and kneading in isopropanol. The recovered "wet" polymer was further purified by washing and heading in a 50/50 water/methanol mixture to complete the extraction of unreacted diethanol amine and then vacuum-oven dried at 70° C. with 0.2 wt. % BHT mixed in as an antioxidant. As recovered under basic conditions (due to the presence of unreacted, diethanol amine), the pendant functionalized polymer was a slightly off-white, opaque, tough, rubbery polymer only slightly tougher than the sticky "base" terpolymer and still soluble in hexane. Analysis as summarized below showed the loss of most of the bromine with an essentially complete conversion of benzylic bromine to imino diethanol pendant functionality:

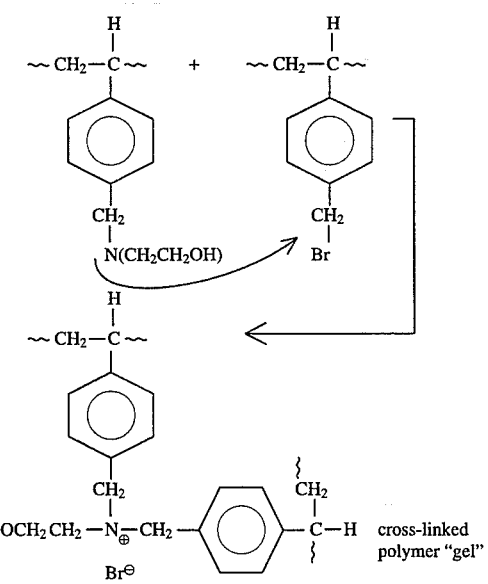

| | "Base" Terpolymer | Pendant Functionalized Polymer |
|---|---|---|
| M$_v$ | 135,000 | ~130,000 |
| Wt % Br | 1.6 | 0.2 |
| Wt % N | — | 0.28 |
| NMR | | |
| Mole % Benzylic Br | 0.9 | — |
| Mole % Imino diethanol | — | 0.9 |
| Mole % OH | — | 1.8 |

Samples taken after 2 and 4 hours at reflux were identical to the final product but the sample taken just as the reaction started to reflux was cross-linked after oven drying and was insoluble in anything so that NMR analyses could not be done. Elemental analysis showed the presence of slightly more bromine (0.33 wt. %) and slightly less nitrogen (0.25 wt. %), indicating the nucleophilic substitution reaction had not yet gone to completion and the cross-linking probably involved a sequential reaction of already attached iminodiethanol amine pendant functionality with unreacted benzylic bromine to form a quaternary ammonium salt cross-link during drying:

Apparently, under the conditions of this example, the nucleophilic substitution reaction had completely replaced the benzylic bromines within 2 hours at reflux temperature; and the reaction must be pushed to completion in the presence of excess diethanol amine nucleophilic reagent or sequential reactions involving already attached nucleophilic iminodiethanol pendant functionality will produce cross-linking.

Under the conditions of this reaction in the presence of a high stoichiometric excess of diethanol amine, most of the HBr formed in the nucleophilic substitution reaction is complexed with unreacted diethanol amine and is removed during work-up so that the major product is the benzylic iminodiethanol as shown. (Some of the remaining bromine may be present as the hydrobromide complex with the pendant iminodiethanol functionality but the level is too low to make it act as an ionomer.) The attached 1° hydroxy functionality makes this pendant functionalized polymer reactive with isocyanates, carboxylic acids, epoxides, etc., so that it is useful in polyurethanes, polyesters, epoxy resins, etc. The attached hydroxy groups also make the polymer hydrophilic and self-emulsifying to some degree and impact dispersant activity. As shown below, this pendant functionalized polymer readily forms acid adducts to become an ionomer with many of the properties of the other cationic ionomers of Examples 107–109.

In order to form the acid adducts, 10 g. of this dried pendant functionalized polymer was dissolved in 90 g. of hexane to yield a 10% solution and this was shaken in a separatory funnel with an aqueous phase made up of 1 g. of concentrated hydrochloric acid (37%), 89 g. of water and 10 g. of isopropanol. The shaking produced a stiff, gel-like water-in-oil paste from which the polymer was recovered by precipitating and kneading in isopropanol. The polymer was further purified by kneading in a 50/50 water/methanol mixture and then vacuum-oven dried at 70° C. with 0.2 wt. % BHT mixed in as an antioxidant. The recovered dried polymer was now an extremely tough ionomerically cross-linked elastomer. It was now insoluble in hexane or other hydrocarbons, but readily soluble in an hexane/isopropanol blend which was able to disrupt the ionic cross-link by solvation.

The HBr acid adduct was prepared in exactly the same way by substituting 1 g. of concentrated hyrobromic acid for the hydrochloric acid and the recovered HBr adduct was again a very tough ionomerically cross-linked elastomer. Other acid adducts could be prepared in similar fashion by using the desired acid. The reaction and analyses are shown below:

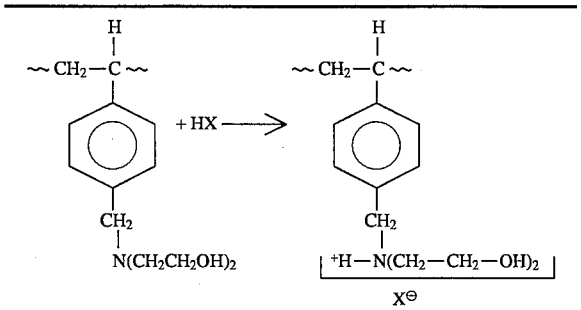

Analysis

|  | Pendant Functionalized Polymer | HCl Adduct | HBr Adduct |
|---|---|---|---|
| $M_v$ | ~130,000 | ~130,000 | ~130,000 |
| Wt. % Br | 0.2 | 0.2 | 1.49 |
| Wt. % Cl | — | 0.48 | — |
| Wt. % N | 0.28 | 0.28 | 0.28 |

The proton NMR spectra showed the appropriate resonances which by integration confirmed the chemical analyses in showing first the complete conversion of benzylic bromines to iminodiethanol functionality and then the nearly complete conversion of the pendant functionality to the acid adducts.

Proton NMR Resonances for Enchained Pendant Functional "mer" Units

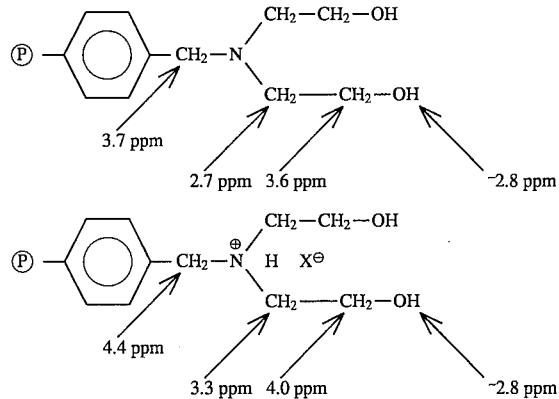

As indicated the acid adducts have resonances for the benzylic protons and the methylene protons adjacent to the nitrogen which are nearly as far upfield as for the similar protons in the quaternary ammonium salts of example 108A confirming the strongly ionic nature of the acid adducts, These acid adducts are readily converted to self-emulsifying cationic latexes as for the other ionomers of examples 107–109 but also contain primary hydroxy functionality which impacts new reactivity and extends utility into still other applications. Clearly the iminodiethanol pendant functionality imports versatile and useful properties.

It is also obvious that one skilled in the art could use other secondary amines containing other functional R groups as the nucleophilic reagent in place of the diethanol amine of this example to prepare pendant functionalized polymers with other functionality attached to the benzylic position of the "base" terpolymer by means of the amine nitrogen nucleophile, and that these could be convened to acid adduct ionomers as desired. Thus, iminodiacetic acid could be used in place of diethanol amine to attach pendant carboxylic acid groups or iminodiacetonitrile could be used to attach pendant nitrile groups, etc. It is also obvious that tertiary amines containing functional R groups could be used to attach pendant quaternary ammonium salt groups containing the other functionality in the R groups.

110B

In this example, pendant hydroxy functionality was attached to a random isobutylene/paramethylstyrene/para-bromomethylstyrene "base" terpolymer by nucleophilic substitution using diethanol amine as the nucleophilic reagent, but because the sequential nucleophilic substitution reaction involving already attached pendant iminodiethanol as a nucleophilic reagent was not controlled a cross-linked "gelled" polymer of diminished utility resulted. The "base" terpolymer used in this example was identical to that used in Example 110A and contained $0.9^+$ mole % para-bromomethylstyrene, 1.4 mole % paramethylstyrene, and 97.7 mole % isobutylene with a viscosity average molecular weight of 135,000.

In the nucleophilic substitution reaction; 750 g. of the "base" terpolymer were dissolved in 2438 g of B & J hexane in a 5 l resin flask with stirring under nitrogen to form a 23.5% solution by weight. Then 33.5 g of diethanol amine ($\wedge$ 2 moles/mole bromine) in 610 g of isopropanol was added slowly with stirring at room temperature to give a 19.7 wt. % polymer solution in an 80/20 hexane/isopropanol solvent blend with 2 moles/mole of bromine of the diethanol amine nucleophilic reagent. The solution was allowed to stir at room temperature for two hours and then heated with stirring under $N_2$ to reflux at 63° C. It was stirred at reflux for 7 hours before being cooled with samples being taken after various times to monitor the progress of the reaction. As in Example 110A all the samples emulsified when shaken with water forming stable emulsions which could not be separated by any technique tried so that it was not possible to wash them before recovery by precipitation and kneading in isopropanol. As in the previous example then it was necessary to remove unreacted diethanol amine and further purify the recovered polymer by extensive kneading in isopropanol and then further kneading in a 50/50 water/methanol mixture before vacuum oven drying @70° C. with 0.2 wt. % BHT mixed in as an antioxidant.

In this example though, all the samples and the final product were cross-linked after oven drying. They were completely insoluble and intractable so that characterization was difficult. The final recovered polymer was in each case a tannish cross-linked tough sponge rubber which was not only insoluble, but also could not be caused to flow in order to be formed into test specimens even in a hot press. The extent of cross-linking appeared to diminish somewhat (as judged by the force required to stretch the dried spongy rubber and by the extent of swell in solvents) as reaction time increased, but even the final sample after 7 hours of reflux was still insoluble despite the fact that the nucleophilic substitution reaction had nearly gone to completion as judged by elemental analyses for bromine loss and nitrogen content (spectral analyses were not possible because of sample intractability).

Elemental Analyses on Samples

| Sample | Reaction Time @ Reflux | Wt. % Br | Wt. % N |
|---|---|---|---|
| Orig "BASE" Poly | — | 1.6 | 0 |
| A | several minutes | 0.8 | .14 |
| B | 1 hour | 0.48 | .27 |
| C | 3 hours | 0.38 | .25 |
| Final | 7 hours | 0.28 | .28 |

The elemental analyses on sample A taken just after reflux temperature was reached suggest that the nucleophilic substitution reaction was already about 50% complete. The polymer appeared to be "gel free" during work-up, but was a very tightly cross-linked spongy mass after vacuum—oven drying. The elemental analyses suggest that the substitution reaction had gone nearly to completion in the remaining samples, with the residual bromine content of the final rubber being as low as that in the soluble product of Example 4A, but nevertheless all were cross-linked and insoluble. In fact, they appeared to be already gelled during work-up and prior to vacuum—oven drying.

It is apparent that under these reaction conditions the sequential reaction involving already attached iminodiethanol functionality reacting with remaining benzylic bromine to form quaternary ammonium cross-links is proceeding fast enough to always yield an undesirable gelled (insoluble) pendant functionalized polymer. If the reaction is stopped at an early stage, cross-linking occurs during drying; if the reaction is allowed to proceeded more nearly to completion; the cross-linking occurs competitively with the desired nucleophilic substitution reaction. In order to produce the desired soluble pendant functionalized polymer, it is necessary to speed up the desired substitution reaction and/or retard the undesired sequential reaction. This was achieved in Example 4A by using a larger stoichiometric excess of the diethanol amine nucleophilic reagent and by using a solvent system and reaction temperature which speeded up the desired reaction to drive it to completion before the sequential reaction became important.

This example shows the necessity for considering the consequences of possible sequential reactions and of choosing reaction conditions to avoid them in order to produce the desired soluble pendant functionalized polymers of this invention.

The use of functional group containing amines as the nucleophilic reagent for reaction with the para-bromomethylstyrene containing "base" terpolymers of the invention is a general method for attaching pendant functionality such as hydroxy, carboxy, nitrite etc.—but it must always be used with careful recognition and control of the sequential and competing nucleophilic substitution reactions in order to avoid cross-linking and produce the desired soluble pendant functionalized polymers of this invention.

Another way of introducing pendant hydroxy functionality is via esterification and hydrolysis as taught in Example 112.

EXAMPLE 111

Preparation of Pendant Functionalized
Isobutylene/Paramethyl Styrene Copolymer
Containing Dithiocarbamate Ester Functionality

111A

In this example, pendant dithiocarbamate ester functionality was attached to a random isobutylene/paramethylstyrene/paramethyl brominated para-bromomethylstyrene "base" terpolymer by nucleophilic substitution using sodium diethyl dithiocarbamate as the nucleophilic reagent. The "base" terpolymer containing the reactive electrophilic benzylic bromines was prepared as already outlined. The starting copolymer was the same as used in Example 107A, it contained 6.6 wt. % paramethylstyrene with a viscosity average molecular weight of 68,000. It was radically brominated using light initiation at 40° C. as a 15% solution in hexane to give a "base" terpolymer with a viscosity average molecular weight of 65,000 and containing 4.3 wt. % bromine. The "base" terpolymer composition was 96.70 mole % isobutylene, 2.60 mole % para-bromomethylstyrene, and 0.7 mole % paramethylstyrene. There was some dibrominated paramethylstyrene present because of the high bromination level achieved. In the nucleophilic substitution reaction; 200 g of the "base" terpolymer was dissolved in 2100 g of toluene in a 5 l resin flask under nitrogen to form an 8.7 wt. % solution. Then 22 g. of sodium diethyl dithiocarbamate dissolved in 700 g of isopropyl alcohol was added slowly with stirring at room temperature to give a 6.6% polymer solution in an 75/25 toluene/isopropanol solvent blend with 1.2 moles per mole of Br of the nucleophilic reagent. The solution was heated with stirring under $N_2$ to 80° C. and stirred @80° C. for 6 hours to complete the nucleophilic substitution reaction before being cooled—however, samples removed after 1 and 3 hours showed that the reaction was already over after 1 hours @80° C. The cooled solution was given several water washes to remove the sodium bromide byproduct and other water solubles and then the polymer was removed by precipitation and kneading in isopropanol as in the earlier examples. The dried polymer was recovered by vacuum oven drying at 70° C. without added stabilizers since the attached dithiocarbamate ester groups themselves acted as a polymer bound stabilizer. The recovered polymer was a tough slightly tannish elastomer with complete solubility in hexane. Analyses as summarized below showed a very high conversion of benzylic bromine to dithiocarbomate ester had been achieved:

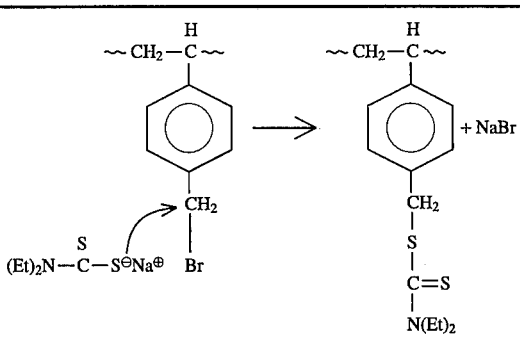

| Analyses | "base" terpolymer | pendant functionalized polymer |
|---|---|---|
| Mv | 65,000 | 65,000 |
| wt. % Br | 4.3 | 0.6 |
| wt. % sulfur | — | 2.97 |
| wt. % N | — | 0.65 |
| NMR | | |
| mole % benzylic Br | 2.6 | — |
| mole % dithio-carbomate ester | — | 2.6 |

The proton NMR spectra confirmed the chemical analyses in showing the quantitative conversion of benzylic bromine functionality to pendant dithiocarbamate ester functionality.

Proton NMR Resonances for Enchained

Pendant Functional Dithiocarbamate Ester "Mer' Unit

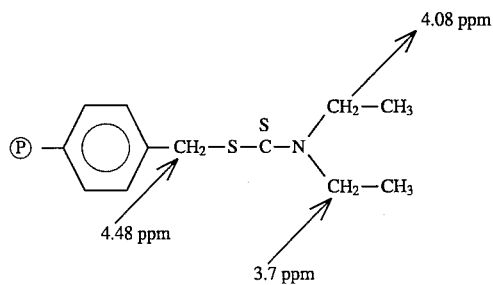

This experiment shows that facile conversion of benzylic bromine functionality in the "base" polymer to pendant dithiocarbamate ester functionality is possible via nucleophilic displacement. The attached dithiocarbamate ester functionality provides built-in antioxidant protection to the polymer as well as vulcanization and covulcanization activity and permits free radical chemistry to be employed as is discussed more later.

111B

In this example a "base" isobutylene/paramethylstyrene/para-bromomethylstyrene terpolymer was prepared and converted via a sequential reaction route to a copolymer containing pendant dithiocarbamate ester functionality without separate isolation and recovery of the intermediate "base" terpolymer. This sequential reaction route which avoids recovery of the intermediate "base" copolymer is of course economically advantageous.

An isobutylene/paramethyl-styrene random copolymer containing 4.8 wt. % paramethyl-styrene with a Mooney viscosity of 30 (the same copolymer used in Example108A) was dissolved in hexane under nitrogen to form a 17 wt. % solution with 8% by wt. of atomite $CaCO_3$ stirred in suspension as an acid scavenger to give an opaque white slightly viscous solution which was heated with stirring under nitrogen to 60° C. The solution was illuminated with a 120 Watt Spotlight and then with continued stirring @ 60° C. with slight nitrogen purge, 6.5 wt. % bromine on polymer was added as a 20% solution in hexane. The solution turned bright orange/red as the bromine was added but the color rapidly faded as the radical bromination reaction took place. Despite the opacity of the solution, the light-initiated bromination progressed rapidly so that the bromine cooler had completely discharged and the light was turned off within 5 minutes. A sample of the brominated solution was removed to enable characterization of the brominated "base" terpolymer and then 1 mole of sodium diethyl dithiocarbamate per mole of bromine was added as a 5% solution in isopropanol to give an 80/20 hexane/isopropanol solvent blend and the solution was stirred hot @60° C. to effect the nucleophilic substitution reaction. Samples removed at 15 minute intervals to follow the progress of the reaction showed that it was complete within ½ hour. The samples and final solutions were given several water washes with dilute HCl (1%) to convert excess $CaCO_3$ to $CaCl_2$ and remove it and other water solubles into the aqueous wash and then given several water washes to remove traces of acid before the polymer was recovered by precipitation and kneading in isopropanol as in the earlier examples.

In the first step of this sequential reaction, a portion of the enchained paramethylstyrene moieties of the starting copolymer were converted to para-bromomethylstyrene moieties by light initiated radical bromination with the byproduct HBr being removed by reaction with the dispersed calcium carbonate:

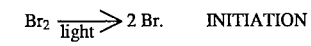

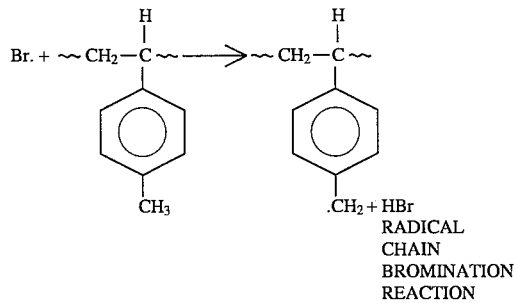

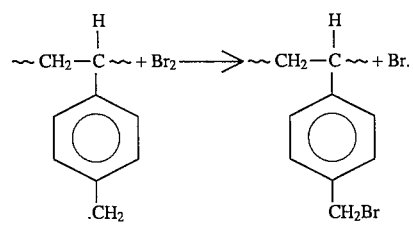

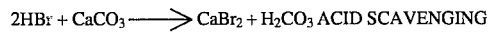

In the second step of the sequential reaction, the sodium diethyl dithiocarbamate nucleophilic reagent reacted with the electrophilic benzylic bromines to produce the desired pendant functionalized product:

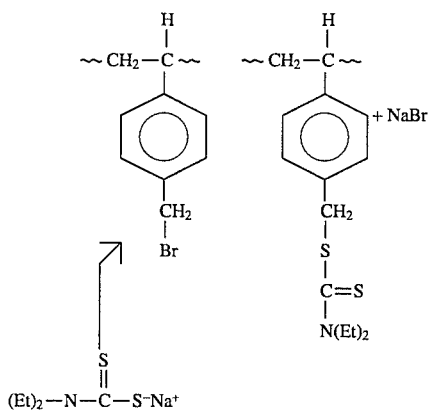

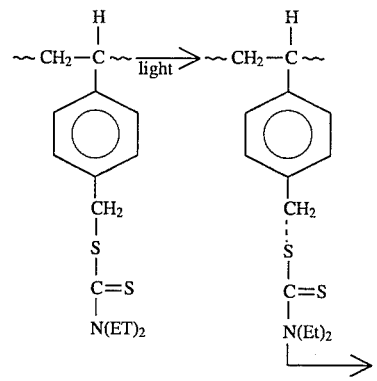

Analyses as summarized below showed that the intermediate "base" terpolymer contained 1.2 mole % benzylic bromine functionality whereas the final pendant functionalized product contained 0.9 mole % dithiocarbamate ester pendant functionality with 0.3 mole % benzylic bromine functionality remaining.

| Analyses | | | |
|---|---|---|---|
|  | Starting Copolymer | Intermediate "base" Terpolymer | Final pendant Functionalized product |
| Mv | — | 280,000 | 280,000 | 280,000 |
| wt % Br | — | — | 2.0 | 0.5 |
| wt % S | — | — | — | 1.0 |
| wt % N | — | — | — | 0.2 |
| NMR | | | | |
| mole % PMS | — | 2.3 | 1.1 | 1.1 |
| mole % Br PMS | — | — | 1.2 | 0.3 |
| mole % dithiocarbaomate ester | — | — | — | 0.9 |

This mixed functionality polymer was stable without any added antioxidants and was vulcanizable with promoted zinc oxide and/or conventional sulfur vulcanization systems. It also showed good covulcanization in blends with natural rubber. Films of this copolymer cross-linked on exposure to U.V. irradiation as opposed to the degradation normally experienced with high isobutylene containing polymers under U.V. irradiation. This cross-linking under irradiation is attributed to the ready ability of the dithiocarbamate ester functionality to form stable radicals under irradiation to permit radical cross-linking and other radical chemistry reactions to occur rather than backbone cleavage as normally occurs with isobutylene based polymers:

cross-links by coupling insertion reactions, etc.

This ability of the dithiocarbamate ester functionality to prevent U.V. degradation and/or to impart controlled cross-linking under free radical conditions is very valuable in exterior applications such as roofing, coating, white tire sidewalls, etc., where the tendency of isobutylene base copolymers to degrade and develop surface tackiness has always impaired their utility in such areas.

111C

In this example a pendant functionalized isobutylene based polymer containing nearly equal amounts of dithiocarbamate ester and benzylic bromine functionality was prepared via a sequential reaction route without recovery of the intermediate "base" terpolymer.

Five hundred grams of an isobutylene/paramethyl styrene random copolymer containing 4.5 mole .% paramethyl styrene with a Mooney viscosity of 34 was dissolved in 2833 grams of n-hexane under nitrogen a q 5 l resin flask to yield a 15 wt. % solution. Forty-five grams of Omyacorb UFT calcium carbonate was stirred in as an acid scavenger to yield an opaque white dispersion and then the solution was heated with stirring to 60° C. and illuminated with a 120 Watt spotlight. Thirty-five grams of bromine (7 wt. % on polymer) was added as a 25 wt. % solution in hexane to effect radical bromination and produce the "base" terpolymer. The bromination reaction was over in <5 minutes and after removal of a sample for characterization of the "base" terpolymer, 30 grams of sodium diethyl dithiocarbamate ( 0.9) moles/mole of bromine) dissolved in 600 grams of isopropanol (to give on 83/17 hexane/isopropanol solvent blend) was added to effect the nucleophilic substitution reaction and the solution was stirred hot @60° C. for ½ hour to complete the reaction. The solution was cooled and acid washed and then the polymer recovered by alcohol precipitation as in example 5B. The sequential reactions proceeded as already outlined. Analyses as summarized below showed on intermediate "base" polymer with 2.2 wt. % bromine and a final pendant mixed functionalized product with 0.7 mole % benzylic bromine and 0.7 mole % dithiocarbomate ester functionality.

| Analyses | | | |
|---|---|---|---|
|  | Starting Copolymer | Intermediate "Base" Terpolymer | Final Mixed Pendant Functionalized Product |
| Mooney | — | 34 | 33.5 | 33 |
| Wt % Br | — | \ | 2.2 | 1.05 |
| Wt % S | — | \ | \ | 0.77 |

Analyses

| | Starting Copolymer | Intermediate "Base" Terpolymer | Final Mixed Pendant Functionalized Product |
|---|---|---|---|
| Wt % N NMR | — | \ | \ | 0.17 |
| Mole % PMS | — | 4.5 | 3.1 | 3.1 |
| Mole % Br PMS | — | \ | 1.4 | 0.7 |
| Mole % Dithiocarbamate Ester | — | \ | — | 0.7 |

These examples show that pendant dithiocarbamate ester functionality is readily introduced into the "base" terpolymer of this invention by a nucleophilic substitution reaction; stable mixed functionality polymers containing both benzylic bromine and dithiocarbamate ester functionality can be made at any desired ratio of the functionalities; and that an economical sequential reaction route can be utilized.

EXAMPLE 112

Preparation of Pendant Functionalized Isobutylene/Para-methylStyrene Copolymer Containing Various Ester Functionalities

112A

In this example pendant cinnamate ester functionality was attached to a random isobutylene/paramethyl styrene/para-bromomethylstyrene "base" terpolymer by nucleophilic substitution using a cinnamic acid salt as the nucleophilic reagent. The "base" terpolymer used in this example was identical to that used in examples 4A and 4B and contained 0.9 mole % paramethyl brominated paramethyl styrene, 1.4 mole % paramethyl styrene, and 97.7 mole % isobutylene with a viscosity average molecular weight of 135,000.

In the nucleophilic substitution reaction, 750 g of the "base" terpolymer was dissolved in 3000 g of toluene in a 5 l resin flask by stirring under $N_2$ to form a 20 wt % solution. Then 35.4 g of cinnamic acid (1.5 moles/mole bromine); 77.3 g 40% tetrabutyl ammonium hydroxide (0.5 mole/mole acid) and 9.6 g 50% sodium hydroxide (0.5 mole/mole acid) were stirred in and the resulting emulsion was heated to reflux at $_\wedge86°$ C. with stirring and with an air condenser attached. The solution was refluxed for 3 hours at 86° C. to complete the reaction with samples removed at reflux and after one half and one and one half hours of reflux to monitor the progress of the reaction. The solution gradually became clearer during reaction and after three hours was a translucent, light beige color. The final solution and samples were given acidic, basic, and neutral washes and then the polymer was recovered by precipitation and kneading in isopropanol as in earlier examples and then vacuum oven drying at 70° C. with a 0.2 wt % BHT mixed in as an antioxidant. Analyses as summarized below show that the nucleophilic substitution reaction was proceeding slowly and had still not gone to completion after three hours of reflux:

| | Wt % Bromine |
|---|---|
| Starting Base Terpolymer | 1.60 |
| @ Reflux | 1.37 |
| 1/2 Hour Later | 1.08 |
| 1 1/2 Hours Later | 0.91 |
| (Final) 3 Hours Later | 0.54 |

The final product after three hours of reflux contained 0.8 mole % cinnamate ester with only 0.1 mole % benzylic bromine left so the nucleophilic substitution reaction had gone nearly 90% to completion:

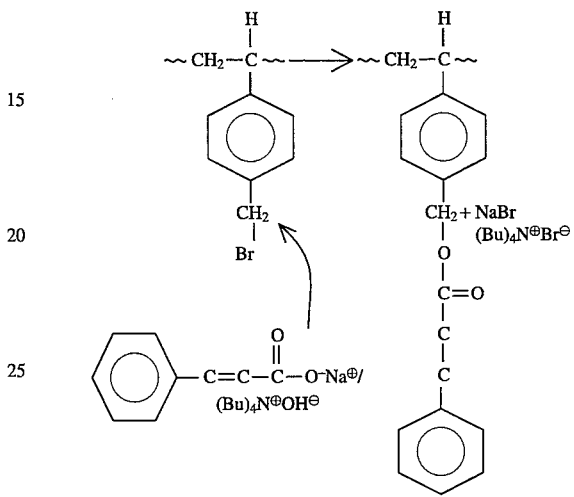

Proton NMR spectra was used to quantify the amount of cinnimate ester functionality introduced:

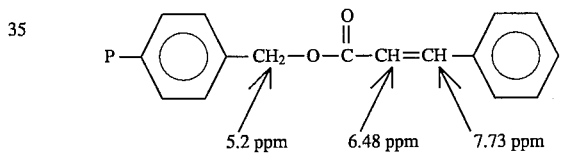

with of course the new aromatic protons also being present in the spectra.

This experiment shows that pendant carboxylic acid ester functionality can be introduced into the "base" polymer of this invention by nucleophilic substitution under suitable conditions. The cinnamate ester functionality is interesting in that it enables cross-linking to occur when the polymer is irradiated under suitable conditions.

112B

In this example, pendant fatty acid ester functionality was attached to a random isobutylene/paramethyl styrene/para-bromomethylstyrene "base" terpolymer by nucleophilic substitution using a commercial $C_{18}$ fatty acid high in linolenic acid (Industrene 120 from Witco Corporation) as the fatty acid. The "base" terpolymer used had a Mooney viscosity of 30 and contained 2.0 mole % para-bromomethylstyrene, 5.0 mole % paramethyl styrene, and 93.0 mole % isobutylene.

In the nucleophilic substitution reaction, 500 g of the "base" terpolymer was dissolved in 2833 g of toluene in a 5 l resin flask under nitrogen to form a 15 wt % solution. Then 63.3 g of Industrene 120 Linseed fatty acid (1.2 moles/mole Br) was added along with 72.8 g of 40% tetrabutyl ammonium hydroxide (0.5 moles/mole acid) and 9.0 g 50% NaOH (0.5 moles/mole acid) to form an opaque, slightly yellowish emulsion which was heated with stirring to reflux at ∧87° C. under nitrogen with an air condenser attached. The emulsion was refluxed for two hours before being cooled with samples being removed at reflux, after one half hour and after one hour of reflux to monitor the progress of the reaction. During the reaction the solution became clearer with water droplets being distilled over into the condenser. The final solution was a translucent, light yellow color. The samples and final solution were given acidic, basic, and then neutral water washes before being precipitated in isopropanol and vacuum oven dried as usual. Analyses as shown below indicate that the nucleophilic substitution with the $C_{18}$ fatty acid was faster than than with the cinnamic acid and was essentially done in one hour—apparently the carboxylate nucleophile attached to the $C_{17}$ hydrocarbon achieves intimate contact with the benzylic bromine electrophile attached to the "base" terpolymer more easily than when the carboxylate is attached to a shorter alkyl group.

|  | Wt % Bromine |
|---|---|
| Starting Base Terpolymer | 3.0 |
| @ Reflux | 1.06 |
| 1/2 Hour Later | 0.45 |
| 1 Hour Later | 0.29 |
| (Final) 2 Hours Later | 0.23 |

NMR analyses, as depicted in FIG. 1, showed the final product contained 2.0 mole % ester and essentially no benzylic bromine indicating that the nucleophilic substitution reaction had gone to completion. (The small residual bromine content as measured by a Princeton-Gamma Tech Bromine Analyzer probably represents inorganic bromides not fully washed out during recovery). The NMR spectra (attached) shows a resonance due to the benzylic ester protons at 5.08 ppm and a broad complicated resonance due to the olefinic protons in the $C_{18}$ chain at 5.3–5.5 ppm.

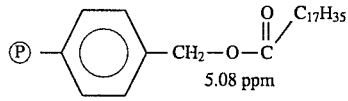

(The benzylic ester protons of the cinnamate ester of example 112A showed a higher field resonance at 5.2 ppm due to the conjugation present in the cinnamate ester.)

The fully converted linseed oil acid ester derivative of this example showed no evidences of cross-linking and remained completely soluble when compounded and heated under typical vulcanization conditions with zinc oxide or promoted zinc oxide vulcanization systems which are effective with the starting brominated "base" terpolymer (confirming the absence of any remaining benzylic bromines), but gave good vulcanizates when compounded and cured with typical sulfur vulcanization systems such as:

| Polymer | 100 |
|---|---|
| Sulfur | 1.25 |
| M. Tudds | 1.50 |
| Altax | 1.0 |
| Zinc Oxide | 3.0 |

The presence of unsaturation in the pendant fatty acid side chains thus permits conventional sulfur vulcanization systems to be employed to vulcanize the functionalized ester derivative of this example. The pendant unsaturation is also useful in permitting covulcanization with the high unsaturation general purpose rubbers such as natural rubber or SBR.

Testing of sulfur vulcanized test specimens of this ester derivative in a standard ozone resistance test showed that they retained the outstanding ozone resistance characteristic of the saturated "base" terpolymer vulcanizates. The pendant unsaturation in the side chain thus imparts conventional sulfur vulcanization activity without adversely affecting ozone resistance.

112C

In this example an attempt to attach pendant fatty acid ester functionality to a random isobutylene/paramethylstyrene/para-bromomethylstyrene "base" terpolymer by nucleophilic substitution was unsuccessful because the key requirements as taught in this patent were not followed. The fatty acid used in this example was the same linseed oil acid (Industrene 120) used in example 6B. The "base" terpolymer used had a Mooney viscosity of 30 and contained 0.75 mole % para-bromomethylstyrene, 1.6 mole % paramethylstyrene and 97.65 mole % isobutylene.

In the attempted nucleophilic substitution reaction, 200 g of the "base" terpolymer was dissolved in 1133 g of toluene in a 2 1 resin flask under nitrogen purge to form a 15% solution to which 15 g of Industrene 120 (∧1.7 moles/mole of bromine) and 3.0 g calcium oxide powder (1 mole/mole acid) was added. The reaction mixture was then heated to 90° C. and stirred hot for eight hours before being cooled, with samples being removed periodically to monitor the progress of the reaction. No reaction occurred—The polymer recovered from the samples and the final product was identical to the starting "base" terpolymer. It showed no bromine loss or ester formation.

The nucleophilic substitution reaction did not proceed because the required, intimate contact between the nucleophilic reagent and the polymeric electrophile was not achieved under the proper solvation conditions. The ionic calcium carboxylate soap will not react at an appreciable rate with the polymeric benzylic bromine in toluene solution at these temperatures.

Reactions under similar conditions with sodium hydroxide, potassium hydroxide, or ammonium hydroxide used in place of the calcium oxide also failed to proceed for the same reason; but when intimate contact is achieved under the proper solvation conditions and temperature, then the desired "clean" nucleophilic substitution proceeds rapidly as in examples 112A and 112B with some tetrabutyl ammonium hydroxide present. Successful substitution is also achieved when 18 -Crown- 6 is used in conjunction with KOH to solvate the mixture site or when other proper solvating phase transfer catalysts are used.

112D

In this example an attempt to produce a soluble pendant fatty acid ester functionalized polymer failed because a competing reaction which produced cross-links was not controlled and a gelled product of limited utility resulted. As in the previous examples, Industrene 120 was used as the fatty acid while the "base" terpolymer was a random isobutylene/paramethylstyrene/para-bromomethylstyrene terpolymer with a viscosity average molecular weight of 285,000 and containing 4.2 mole % para-bromomethylstyrene, 4.0 mole % paramethylstyrene and 91.8 mole % isobutylene.

In the nucleophilic substitution reaction, 200 g of the "base" terpolymer was dissolved in 1133 g of toluene to give a 15% solution to which 36 g of Industrene 120 (0.75 moles/mole bromine), 2.5 g 40% tetrabutyl ammonium hydroxide (0.1 moles/mole acid) and 8 g 28% ammonium hydroxide (0.5 moles/mole acid) were added before heating to 90° C. to initiate the substitution reaction. As the reaction mixture was heated, it thickened and, shortly after reaching 90° C., it totally gelled. The recovered polymer was a tough, insoluble gel and could not be characterized.

In this instance, at a relatively low level of the onium salt, the esterification reaction was proceeding slowly and the competing N-alkylation reaction with the ammonium salt was occurring rapidly enough to produce a cross-linked gel of limited utility.

These negative examples show that the key requirements as taught in this invention must be observed in order to produce the desired soluble pendant functionalized polymers of this invention.

112E

In this example, pendant fatty acid ester functionality in which the fatty acid contained conjugated unsaturation was attached to the "base" terpolymer. The fatty acid used was derived from Tung oil and was high in eleostearic acid. The "base" terpolymer had a Mooney viscosity of 32 and contained 3.6 wt % bromine. It was a terpolymer containing 2.2 mole % para-bromomethylstyrene, 2.7 mole % paramethyl styrene, and 95.1 mole % isobutylene. In the nucleophilic substitution reaction, 666 g of "wet" base terpolymer crumb ($\sim$500 g dry weight) were dissolved in 2833 g toluene in a 5 l resin flask to yield a 15% polymer solution containing dispersed water. This use of "wet" crumb in the nucleophilic substitution reaction is advantageous as it avoids the need to finish the brominated "base" terpolymer prior to convecting it to the pendant functionalized polymer. To the "wet" polymer solution were added: 76 g of Tung oil acid ($\sim$1.2 moles/mole bromine), 87.4 g 40% tetrabutyl ammonium hydroxide (0.5 moles/mole acid) and 43 g 50% sodium hydroxide (0.2 moles/mole acid) to give a milky white emulsion which was heated to reflux at about 84° C. with an air condenser attached. The reaction mixture was stirred hot at reflux for one hour before being cooled and washed and recovered as previously outlined. Samples removed at reflux and one half hour later were similarly recovered.

The substitution reaction was proceeding rapidly under these conditions as shown by the following bromine analyses:

|  | Wt % Bromine |
|---|---|
| Starting Base Terpolymer | 3.6 |
| @ Reflux | 0.78 |
| 1/2 Hour Later | 0.56 |
| (Final) 1 Hour Later | 0.40 |

Figure 2:
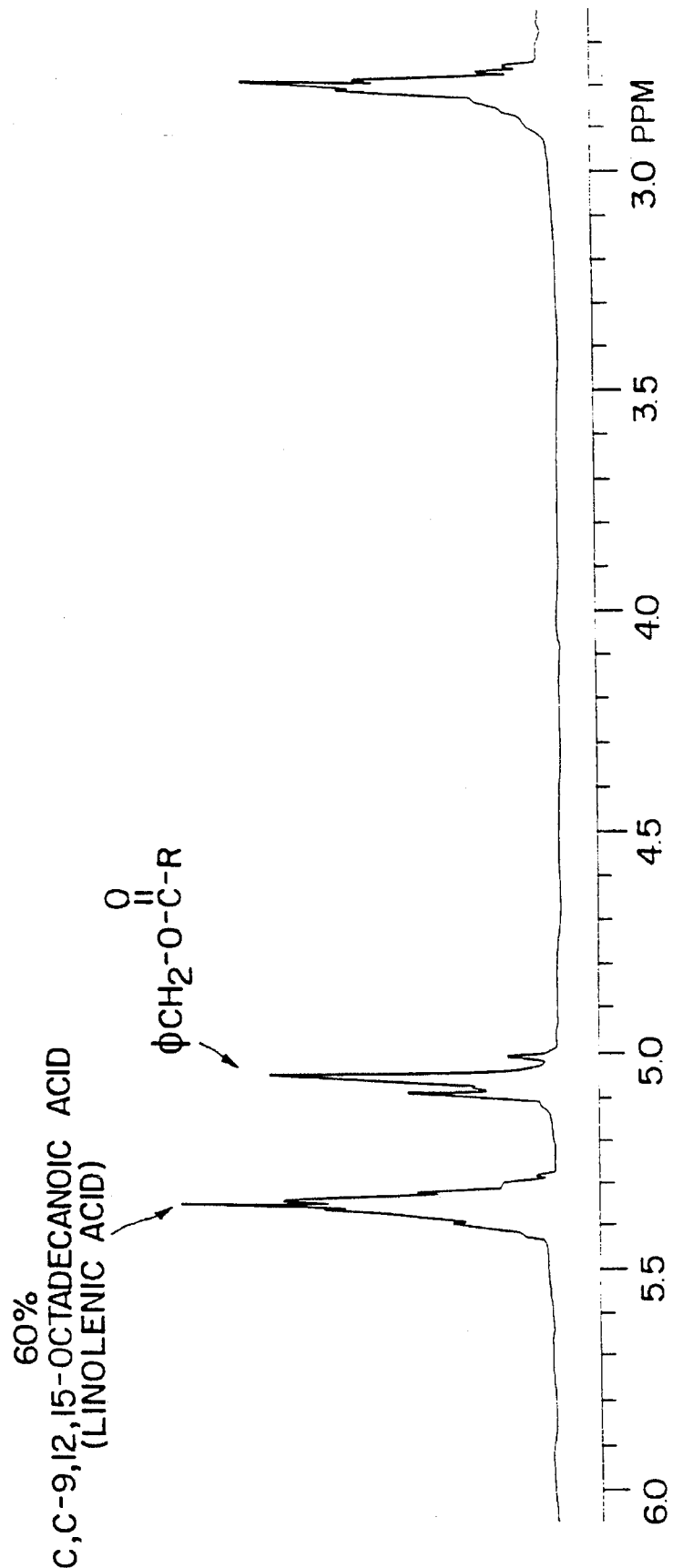
FIG. 2 illustrates an NMR spectrum of linolenic acid.

The NMR spectra, as depicted in FIG. 2, shows a resonance due to the benzylic ester protons at 5.08 ppm, some residual resonance of 4.47 ppm due to remaining benzylic bromide, and a series of resonances at 5.3–6.4 ppm due to the olefinic protons of the $C_{18}$ acid (with the conjugated unsaturation resonances being the high field resonances at >5.9 ppm). The final product contained 1.9 mole % ester with 0.2 mole % benzylic bromide remaining. It was completely soluble with a Mooney viscosity of 31, the same as the starting "base" terpolymer.

Despite the highly active nature of the pendant conjugated unsaturation, this functionalized polymer showed good stability with no tendency to cross-link during drying or storage. However, the attached conjugated unsaturation permitted facile vulcanization and covulcanization with unsaturated rubbers with sulfur vulcanization systems. The conjugated unsaturation also provided good cross-linking under electron beam irradiation and permitted oxidative surface curing to occur upon outdoor exposure to sunlight—a highly useful property in exterior coatings such as roof coatings. The conjugated unsaturation is also very active in radical reactions to permit grafting reactions with free radical polymerizable monomers. This highly active Tung acid ester derivative is thus useful in a wide range of applications.

It is obvious that nucleophilic substitution reactions with various carboxylic acids could be used to attach many other functional side chains such as hydroxy using ricinoleic acid, etc.

112F

In these examples pendant acrylate functionality was attached to the "base" terpolymer via esterification with acrylic or methacrylic acids. The pendant acrylate side chain produces cross-linkability under irradiation and permits grafting reactions with free radical polymerizable monomers. The "base" terpolymers used in these reactions were isobutylene/paramethyl styrene/para-bromomethylstyrene terpolymers. They are characterized in the examples in terms of the weight present of electrophilic/para-bromomethylstyrene present.

EXAMPLE 112F-1

Reaction of Poly(isobutylene-co-para-bromomethylstyrene-co para-methylstyrene with Methacrylic Acid.

A 1 liter glass reaction vessel, fitted with a magnetic stirrer, a hose connector, and a septum was purged with nitrogen. Operating in an atmosphere of nitrogen, the vessel was charged with a cyclohexane solution (500 ml) which contained 50 grams poly(isobutylene-co-para-bromomethylstyrene) (Mv=10 k, 4.6% para-bromomethylstyrene). A cyclohexane solution of tetrabutylammonium 2,6-di(t-butyl)-4-methylphenoxide was prepared in a second flask under nitrogen by placing 100 ml cyclohexane, 30 ml tetrabutylammonium hydroxide (1 M in methanol) and 6.6 g 2,6-di(t-butyl)-4-methylphenol into the flask and concentrating this solution down to half its volume. This solution was then added to the flask containing the poly(isobutylene-co-para-bromomethylstyrene). Then 2.5 ml methacrylic acid was added to the polymer solution and the temperature of the solution was raised to 50° C. The reaction was complete in one hour and the polymer was isolated by precipitation in isopropanol. The polymer was dried in a vacuum oven at 1 mm Hg and 40° C. GPC of the recovered polymer (50 g, 100% yield) was identical to that of the starting poly(isobutylene-co-para-bromomethylstyrene). The analysis for the methacrylate content (FTIR and NMR) indicate that the modified polymer had 0.58 meq/gram which is consistent with the complete conversion of methacrylic acid to methacrylic ester.

EXAMPLE 112F-2

Reaction of Poly(isobutylene-co-para-bromomethylstyrene-co-paramethylstyrene) with Acrylic Acid A 5 liter glass reaction vessel, fitted with a magnetic stirrer, a hose connector, and a septum were purged with nitrogen. Operating in an atmosphere of nitrogen, 297 grams of poly(isobutylene-co-para-bromomethylstyrene) (Mv=1.2 M, 1.7% para-bromomethylstyrene) was placed into the vessel along with 3.5 liters of xylenes. The polymer was dissolved with stirring under a partial vacuum of 100 mm Hg with a nitrogen sparge attached at the bottom of the solution. A xylene solution of tetrabutylammonium acrylate was prepared in a second flask under nitrogen by placing 100 ml xylenes, 60 ml tetrabutylammonium hydroxide (1 M in methanol) and 6.0 g acrylic acid together with stirring. The contents of the flask was concentrated to half its volume and then diluted to 0.5 liters with more xylenes. This solution was then added to the flask containing the poly(isobutylene-co-para-bromomethylstyrene) and the temperature of the solution was raised to 65° C. The reaction was complete in six hours and the polymer was isolated by precipitation in isopropanol. The polymer was dried in a vacuum oven at 1 mm Hg, 40° C. The analysis for the acrylate content (FTIR and NMR) indicate that the modified polymer has 0.24 meq/gram which is consistent with the complete conversion of acrylic acid to acrylic ester and total conversion of the benzylbromide.

These examples again show that by observing the key requirements as taught in this invention nucleophilic substitution using a carboxylate nucleophile can be used to attach highly useful pendant functionality via an ester linkage.

EXAMPLE 113

Preparation of Pendant Functionalized Isobutylene/Paramethyl Styrene Copolymer Containing Hydroxy or Mixed Ester and Hydroxy Functionalities In these examples, pendant acetate ester functionality was attached to a random isobutylene/paramethyl styrene/para-bromomethylstyrene "base" terpolymer by nucleophilic substitution using an acetic acid salt as the nucleophilic reagent and then in a sequential reaction all or some part of the ester functionality was hydrolyzed to introduce pendant hydroxy functionality. In this way, pendant functionalized polymers containing benzylic bromine, ester, and hydroxy pendant functionality in any desired ratio can be produced. These saturated, functionalized polymers can be used in conjunction with and coreacted with many other functional resins as tougheners, impact modifiers, etc. They open up the vast areas of urethane, epoxy, etc. chemistry to these isobutylene-based polymers.

The sequential reaction sequence as shown:

Hydroxy-XP-50 via Hydrolysis of Acetate-XP-50

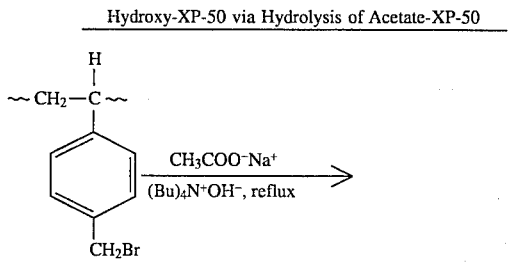

Hydroxy-XP-50 via Hydrolysis of Acetate-XP-50

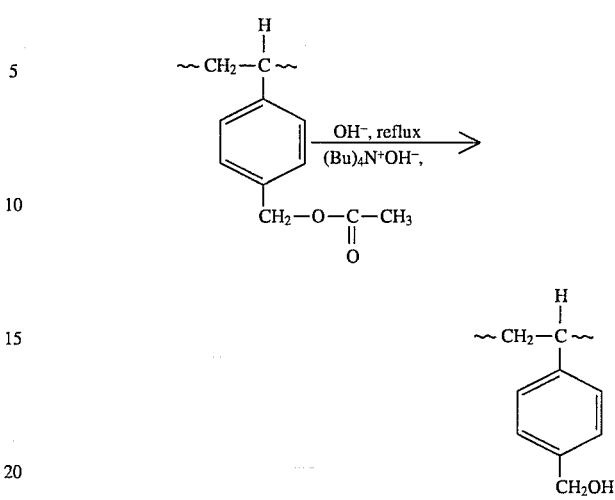

is in essence an hydrolysis of the bromomethyl group with hydroxy ion as the nucleophile.

The brominated "base" terpolymer chosen for these studies was brominated in the 100 gallon pfaudler and the "base" terpolymer contained 1.44 mole % PMS and 0.68 mole % Br-PMS. The experiments were carried out in a two-phase, water/organic system under nitrogen in a 2 liter jacketed flask. The organic solvent used consisted of a 50:50 (wt:wt) mixture of tetrahydrofuran and toluene.

A 5% "base" terpolymer solution was prepared by dissolving 60 grams of "base" terpolymer in 1200 grams solvent. The dissolution takes a number of hours and was always done overnight. The aqueous phase consisted of Bu4NOH (phase transfer catalyst), NaOH and $CH_3COOH$ to a total volume of 60 ml. The amounts of these components is given in Table 1. After the addition of the aqueous solution, the reactor was heated to reflux at 74.5° C. (Note: It takes 1 hour to reach reflux temperature.) The refluxing continued for the next 6 to 8 hours. The samples were withdrawn from the reactor every hour and given three 1% aqueous HCl and three 10% aqueous isopropanol washes. The samples were then recovered in isopropanol. Antioxidant was added by soaking the polymer in a 0.5% (wt) solution of butylated hydroxytoluene (2,6-ditertbutyl-4-methylphenol) in isopropyl alcohol. They were then dried in a vacuum oven at 65° C. for 48 hours.

Figure 3:
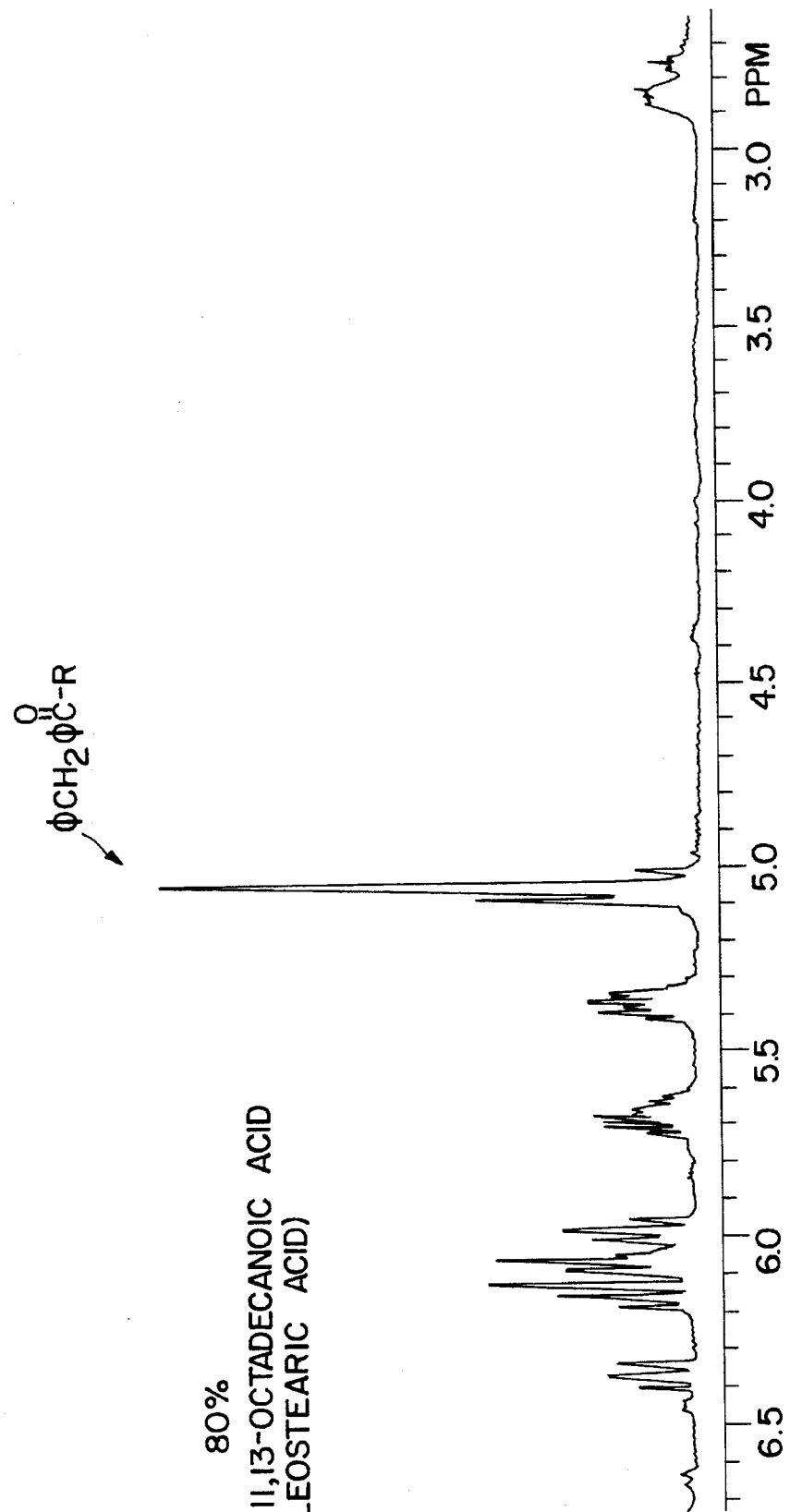
FIG. 3 illustrates an NMR spectrum of eleostearic acid.
Figure 4:
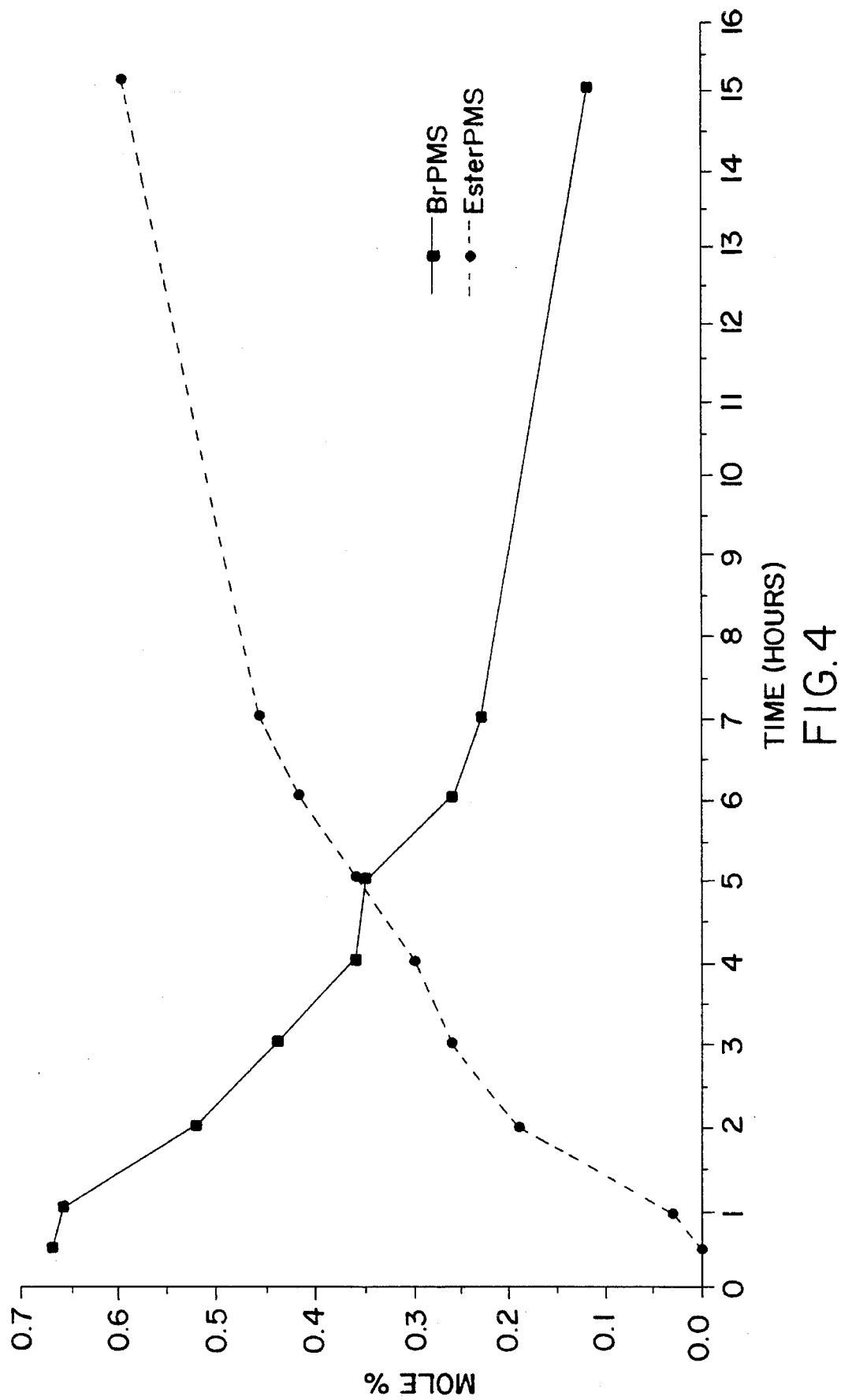
FIG. 4 illustrates a plot of time versus mole % for an acetate ester.
Figure 5:
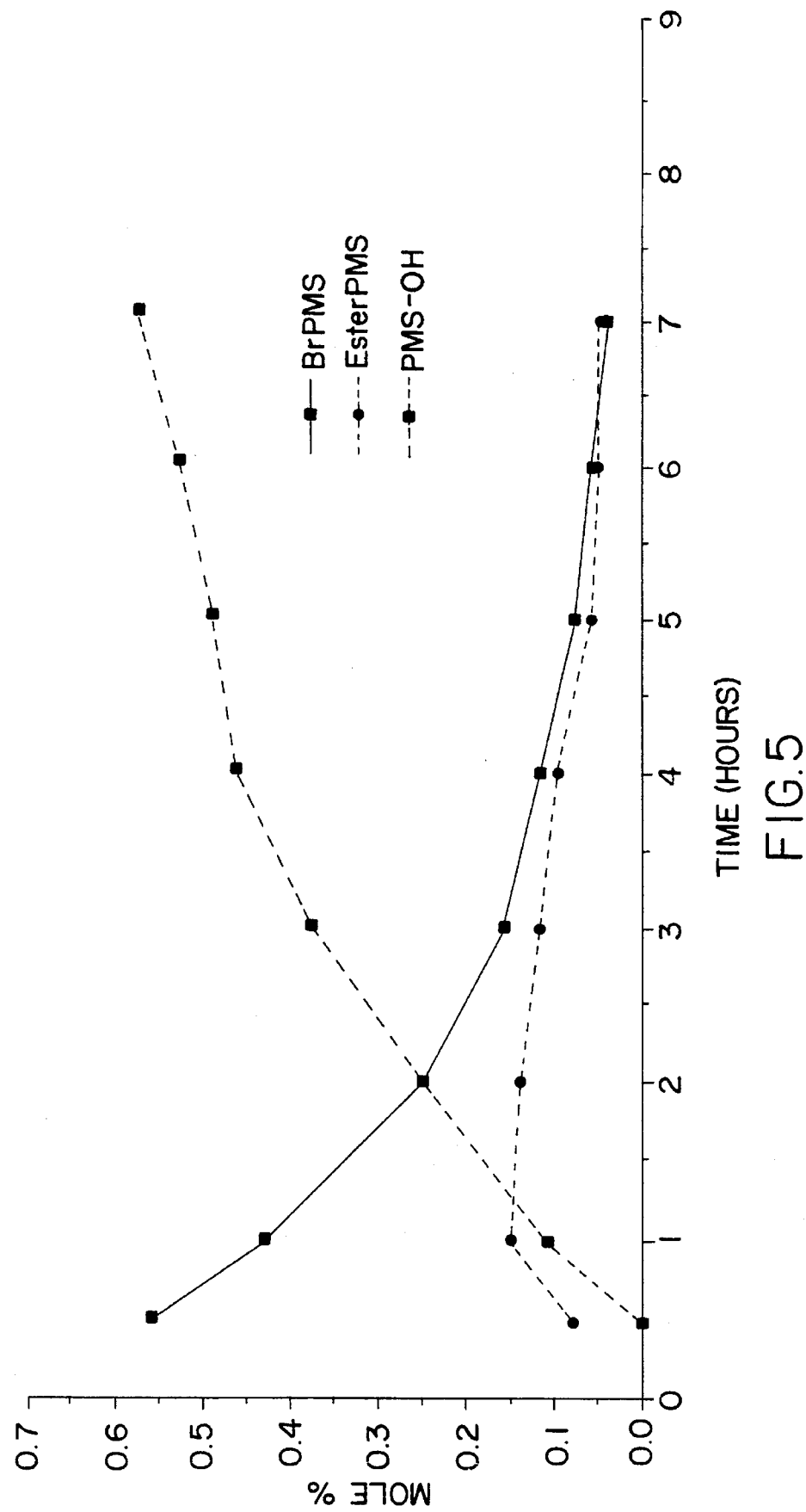
FIG. 5 illustrates a plot of time versus mole % for hydroxy and ester formation.

Results of a number of experiments are tabulated in Table 1 (attached) and show that any desired ratio of the three functionalities can be achieved by proper selection of reaction conditions. With excess acid as in runs 13968-89, 13968-102, and 13968-106 only ester functionality is achieved by the nucleophilic substitution reaction. The rate of ester formation by replacement of the benzylic bromines for reaction 13968-102 is plotted in FIG. 3. With excess base present, the ester is hydrolyzed to hydroxy by the sequential reaction so a mixed functionality product can be produced. The rate at which the various functionalities form and disappear for reaction 13968-70 is plotted in FIG. 4.

In each case, proton NMR spectra was used to quantify the amounts of pendant functionality present:

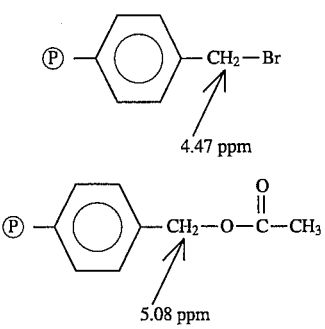

This sequential esterification, hydrolysis reaction route is thus capable of yielding a range of very useful pendant functionalized polymers.

EXAMPLE 114

Preparation of Pendant Functionalized Isobutylene/Paramethyl Styrene Copolymers Containing Mercaptan Groups In this example, pendant mercaptan functionality was attached to a random isobutylene/paramethyl styrene/para-bromomethylstyrene "base" terpolymer by nucleophilic substitution using NaSH as the nucleophilic reagent. This reaction must be conducted in a two-phase system using phase transfer catalysis with the NaSH nucleophilic reagent

| Reaction Number | Poly,g | Solvent and Weight (g) | $H_2O$, ml | $Bu_4NOH$ (g) and $Bu_4NOH/Br$ | NaOH (g) and NaOH/Br | $CH_3COOH$ (g) and $CH_3COOH/Br$ | Run Temp. °C. | Run Time (Hours) | Product Analysis, NMR-Mole % | |
|---|---|---|---|---|---|---|---|---|---|---|
| 13968-70 | 40.75 (14470-68-4D) | Toluene- 400.0 THF - 401.7 | 40 | 1.62 .50 (Br) | 50% NaOH 40.83 67 (Br) | 6.05 13 (Br) | 74.5(R) | 7.0 | BrPMS- OHPMS- Ester- | .04 .59 .05 |
| 13968-72 | 60.37 (14470-68-4D) | Toluene- 602.5 THF - 602.2 | 60 | 3.64 .75 (Br) | 50% NaOH 60.22 100 (Br) | 9.00 20 (Br) | 74.5(R) | 6.5 | BrPMS- OHPMS- Ester- | .03 .65 .01 |
| 13968-74 | 59.37 (14470-68-4D) | Toluene- 636.5 THF - 605.5 | 60 | 3.62 .75 (Br) | 50% NaOH 36.83 60 (Br) | 9.00 20 (Br) | 74.5(R) | 6.0 | BrPMS- OHPMS- Ester- | .06 .60 .05 |
| 13968-76 | 59.47 (14470-68-4D) | Toluene- 654.3 THF - 606.2 | 60 | 3.61 .75 (Br) | 50% NaOH 24.20 40 (Br) | 9.05 20 (Br) | 74.5(R) | 8.0 | BrPMS- OHPMS- Ester- | .04 .47 .16 |
| 13968-78 | 60.35 (14470-68-4D) | Toluene- 597.0 THF - 599.9 | 50.6 | 3.69 .75 (Br) | 50% NaOH 14.43 24 (Br) | 9.02 20 (Br) | 74.5(R) | 13.0 | BrPMS- OHPMS- Ester- | .00 .34 .35 |
| 13968-83 | 59.61 (14470-68-4D) | Toluene- 598.0 THF - 600.0 | 52 | 3.62 .75 (Br) | 50% NaOH 11.99 20 (Br) | 9.00 20 (Br) | 74.5(R) | 13.0 | BrPMS- OHPMS- Ester- | .06 .00 .60 |
| 13968-89 | 60.68 (14470-68-4D) | Toluene- 602.0 THF - 607.0 | 53 | 3.62 .75 (Br) | 12.21 20 (Br) | 18.15 40 (Br) | 74.5(R) | 13.0 | BrPMS- OHPMS- Ester- | .21 .00 .47 |
| 13968-92 | 60.07 (14470-68-4D) | Toluene- 1201.0 | 44 | 2.60 .50 (Br) | 29.96 50 (Br) | 9.00 20 (Br) | 94.5 | 7.0 | BrPMS- OHPMS- Ester- | .00 .56 .07 |
| 13968-102 | 60.00 (14470-68-4D) | Toluene- 600.7 THF - 601.3 | 55 | 3.59 .75 (Br) | 12.01 20 (Br) | 9.33 21 (Br) | 73.5(R) | 6.0 | BrPMS- OHPMS- Ester- | .30 .00 .44 |
| 13968-106 | 60.00 (14470-68-4D) | Toluene- 600.0 THF - 600.4 | 60 | 3.61 .75 (Br) | 6.01 20 (Br) | 9.33 21 (Br) | 74.5 | 14.0 | BrPMS- OHPMS- Ester- | .12 .00 .61 |
| 13968-108 | 60.00 (14470-68-4D) | Toluene- 1200.0 | 60 | 3.70 .75 (Br) | 29.00 100 (Br) | 8.97 20 (Br) | 74.5 | 6.0 | BrPMS- OHPMS- Ester- | .00 .55 .04 |
| 13968-125 | 61.11 (14470-68-4D) | Heptane- 1200.0 | 60 | 3.61 .75 (Br) | 6.00 20 (Br) | 9.08 20 (Br) | 82.0 | 8.0 | No RXN | |
| 13968-147 | 200 (14470-42-6D) | Toluene- 1800.0 | 180 | 10.41 .75 (Br) | 101.69 116 (Br) | 30.04 23 (Br) | 74.0 | 5.0 | BrPMS- OHPMS- Ester- | .00 .46 .03 |
| 13968-148 | 200 (15271-1-4D) | Toluene- 1800.0 | 200 | 10.50 .75 (Br) | 50% NaOH 40.13 23 (Br) | 30.37 23 (Br) | 75.5 | 3.5 | BrPMS- OHPMS- Ester- | .34 .00 .12 |

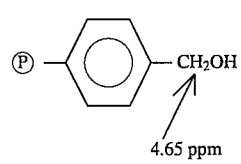

dissolved in the aqueous phase and the "base" terpolymer in the organic phase. Sequential reactions leading to cross-linking are difficult to control and the product oxidatively cross-links to form disulfide linkages readily on exposure to air at elevated temperatures so it is not a very stable pendant. Nevertheless, the active product mercaptan groups are useful in vulcanization and co-vulcanization and in self-cross-linking systems of various types.

The "base" terpolymer used in this example was a very low molecular weight isobutylene/paramethyl styrene/para-bromomethylstyrene terpolymer produced in the laboratory by light initiated radical bromination of a pilot plant produced random isobutylene/paramethyl styrene copolymer. It had a viscosity average molecular weight of 10,000 and contained 1.1 mole % paramethyl styrene 1.6 mole % para-bromomethylstyrene and 97.3 mole % isobutylene.

In the nucleophilic substitution reaction, 250 g of the "base" terpolymer was dissolved in 1000 g hexane in a 2 l resin flask under nitrogen to form a 20% solution by weight. Then an aqueous solution consisting of 11.0 g NaSH, 1.0 g tetrabutyl ammonium bromide and 25 g of distilled water was poured in with stirring to form an emulsion which was heated to 65° C. and stirred hot for 11 hours before being allowed to cool. All materials were handled and charged under nitrogen and the reaction was conducted with continuous nitrogen bubbling through a fritted glass bubbler to rigorously exclude oxygen. The charge was about 1.4 mole % of the NaSH nucleophilic reagent per mole of benzylic bromine. After cooling the solution was washed several times with dilute NaOH at ice water temperature to remove salts and unreacted NaSH and then given several cold water washes before being precipitated in methanol. The polymer was stabilized with 0.1 wt % BHT and 0.1 wt % Methyl Tuods and then vacuum oven dried at 70° C. to recover a soft, sticky, light tannish pendant mercaptan functionalized polymer. All washing, recovery and drying was done in a nitrogen atmosphere to prevent oxidative cross-linking. Despite these precautions the recovered polymer had a viscosity average molecular weight of 20,700 showing that some cross-linking did occur, but the product was still completely soluble. The product contained 0.8 wt % sulfur and contained 1.5 mole % pendant mercaptan functionality by NMR analyses. It also contained 1.0 wt % residual bromine but less than oil mole % residual benzylic bromide by analyses.

Proton NMR spectra was used to quantify the amount of pendant functionality present.

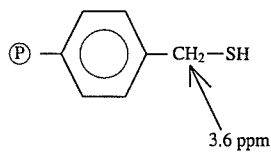

3.6 ppm

This example shows that under the proper conditions pendant mercaptan functionality can be attached to the "base" terpolymer of this invention without producing a gelled product.

In total these examples have shown that any of the nucleophilic substitution reactions described and claimed in this invention can be accomplished by carefully observing the key requirements taught herein to produce the versatile and useful soluble, backbone saturated pendant functionalized polymers claimed.

We claim:

1. A method of compatibilizing a polymer blend of (a) a first polymer including repeating units of the formula

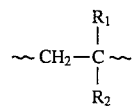

wherein $R_1$ and $R_2$ are selected from the group consisting of hydrogen, aryl, alkyl, and mixtures thereof, and (b) a second polymer which is incompatible with said first polymer, said method comprising adding to said polymer blend a compatibilizer comprising a graft copolymer comprising

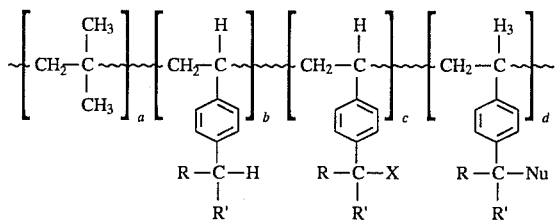

wherein R and R' are independently selected from the group consisting of hydrogen, alkyl, and the primary and secondary alkyl halides, a ranges from about 14 to 70,000, b ranges from 0 to about 70,000, c ranges from 0 to about 70,000, d ranges from 1 to 70,000, X comprises a halogen, and Nu comprises a nucleophilic residue provided by a thermoplastic polymeric nucleophile having a molecular weight of at least 1,000 and being sufficiently nucleophilic such that said nucleophile is capable of donating electrons to benzyl halides.

2. The method of claim 1 where Nu is yP, wherein y comprises a linked nucleophilic residue and P comprises a thermoplastic polymer.

3. The method of claim 2 wherein said thermoplastic polymer is selected from the group consisting of the polymers and copolymers of the anionically polymerizable monomers, the anionically and cationically ring-openable monomers, oxidatively coupleable monomers, and the polyolefins.

4. The method of claim 3 wherein said anionically polymerizable monomers are selected from the group consisting of vinyl aromatic compounds, vinyl unsaturated amides, acenaphthylene, 9-acrylcarbazole; acrylonitrile, methacrylonitrile, organic isocyanates, alkyl acrylates, alkyl methacrylates, vinyl pyridines, and mixtures thereof.

5. The method of claim 3 wherein said anionically and cationically ring-opening monomers are selected from the group consisting of the cyclic ethers, sulfides, lactones, lactams, N-carboxyanhydrides.

6. The method of claim 3 wherein said oxidatively coupleable monomers comprise the alkyl substituted phenols.

7. The method of claim 1 wherein said first polymer is selected from the group consisting of polypropylene and the copolymers of propylene.

8. The blend produced by the method of claim 1.

9. A method of compatibilizing a polymer blend of (a) a first polymer including repeating units of the formula

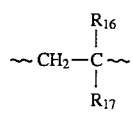

wherein $R_{16}$ and $R_{17}$ are hydrogen or alkyl, and (b) a second polymer which is incompatible with said first polymer, said method comprising adding to said polymer blend a compatibilizer comprising a graft copolymer comprising

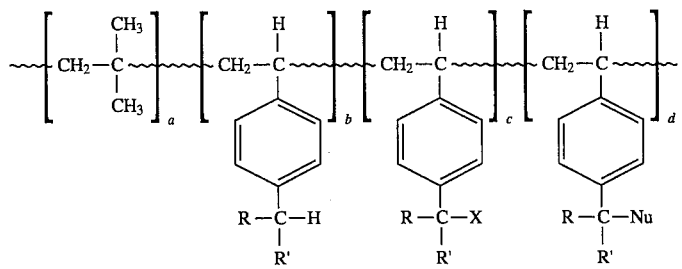

wherein R and R' are independently selected from the group consisting of hydrogen, alkyl, and the primary and secondary alkyl halides, a ranges from about 14 to 70,000, b ranges from 0 to about 70,000, c ranges from 0 to about 70,000, d ranges from 1 to 70,000, X comprises a halogen, and Nu comprises a nucleophilic residue provided by a polymeric nucleophile having a molecular weight of at least 1,000 and being sufficiently nucleophilic such that said nucleophile is capable of donating electrons to benzyl halides.

10. The method of claim 9 wherein said polymeric nucleophile comprises

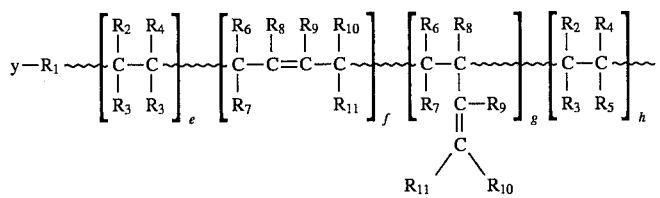

wherein $R_2$ and $R_3$ comprise a component selected from the grup consisting of aryl, diaryl, polyaryl, and the alkyl, aryl, alkaryl, alkoxy, cycloalkyl, aryloxy and dialkylamino derivatives of the aryl, diaryl, or polyaryls, wherein $R_4$ through $R_{11}$ are independently selected from the group consisting of hydrogen, alkyl, and substituted alkyl, f ranges from 0 to about 20,000, g ranges from 0 to about 20,000, and h ranges from 0 to about 10,000, with the further proviso that the sum of f+g+h ranges from about 20 to about 20,000, y comprises a linked nucleophilic residue, and furthermore, wherein either (a) $R_1$ is $(CH_2)_m$, wherein m is a positive integer, and e is 0 or 1, or (b) $R_1$ is $(CH_2)_m$, wherein m is 0, and e ranges from 0 to about 1,000.

11. The method of claim 10 wherein said linked nucleophilic residue y is selected from the group consisting of

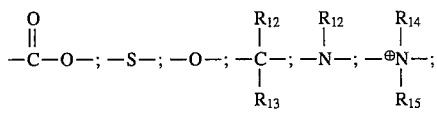

wherein $R_{12}$, $R_{13}$, $R_{14}$, and $R_{15}$ can be hydrogen, alkyl or aryl.

12. The method of claim 11 wherein said residue is derived from yM wherein M is an alkali or alkaline earth metal, or an onium ion.

13. The method of claim 10 wherein X is selected from the group consisting of chlorine, bromine and iodine.

14. The method of claim 10 wherein $R_3$ is aryl.

15. The method of claim 15 wherein $R_4$ and $R_5$ are hydrogen.

16. The blend produced by the method of claim 9.

* * * * *